US008647193B2

(12) United States Patent
Okada

(10) Patent No.: US 8,647,193 B2
(45) Date of Patent: Feb. 11, 2014

(54) SERVER, GAMING SYSTEM, GAMING MACHINE, AND CONTROL METHOD OF THE SERVER CAPABLE OF CHANGING MINIMUM BET UNIT IN GAMING MACHINE

(75) Inventor: Kazuo Okada, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 506 days.

(21) Appl. No.: 12/784,979

(22) Filed: May 21, 2010

(65) Prior Publication Data

US 2010/0317428 A1 Dec. 16, 2010

(30) Foreign Application Priority Data

Jun. 10, 2009 (JP) ................................ 2009-139321

(51) Int. Cl.
*G06F 17/00* (2006.01)

(52) U.S. Cl.
USPC ................................ 463/25; 463/20; 463/42

(58) Field of Classification Search
USPC ................................ 463/20, 25, 42
See application file for complete search history.

(56) References Cited

U.S. PATENT DOCUMENTS

| | | | | |
|---|---|---|---|---|
| 6,254,483 | B1 * | 7/2001 | Acres | 463/26 |
| 7,338,372 | B2 * | 3/2008 | Morrow et al. | 463/31 |
| 2004/0147311 | A1 | 7/2004 | Fujimoto | |
| 2005/0085292 | A1 | 4/2005 | Inamura | |
| 2006/0079310 | A1 * | 4/2006 | Friedman et al. | 463/16 |
| 2006/0111179 | A1 | 5/2006 | Inamura | |
| 2006/0211478 | A1 * | 9/2006 | Walker et al. | 463/16 |
| 2008/0146313 | A1 | 6/2008 | Inamura | |
| 2009/0104960 | A1 * | 4/2009 | Kelly et al. | 463/16 |
| 2009/0104965 | A1 * | 4/2009 | House et al. | 463/20 |

* cited by examiner

*Primary Examiner* — Michael Cuff
(74) *Attorney, Agent, or Firm* — KMF Patent Services, PLLC; S. Peter Konzel; Kenneth M. Fagin

(57) ABSTRACT

A server is provided with an input device with which an input for selecting a minimum bet unit out of a plurality of minimum bet units can be made. Minimum bet unit information indicative of the selected minimum bet information is transmitted to a gaming machine. On receiving the minimum bet unit information, the minimum bet unit in the gaming machine having received the minimum bet unit information is changed to the minimum bet unit selected in the server.

18 Claims, 37 Drawing Sheets

FIG. 5

| | First video reel | Second video reel | Third video reel | Fourth video reel | Fifth video reel |
|---|---|---|---|---|---|
| Code number | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 7

Symbol combination table

| Combination of symbols | | | | | Number of payouts | Winning combination |
|---|---|---|---|---|---|---|
| First video reel | Second video reel | Third video reel | Fourth video reel | Fifth video reel | | |
| JACKPOT 7 | JACKPOT 7 | JACKPOT 7 | JACKPOT 7 | JACKPOT 7 | Amount of jackpot | Jackpot |
| APPLE | APPLE | APPLE | APPLE | APPLE | Bonus game※ | Bonus game trigger |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY 3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE 3 |
| CHERRY | CHERRY | CHERRY | (ANY) | (ANY) | 2 | CHERRY 2 |
| ORANGE | ORANGE | ORANGE | (ANY) | (ANY) | 2 | ORANGE 2 |
| CHERRY | (ANY) | (ANY) | (ANY) | (ANY) | 1 | CHERRY 1 |
| ORANGE | (ANY) | (ANY) | (ANY) | (ANY) | 1 | ORANGE 1 |

※Free games of the number of times determined by lottery are conducted.

SERVER, GAMING SYSTEM, GAMING MACHINE, AND CONTROL METHOD OF THE SERVER CAPABLE OF CHANGING MINIMUM BET UNIT IN GAMING MACHINE

CROSS-REFERENCE TO RELATED APPLICATIONS

This application is based upon and claims a priority from the prior Japanese Patent Application No. 2009-139321 filed on Jun. 10, 2009, the entire contents of which are incorporated herein by reference.

BACKGROUND OF THE INVENTION

1. Field of the Invention

The present invention relates to a server, a gaming system, a gaming machine, and a control method of server capable of changing the minimum bet unit in a gaming machine.

2. Discussion of the Background

In each gaming machine (e.g. slot machine) installed in game facilities such as casino, the minimum unit (cost per game) of game media (e.g. coin and chip) that a player can bet in one game is determined (e.g. Patent Documents 1 to 2). A player bets game media in an amount corresponding to a natural number multiple of the cost per game to play a game executed on that gaming machine. For example, in a game on the gaming machine in which the cost per game is set to 25 cents, a player can bet game media in an amount corresponding to 25 cents, 50 cents, 75 cents, . . . or 25×N (N is a natural number) cents.

The cost per game as above is referred to as "minimum bet unit" or "denomination" in the present description.

Recently, gaming machines in which the minimum bet unit can be changed have been provided (e.g. Patent Documents 3 to 4).

PATENT DOCUMENTS

Patent Document 1: US 2004-0147311-A1
Patent Document 2: US 2008-0146313-A1
Patent Document 3: US 2005-0085292-A1
Patent Document 4: US 2006-0111179-A1

SUMMARY OF THE INVENTION

Managers of game facilities such as casino sometimes want to change the above-mentioned minimum bet unit as a part of the management strategy. An example thereof is described below.

Players are very much interested in the minimum bet unit set for gaming machines. They decide the gaming machine to play on in which a predetermined minimum bet unit is set, in accordance with money in hand, the mood they are in, and their money sense. Players' needs about the minimum bet unit vary in accordance with many factors such as the day of week, time of day, and economic trend, namely, the needs are in flux. It is presumable that managers of game facilities such as casino can increase their profit by correctly knowing the players' needs about the minimum bet unit in a game at any time and providing the gaming machine in which the minimum bet unit that suits the players' needs is set.

As above, managers of game facilities such as casino sometimes want to change the minimum bet unit as appropriate as a part of the management strategy. In addition to the players' needs, it is also presumable that they sometimes need to change the minimum bet unit because of the requirement in managing the game facilities.

Against this background, the present inventors have arrived at the following idea. The distinctive technique for changing the minimum bet unit may allow the quick and easy change of the minimum bet unit in the case where the minimum bet unit is required to be changed according to the management strategy of game facilities.

The present invention was made in view of the above idea, and an object thereof is to provide a server, a gaming system, a gaming machine, and a control method of server capable of changing the minimum bet unit in a gaming machine quickly and easily in the case where the minimum bet unit is required to be changed according to the management strategy of game facilities.

The present invention provides a server having the following configuration.

(1) That is, the server comprises an input device and a processor. the server is capable of communicating with a gaming machine that executes a game in which a result of the game is determined after game media in an amount corresponding to a natural number multiple of any of a plurality of minimum bet units is bet and game media in an amount determined based on the result of the game is paid out. The processor is programmed to execute the processing of: (A) accepting an input made by using the input device for selecting a minimum bet unit out of a plurality of minimum bet units; and (B) transmitting a minimum bet unit information indicative of the minimum bet unit selected in the processing (A) to a controller provided in the gaming machine.

According to the invention of (1), the server includes an input device. It is possible to input a selection of a minimum bet unit out of a plurality of minimum bet units by using the input device provided in the server. Minimum bet unit information indicative of the selected minimum bet unit is transmitted to the gaming machine. On receiving the minimum bet unit information, the gaming machine executes a game as follows. After the bet of game media in an amount corresponding to the natural number multiple of the minimum bet unit indicated by the minimum bet unit information, the result of the game is determined. Then, the game media in an amount determined base on the above result of the game is paid out. Namely, the minimum bet unit in the gaming machine which has received the minimum bet unit information is changed to the minimum bet unit selected in the server.

Accordingly, the manager of the game facility needs not to have inefficient work of changing the minimum bet unit in gaming machines individually in the case where the minimum bet unit is required to be changed according to the management strategy of the game facility. Just an operation of the input device provided in the server allows quick and easy change of the minimum bet unit in the gaming machines.

Consequently, it is possible to promptly deal with the players' needs about the minimum bet unit, which may be different in accordance with the day of week, time of day, and the like, resulting in the profit increase of the game facility.

The server of (1) desirably has the following configuration.

(2) That is, the processing (A) includes accepting the input for selecting a minimum bet unit out of a plurality of minimum bet units and an input for selecting a gaming machine out of a plurality of the gaming machines.

Further, the processing (B) includes transmitting the minimum bet unit information indicative of the minimum bet unit selected in the processing (A) to the controller provided in the gaming machine selected in the processing (A).

According to the invention of (2), it is possible to input a selection of a gaming machine out of a plurality of gaming machines by using the input device provided in the server, in addition to the selection of the minimum bet unit. To the selected gaming machine, the minimum bet unit information is transmitted.

Accordingly, the manager of the game facility can specify the gaming machine to change its minimum bet unit by selecting the gaming machine by using the input device. Consequently, it is possible to change the minimum bet unit in the gaming machine flexibly in accordance with the management strategy of the game facility.

For example, it is possible to change the minimum bet unit only in the popular gaming machine to a larger unit so as to increase the profit. As a result, it is possible to manage the game facility more strategically.

The server of (1) desirably has the following configuration.

(3) That is, the processing (B) includes transmitting a minimum-bet-unit change signal to the controller, the minimum-bet-unit change signal including the minimum bet unit information indicative of the minimum bet unit selected in the processing (A) and being a signal for changing the minimum bet unit in the gaming machine when a state of the gaming machine becomes a change state in which the minimum bet unit can be changed.

According to the invention of (3), the minimum bet unit is changed when the state of the gaming machine becomes a state that the minimum bet unit can be changed (change state).

Examples of the change states include a state where a player does not play a game on the gaming machine (e.g. the number of credits is zero). If the minimum bet unit is changed while a player plays a game on that gaming machine, the change may surprise the player.

According to the invention of (3), the minimum bet unit is not changed unless the gaming machine is in the change state so as to prevent the change of the minimum bet unit at inappropriate times. Since the minimum bet unit is changed when the gaming machine is in the change state, the minimum bet unit can be changed at appropriate times.

Accordingly, the manager can implement more appropriate management of the game facility.

The present invention provides a gaming system having the following configuration.

(4) That is, the gaming system comprises: a gaming machine provided with a controller; a server provided with an input device and a processor; and a network enabling communication between the gaming machine and the server.

The processor is programmed to execute the processing of: (A) accepting an input made by using the input device for selecting a minimum bet unit out of a plurality of minimum bet units; and (B) transmitting a minimum bet unit information indicative of the minimum bet unit selected in the processing (A) to the controller.

The controller is programmed to execute the processing of (a) receiving the minimum bet unit information transmitted in the processing (B); and (b) executing a game in which a result of the game is determined after game media in an amount corresponding to a natural number multiple of the minimum bet unit indicated by the minimum bet unit information received in the processing (a) is bet and game media in an amount determined based on the result of the game is paid out.

According to the invention of (4), the server is provided with an input device. It is possible to input a selection of a minimum bet unit out of a plurality of minimum bet units by using the input device provided in the server. Minimum bet unit information indicative of the selected minimum bet unit is transmitted to the gaming machine. On receiving the minimum bet unit information, the gaming machine executes a game as follows. After the bet of game media in an amount corresponding to a natural number multiple of the minimum bet unit indicated by the minimum bet unit information, the result of the game is determined. Then, the game media in an amount determined based on the above result of the game is paid out. Namely, the minimum bet unit in the gaming machine which has received the minimum bet unit information is changed to the minimum bet unit selected in the server.

Accordingly, the manager of the game facility needs not to have inefficient work of changing the minimum bet unit in gaming machines individually in the case where the minimum bet unit is required to be changed according to the management strategy of the game facility. Just an operation of the input device provided in the server allows quick and easy change of the minimum bet unit in the gaming machines.

Consequently, it is possible to promptly deal with the players' needs about the minimum bet unit, which may be different in accordance with the day of week, time of day, and the like, resulting in the profit increase of the game facility.

The gaming system of (4) desirably has the following configuration.

(5) That is, the processing (A) includes accepting the input made by using the input device for selecting a minimum bet unit out of a plurality of minimum bet units and an input made by using the input device for selecting a gaming machine out of a plurality of the gaming machines.

The processing (B) includes transmitting the minimum bet unit information indicative of the minimum bet unit selected in the processing (A) and an identification information of the gaming machine selected in the processing (A) to the controller.

The processing (a) includes receiving the minimum bet unit information and the identification information of the gaming machine transmitted in the processing (B).

The processing (b) includes executing a game in which a result of the game is determined after game media in an amount corresponding to a natural number multiple of the minimum bet unit indicated by the minimum bet unit information received in the processing (a) is bet and game media in an amount determined based on the result of the game is paid out, when the identification information of the gaming machine received in the processing (a) is identical with an identification information of the gaming machine provided with the controller concerned.

According to the invention of (5), it is possible to input a selection of a gaming machine out of a plurality of gaming machines by using the input device provided in the server, in addition to the selection of the minimum bet unit. Identification information of the selected gaming machine is transmitted to the gaming machines. In the case where a gaming machine has received the identification information that is identical with the identification information thereof, a game is executed in that gaming machine based on the changed minimum bet unit.

Accordingly, the manager of the game facility can specify the gaming machine to change its minimum bet unit by selecting the gaming machine by using the input device. Consequently, it is possible to change the minimum bet unit in the gaming machine flexibly in accordance with the management strategy of the game facility.

For example, it is possible to change the minimum bet unit only in the popular gaming machine to a larger unit so as to increase the profit. As a result, it is possible to manage the game facility more strategically.

The gaming system of (4) desirably has the following configuration.

(6) That is, the controller is further programmed to execute the processing of (c) determining whether or not the gaming machine provided with the controller concerned is in a change state in which the minimum bet unit can be changed.

The processing (B) includes transmitting a minimum-bet-unit change signal to the controller, the minimum-bet-unit change signal including the minimum bet unit information indicative of the minimum bet unit selected in the processing (A) and being a signal for changing the minimum bet unit in the gaming machine when a state of the gaming machine becomes the change state.

The processing (a) includes receiving the minimum-bet-unit change signal transmitted in the processing (B).

The processing (b) includes executing a game in which a result of the game is determined after game media in an amount corresponding to a natural number multiple of the minimum bet unit indicated by the minimum bet unit information included in the minimum-bet-unit change signal received in the processing (a) is bet and game media in an amount determined based on the result of the game is paid out, on condition that it is determined in the processing (c) that the gaming machine provided with the controller concerned is in the change state.

According to the invention of (6), a game based on the changed minimum bet unit is executed, on condition that the gaming machine is in a state that the minimum bet unit can be changed (change state).

Examples of the change states include a state where a player does not play a game on the gaming machine (e.g. the number of credits is zero). If the minimum bet unit is changed while a player plays a game on that gaming machine, the change may surprise the player.

According to the invention of (6), the minimum bet unit is not changed unless the gaming machine is in the change state so as to prevent the change of the minimum bet unit at inappropriate times. Since the minimum bet unit is changed when the gaming machine is in the change state, the minimum bet unit is changed at appropriate times.

Accordingly, the manager can implement more appropriate management of the game facility.

The gaming system of (4) desirably has the following configuration.

(7) That is, the gaming machine is provided with a bet input device with which a player can place a bet.

The controller is further programmed to execute the processing of (d) accepting an input made by using the bet input device for betting game media in an amount corresponding to a natural number multiple of the minimum bet unit indicated by the minimum bet unit information received in the processing (a), on condition that a standby state for changing the minimum bet unit is terminated.

According to the invention of (7), a player can input a bet based on the changed minimum bet unit by using the bet input device on condition that the state in which the minimum bet unit is changed (standby state) is terminated. Examples of the standby state include a state until the processing to change the minimum bet unit is completed after the state of the gaming machine is changed to the change state.

Accordingly, the player cannot place a bet until the standby state is terminated. As a result, it is possible to avoid the situation that the minimum bet unit cannot be changed so long because a player starts playing the game on a gaming machine right after the completion of the game played by another player on that gaming machine.

Further, the present invention also provides a gaming machine having the following configuration.

(8) That is, the gaming machine comprises a controller and is capable of communicating with a server accepting an input made by using an input device for selecting a minimum bet unit out of a plurality of minimum bet units.

The controller is programmed to execute the processing of: (a) receiving a minimum bet unit information indicative of the selected minimum bet unit from the server; and (b) executing a game in which a result of the game is determined after game media in an amount corresponding to a natural number multiple of the minimum bet unit indicated by the minimum bet unit information received in the processing (a) is bet and game media in an amount determined based on the result is paid out.

According to the invention of (8), on receiving the minimum bet unit information indicative of the minimum bet unit selected in the server, the gaming machine executes a game as follows. After the bet of game media in an amount corresponding to a natural number multiple of the minimum bet unit indicated by the minimum bet unit information, the result of the game is determined. Then, the game media in an amount determined based on the above result of the game is paid out. Namely, the minimum bet unit in the gaming machine which has received the minimum bet unit information is changed to the minimum bet unit selected in the server.

Accordingly, the manager of the game facility needs not to have inefficient work of changing the minimum bet unit in gaming machines individually in the case where the minimum bet unit is required to be changed according to the management strategy of the game facility. Just an operation of the input device provided in the server allows quick and easy change of the minimum bet unit in the gaming machine.

Consequently, it is possible to promptly deal with the players' needs about the minimum bet unit, which may be different in accordance with the day of week, time of day, and the like, resulting in the profit increase of the game facility.

The gaming machine of (8) desirably has the following configuration.

(9) That is, the processing (a) includes further receiving an identification information of the gaming machine selected in the server.

The processing (b) includes executing a game in which a result of the game is determined after game media in an amount corresponding to a natural number multiple of the minimum bet unit indicated by the minimum bet unit information received in the processing (a) is bet and game media in an amount determined based on the result is paid out, when the identification information of the gaming machine received in the processing (a) is identical with an identification information of the gaming machine provided with the controller concerned.

According to the invention of (9), in the case where the gaming machine has received identification information that is identical with the identification information thereof from the server, a game is executed in that gaming machine based on the changed minimum bet unit.

Accordingly, the manager of the game facility can specify the gaming machine to change its minimum bet unit by selecting the gaming machine by using the input device. Consequently, it is possible to change the minimum bet unit in the gaming machine flexibly in accordance with the management strategy of the game facility.

For example, it is possible to change the minimum bet unit only in the popular gaming machine to a larger unit so as to increase the profit. As a result, it is possible to manage the game facility more strategically.

The gaming machine of (8) desirably has the following configuration.

(10) That is, the controller is further programmed to execute the processing of (c) determining whether or not the gaming machine provided with the controller concerned is in a change state in which the minimum bet unit can be changed.

The processing (a) includes receiving a minimum-bet-unit change signal including the minimum bet unit information indicative of the minimum bet unit selected in the server.

The processing (b) includes executing a game in which a result of the game is determined after game media in an amount corresponding to a natural number multiple of the minimum bet unit indicated by the minimum bet unit information included in the minimum-bet-unit change signal received in the processing (a) is bet and game media in an amount determined based on the result is paid out, on condition that it is determined in the processing (c) that the gaming machine provided with the controller concerned is in the change state.

According to the invention of (10), the minimum bet unit is changed on condition that the gaming machine is in a state that the minimum bet unit can be changed (change state).

Examples of the change states include a state where a player does not play a game on the gaming machine (e.g. the number of credits is zero). If the minimum bet unit is changed while a player plays a game on that gaming machine, the change may surprise the player.

According to the invention of (10), the minimum bet unit is not changed unless the gaming machine is in the change state so as to prevent the change of the minimum bet unit at inappropriate times. Since the minimum bet unit is changed when the gaming machine is in the change state, the minimum bet unit is changed at appropriate times.

Accordingly, the manager can implement more appropriate management of the game facility.

The gaming machine of (8) desirably has the following configuration.

(11) That is, the gaming machine further comprises a bet input device with which a player can place a bet.

The controller is further programmed to execute the processing of (d) accepting an input made by using the bet input device for betting game media in an amount corresponding to a natural number multiple of the minimum bet unit indicated by the minimum bet unit information received in the processing (a), on condition that a standby state for changing the minimum bet unit is terminated.

According to the invention of (11), a player can input a bet based on the changed minimum bet unit by using the bet input device on condition that the state in which the minimum bet unit is changed (standby state) is terminated. Examples of the standby state include a state until the processing to change the minimum bet unit is completed after the state of the gaming machine is changed to the change state.

Accordingly, the player cannot place a bet until the standby state is terminated. As a result, it is possible to avoid the situation that the minimum bet unit cannot be changed so long because a player starts playing a game on a gaming machine right after the completion of the game played by another player on that gaming machine.

The present invention further provides a control method of a server.

(12) That is, the control method of a server comprises the steps of: (A) accepting an input made by using an input device included in the server for selecting a minimum bet unit out of a plurality of minimum bet units; and (B) transmitting a minimum bet unit information indicative of the minimum bet unit selected in the step (A).

The server comprises the input device and a processor.

The server is capable of communicating with a gaming machine that executes a game in which a result of the game is determined after game media in an amount corresponding to a natural number multiple of any of a plurality of minimum bet units is bet and game media in an amount determined based on the result is paid out.

According to the invention of (12), the server is provided with an input device. It is possible to input a selection of a minimum bet unit out of a plurality of minimum bet units by using the input device provided in the server. Minimum bet unit information indicative of the selected minimum bet unit is transmitted to the gaming machine. On receiving the minimum bet unit information, the gaming machine executes a game as follows. After the bet of game media in an amount corresponding to a natural number multiple of the minimum bet unit indicated by the minimum bet unit information, the result of the game is determined. Then, the game media in an amount determined base on the above result of the game is paid out. Namely, the minimum bet unit in the gaming machine which has received the minimum bet unit information is changed to the minimum bet unit selected in the server.

Accordingly, the manager of the game facility needs not to have inefficient work of changing the minimum bet unit in gaming machines individually in the case where the minimum bet unit is required to be changed according to the management strategy of the game facility. Just an operation of the input device provided in the server allows quick and easy change of the minimum bet unit in the gaming machines.

Consequently, it is possible to promptly deal with the players' needs about the minimum bet unit, which may be different in accordance with the day of week, time of day, and the like, resulting in the profit increase of the game facility.

According to the present invention, it is possible to change the minimum bet unit quickly and easily in the case where the minimum bet unit is required to be changed in accordance with the management strategy of the game facility.

BRIEF DESCRIPTIONS OF THE DRAWINGS

FIG. 5 is a view illustrating arrangements of symbols drawn on peripheral faces of reels of the gaming machine according to the embodiment of the present invention.

FIG. 7 is a view illustrating a symbol combination table of the gaming machine according to the embodiment of the present invention.

DESCRIPTION OF THE EMBODIMENT

Hereinafter, embodiments (First to Fourth Embodiments) of the present invention are described.

[First Embodiment]

An overview of a first embodiment is described with reference to FIG. 1.

Figure 1:
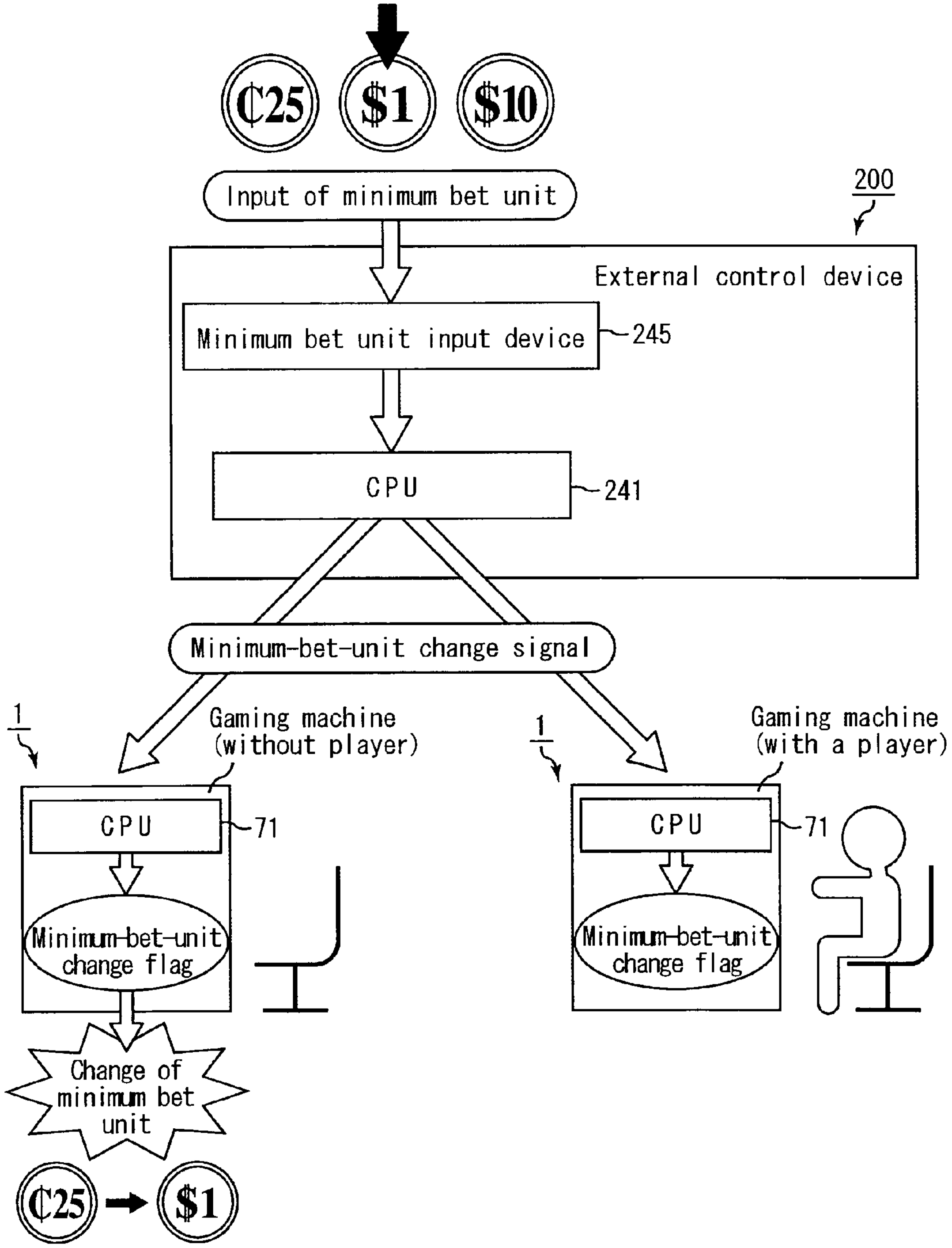
FIG. 1 is a conceptual view explaining an overview of a first embodiment of the present invention.

FIG. 1 is a conceptual view explaining an overview of a first embodiment of the present invention.

An external control device 200 according to the present embodiment is connected to a plurality of gaming machines 1 through communication lines. The plurality of gaming machines 1 are installed in a casino.

In each gaming machine 1, a plurality of minimum bet units (25 cents, 1 dollar, and 10 dollars) are set. A player can bet coins in an amount corresponding to a natural number multiple (e.g. 25 cents, 50 cents, 75 cents, etc.) of one of the minimum bet units (e.g. 25 cents) set in the gaming machine 1.

The external control device 200 includes a minimum bet unit input device 245. A manager of the casino can operate the minimum bet unit input device 245 to change the minimum bet unit in the gaming machine 1.

The external control device 200 corresponds to the server of the present invention. The minimum bet unit input device 245 corresponds to the input device of the present invention.

Hereinafter, a description is given on the course of the change of the minimum bet unit in the gaming machine 1 after the minimum bet unit input device 245 is operated.

A manger of the casino can operate the minimum bet unit input device 245 to select one of the plurality of minimum bet units (25 cents, 1 dollar, and 10 dollars). In FIG. 1, 1 dollar is selected.

On accepting an input for selecting a minimum bet unit, the external control device 200 transmits a minimum-bet-unit change signal to the gaming machine 1. The minimum-bet-unit change signal includes minimum bet unit information. The minimum bet unit information indicates the selected minimum bet unit.

On receiving the minimum-bet-unit change signal, the minimum bet unit is changed in the gaming machine 1 on which a player does not play a game (when the number of credits is zero in the present embodiment). Here, the minimum bet unit in the gaming machine is changed to the minimum bet unit indicated by the minimum bet unit information (information indicative of "1 dollar" in FIG. 1) included in the minimum-bet-unit change information. In FIG. 1, the minimum bet unit is changed from 25 cents to 1 dollar, On the other hand, when a player plays a game on that gaming machine 1 (when the number of credits is not zero in the present embodiment), the minimum bet unit is changed only after the player stop playing the game (when the number of credits is zero).

The state where a player does not play a game on the gaming machine 1 (the state where the number of credits is zero in the present embodiment) corresponds to the change state of the present invention.

In FIG. 1, the CPU 241 in the external control device 200 constitutes the processor of the present invention. In addition, a main CPU 71 included in the gaming machine 1 constitutes the controller of the present invention.

A minimum-bet-unit change flag is set in a RAM 73 (not illustrated in FIG. 1) included in the gaming machine 1 when the gaming machine 1 receives the minimum-bet-unit change signal.

The minimum-bet-unit change flag is a flag for changing the minimum bet unit on condition that a player does not play a game on the gaming machine 1. The minimum-bet-unit change flag will be described later in detail.

There has been described the outline of the first embodiment of the present invention.

Hereinafter, the first embodiment is described in more detail.

[Explanation of Function Flow Diagram]

Figure 2:
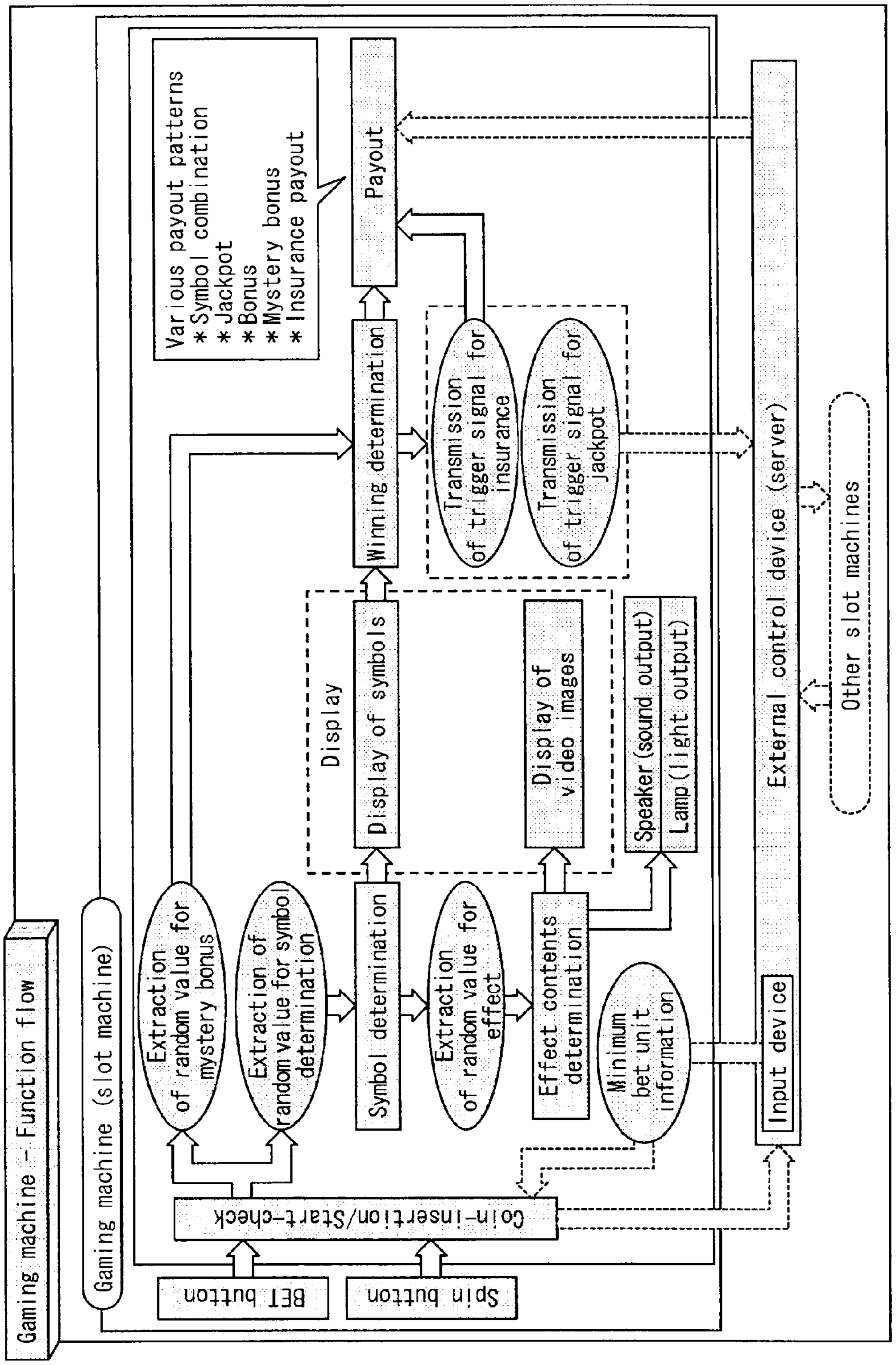
FIG. 2 is a view illustrating a function flow of a gaming machine according to the embodiment of the present invention.

With reference to FIG. 2, basic functions of a gaming machine according to the present embodiment are described.

FIG. 2 is a view illustrating a function flow of the gaming machine according to an embodiment of the present invention.

<Coin-Insertion/Start-Check>

First, the gaming machine checks whether or not a BET button has been pressed by a player. When determining that a player has pressed a BET button, the gaming machine calculates a bet amount based on the type of the pressed BET button and the minimum bet unit information, and then subtracts the value corresponding to the bet amount from the number of credits. The minimum bet unit information is transmitted from the external control device and indicates the minimum bet unit selected by using the input device provided in the external control device.

Subsequently, the gaming machine checks whether or not a spin button has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

Further, when a combination of symbols related to a bonus game trigger has been displayed, the gaming machine starts a bonus game. It is to be noted that, in the present embodiment, a game (free game) in which a lottery relating to the aforementioned determination of to-be stopped symbols is held a predetermined number of times without using coins is played as a bonus game.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine.

In each game, the gaming machine calculates the amount (amount for accumulation) to be accumulated to the amount of jackpot and transmits the amount to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus trigger by lottery.

The insurance is a function provided for a purpose of relieving the player from a situation in which a bonus game has not been played for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games. The gaming machine conducts a payout of coins of the amount that is set for the insurance, when the number of counted games has reached a previously determined number of times without a large amount of payout relating to a bonus game or the like being conducted.

<Determination of Effects>

The gaming machine produces effects by displaying images on the display, outputting the light from lamps, and outputting sounds from speakers. The gaming machine extracts a random value for effect and determines contents of the effects based on the symbols and the like determined by lottery.

[Overall Game System]

The basic functions of the gaming machine have been described above. Next, with reference to FIG. 3, a game system including the gaming machine is described.

Figure 3:
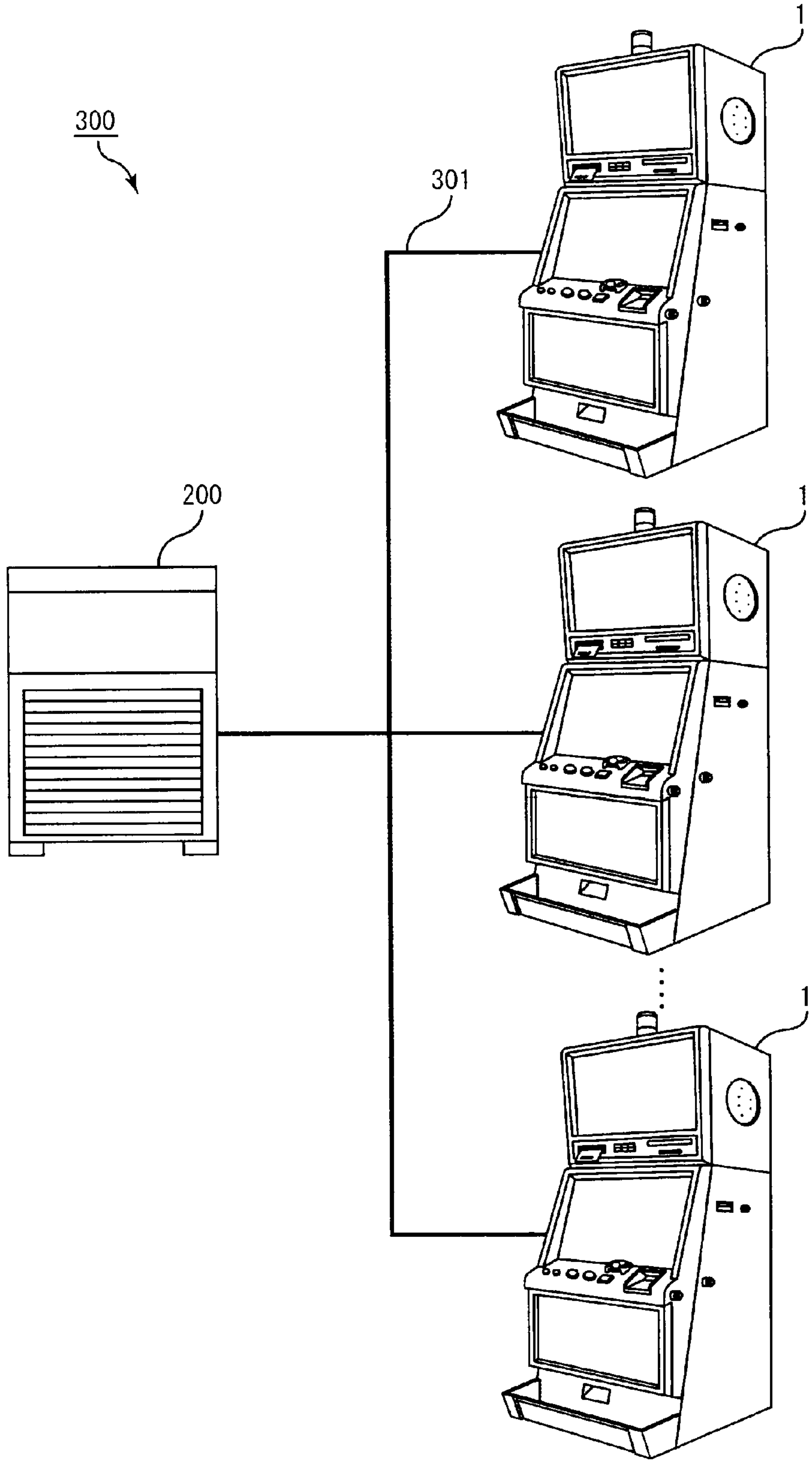
FIG. 3 is a view illustrating a gaming system including the gaming machine according to the embodiment of the present invention.

FIG. 3 is a view illustrating the game system including the gaming machine according to the embodiment of the present invention.

A game system 300 includes a plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Information indicative of the identification numbers corresponds to the identification information of the present invention.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 maybe a wired or wireless line, and can adopt a dedicated line, an exchange line or the like.

[Overall Configuration of Gaming Machine]

The game system according to the present embodiment has been described above. Next, with reference to FIG. 4, an overall configuration of the gaming machine 1 is described.

Figure 4:
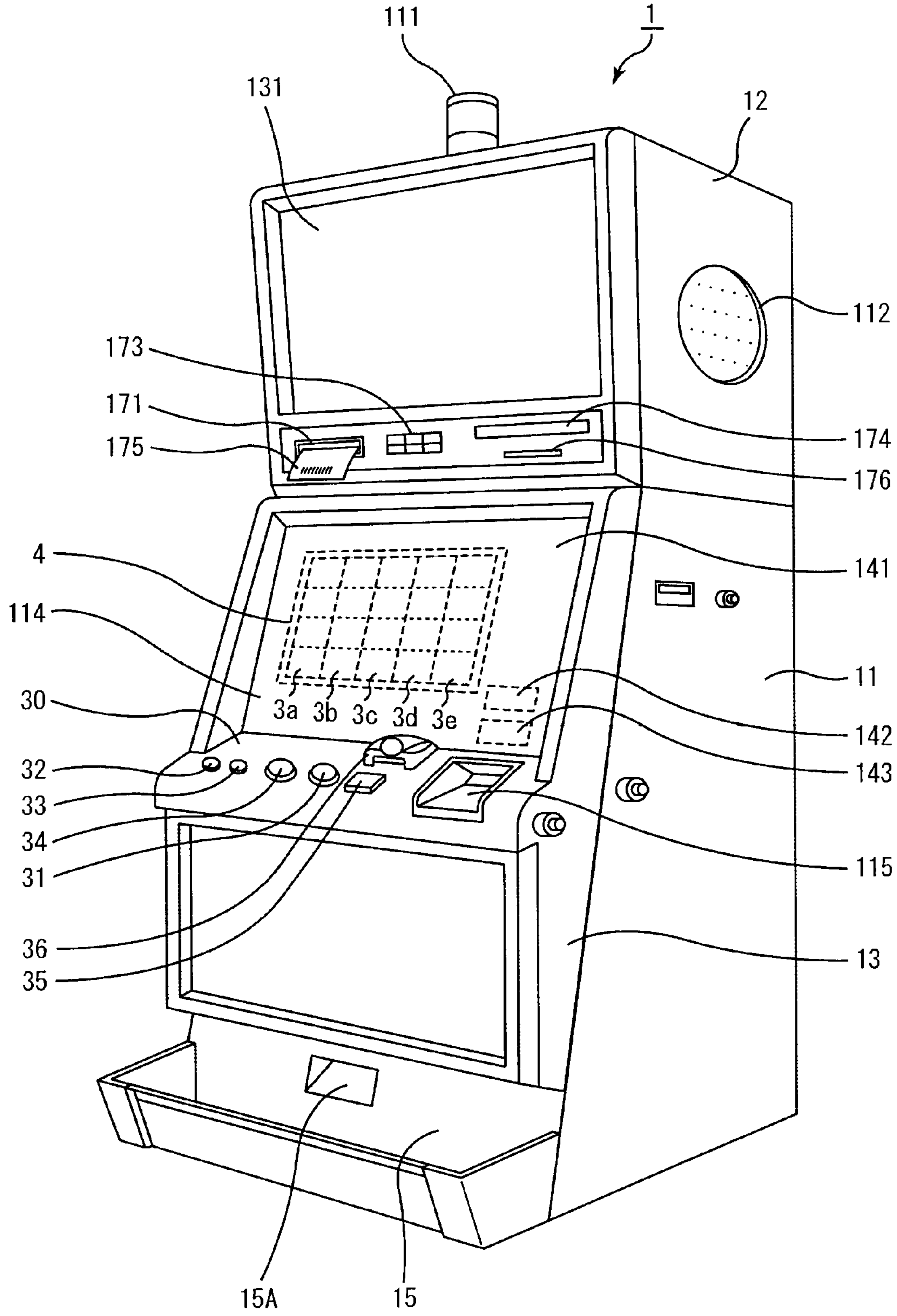
FIG. 4 is a view illustrating an overall configuration of the gaming machine according to the embodiment of the present invention.

FIG. 4 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. To the symbol display region 4, five video reels 3 (3*a*, 3*b*, 3*c*, 3*d*, 3*e*) are displayed.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 in the present embodiment) of symbols is assigned (see FIG. 5 which is described later).

In the symbol display region 4, the symbol arrays assigned to the respective video reels 3 are separately scrolled, and are stopped after predetermined time has elapsed. As a result, a part (four consecutive symbols in the present embodiment) of each of the symbol arrays is displayed for the player.

The symbol display region 4 has four regions, namely an upper region, an upper central region, a lower central region, and a lower region, for each video reel 3, and a single symbol is to be displayed to each region. That is, 20 (=5 columns×4 symbols) symbols are to be displayed in the symbol display region 4.

In the present embodiment, a line formed by selecting one of the aforementioned four regions for each of the video reels 3 and connecting the respective regions is referred to as a winning line.

It is to be noted that any desired shape of the winning line can be adopted, and examples of the shape of the winning line may include a straight line formed by connecting the upper central regions for the respective video reels 3, a V-shaped line, and a bent line. Also, any desired number of lines can be adopted, and the number can be for example 30 lines.

Further, the lower image display panel 141 has a number-of-credits display region 142 and a number-of-payouts display region 143. The number-of-credits display region 142 displays the number of coins (hereinafter also referred to as "the number of credits") owned by the player and retained inside the gaming machine 1. The number-of-payouts display region 143 displays the number of coins (hereinafter also referred to as "the number of payouts") to be paid out to the player when winning is established.

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the number of BETs") to be used in the game from the coins retained inside the gaming machine 1. The 1-BET button 34 is used when determining one coin at a time for the aforementioned number of BETs. The maximum BET button 35 is used when setting the aforementioned number of BETs to a defined upper limit number.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIG. 5, a configuration of the symbol arrays included in the video reels 3 of the gaming machine 1 is described.

FIG. 5 is a view illustrating arrangement of symbols that are drawn on the peripheral surfaces of the reels of the gaming machine according to the embodiment of the present invention.

A first video reel 3*a*, a second video reel 3*b*, a third video reel 3*c*, a fourth video reel 3*d*, and a fifth video reel 3*e* each is assigned with a symbol array consisting of 22 symbols that correspond to respective code numbers from “00” to “21”.

Types of the symbols provided are “JACKPOT 7”, “BLUE 7”, “BELL”, “CHERRY”, “STRAWBERRY”, “PLUM”, “ORANGE” and “APPLE”.

[Configuration of Circuit Included in Gaming Machine]

The configuration of the symbol arrays included in the video reels 3 of the gaming machine 1 has been described above. Next, with reference to FIG. 6, a configuration of a circuit included in the gaming machine 1 is described.

Figure 6:
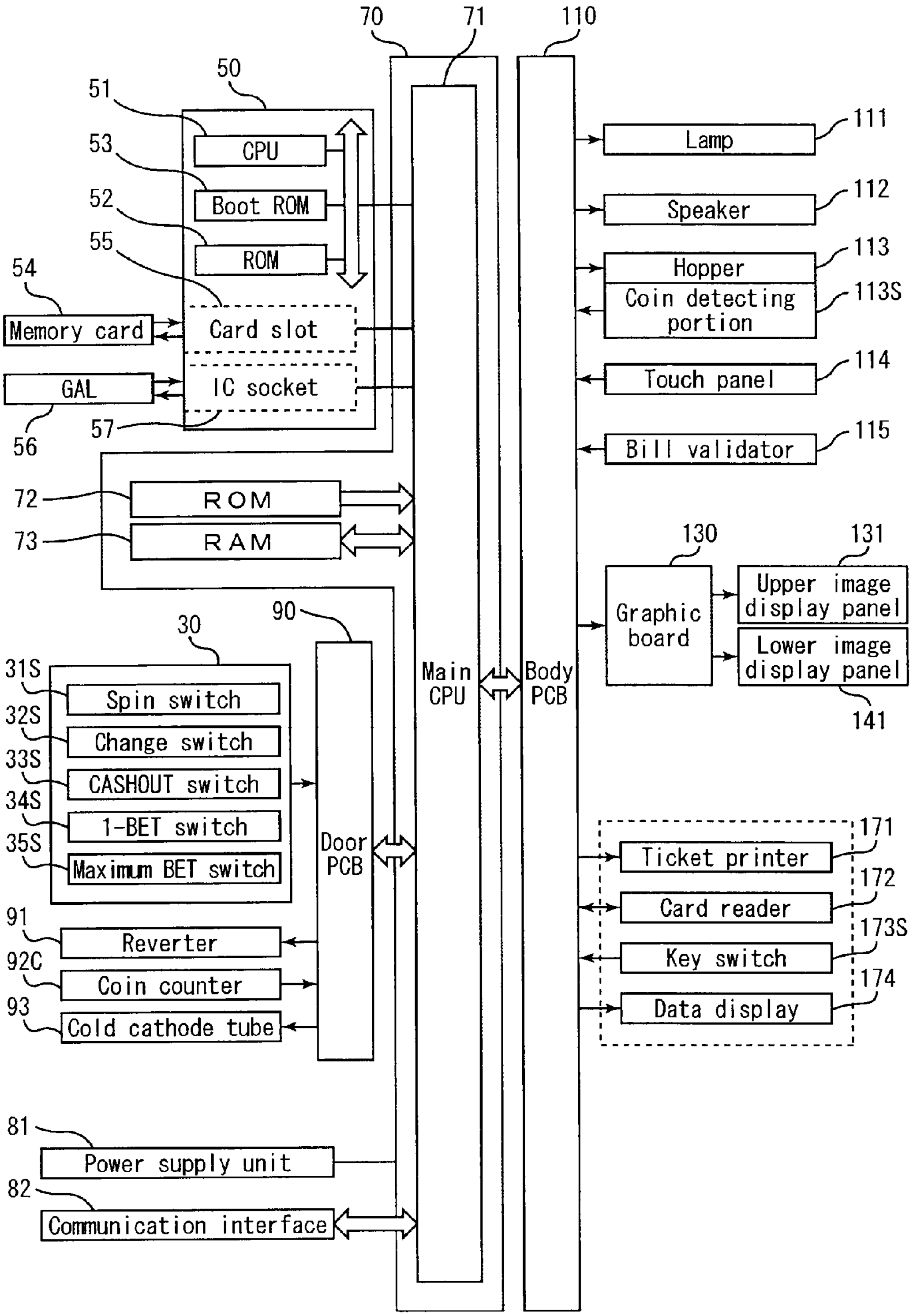
FIG. 6 is a block diagram illustrating an internal configuration of the gaming machine according to the embodiment of the present invention.

FIG. 6 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 9 to 18 which are described later). Further, the aforementioned game program includes data (see FIG. 5) specifying the configuration of the symbol array assigned to each video reel 3.

The lottery program is a program for determining to-be stopped symbol of each video reel 3 by lottery. The to-be stopped symbol is data for determining four symbols to be displayed to the symbol display region 4 out of the 22 symbols forming each symbol array. The gaming machine 1 of the present embodiment determines as the to-be stopped symbol the symbol to be displayed in a predetermined region (e.g. the upper region) out of the four regions provided for each of the video reels 3 of the symbol display region 4.

The aforementioned lottery program includes symbol determination data. The symbol determination data is data that specifies random values so that each of the 22 symbols (code numbers from “00” to “21”) forming the symbol array is determined at an equal probability (i.e. 1/22), for each video reel 3.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3*a* includes one symbol of “JACKPOT 7”, and includes seven symbols of “ORANGE”. Hence, the former is determined at the probability of “1/22”, whereas the latter is determined at the probability of “7/22”.

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3a may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82. In the present embodiment, a single CPU called main CPU 71 constitutes the controller. However, the controller of the present invention may include a plurality of CPUs.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the number of BETs, the number of payouts, the number of credits and the like; and an area that stores symbols (code numbers) determined by lottery.

In addition, the RAM 73 is provided with a minimum bet unit information storage area. The minimum bet unit information storage area stores the minimum bet unit information. In the present embodiment, coins are betted in an amount calculated based on the minimum bet unit information stored in the minimum bet unit information storage area and the type of the BET button pressed by the player.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71 a signal corresponding to the detected place. Upon acceptance of a valid bill, the bill validator 115 outputs to the main CPU 71 a signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like. The number-of-credits display region 142 of the lower image display panel 141 displays the number of credits stored in the RAM 73. The number-of-payouts display region 143 of the lower image display panel 141 displays the number of payouts of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Configuration of Symbol Combination Table]

The circuit configuration of the gaming machine 1 has been described above. Next, with reference to FIG. 7, a symbol combination table is described.

FIG. 7 is a view illustrating a symbol combination table of the gaming machine according to the embodiment of the present invention.

The symbol combination table specifies combinations of drawn symbols relating to winning, and the number of payouts. On the gaming machine 1, the scrolling of symbol arrays of the respective video reels 3 is stopped, and winning is established when the combination of symbols displayed along the winning line matches one of the combinations of symbols specified by the symbol combination table. According to the winning combination, a benefit such as payout of coins or start of a bonus game is offered to the player. It is to be noted that winning is not established (i.e. the game is lost) when the combination of symbols displayed along the winning line does not match any of the combinations of symbols specified by the symbol combination table.

Basically, winning is established when all symbols displayed along the winning line by the respective video reels 3 are of one type out of "JACKPOT 7", "APPLE", "BLUE 7", "BELL", "CHERRY", "STRAWBERRY", "PLUM" and "ORANGE". However, with respect to the respective types of symbols of "CHERRY" and "ORANGE", winning is also established when one or three symbols of either type are displayed along the winning line by the video reels 3.

For example, when all the symbols displayed along the winning line by all the video reels 3 are "BLUE 7", the winning combination is "BLUE", and "10" is determined as the number of payouts. Based on the determined number of payouts, payout of coins is conducted. The payout of coins is conducted by actually discharging coins from the coin payout exit 15A or adding the determined number of payouts to the number of credits, or issuing a ticket with a barcode.

"JACKPOT 7" is a symbol concerning the jackpot trigger. When all the symbols displayed along the winning line by all the video reels 3 are "JACKPOT 7", the winning combination is "jackpot", and the amount of jackpot is determined as the number of payouts.

"APPLE" is a symbol concerning the bonus game trigger. When all the symbols displayed along the winning line by all the video reels 3 are "APPLE", the winning combination is "bonus game trigger", and bonus games start from the next game.

[Configuration of the Circuit in the External Control Device]

The symbol combination table has been described above.

Next, the configuration of the circuit in the external control device 200 is described with reference to FIG. 8.

Figure 8:
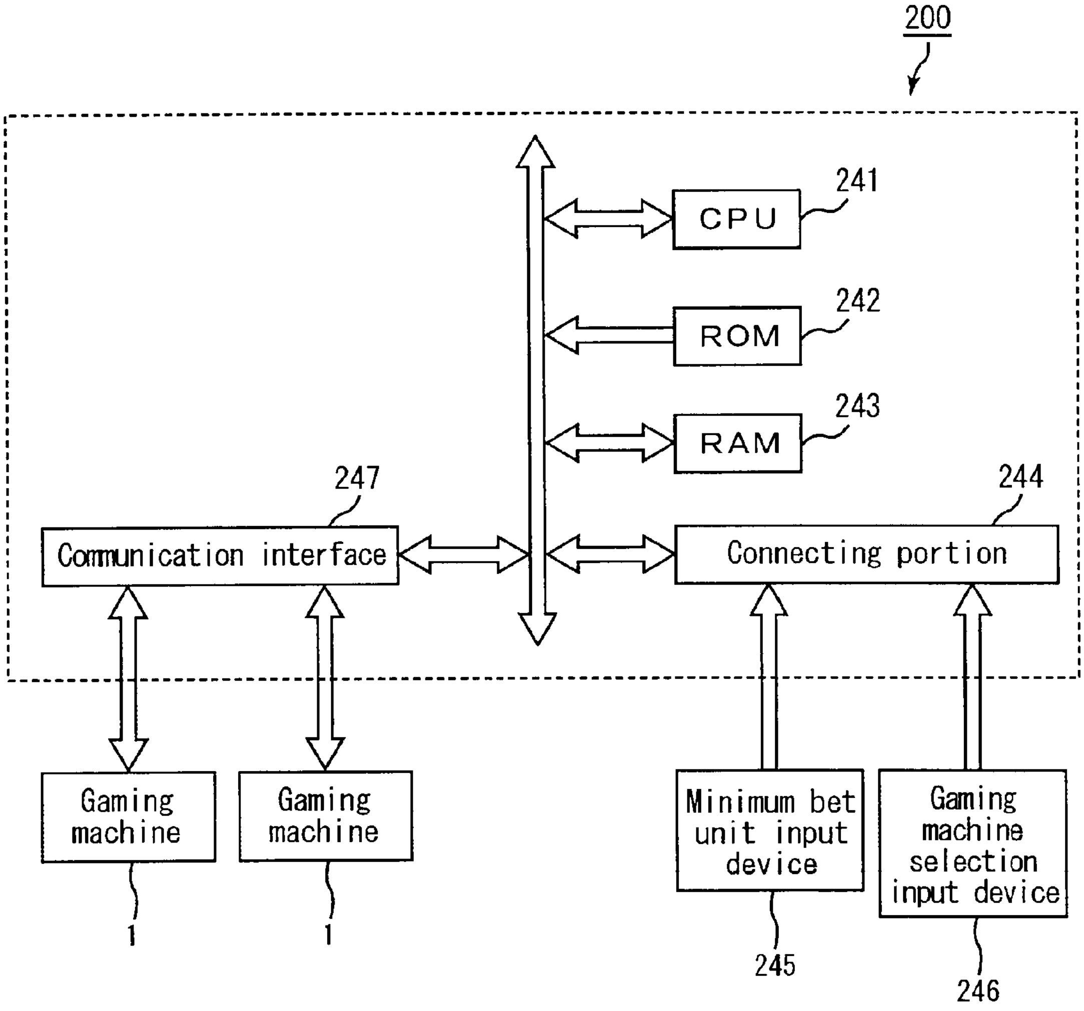
FIG. 8 is a block diagram illustrating an internal configuration of an external control device according to the embodiment of the present invention.

FIG. 8 is a block diagram illustrating an internal configuration of an external control device according to the embodiment of the present invention.

The external control device 200 is provided with a CPU 241, a ROM 242, a RAM243, a connecting portion 244, and a communication interface 247.

In the present embodiment, a single CPU called main CPU 241 constitutes the processor. However, the controller of the present invention may include a plurality of CPUs.

The communication interface 247 is connected to the communication interfaces 82 in the plurality of gaming machines 1 via communication lines 301. The ROM 242 stores a system program for controlling the operation of the external control device 200, permanent data, and the like. The RAM 243 temporarily stores the minimum bet unit information indicative of the minimum bet unit selected by using the minimum bet unit input device 245, the identification information indicative of the identification numbers of the gaming machines 1 selected by using a gaming machine selection input device 246, and the like.

The connecting portion 244 is connected with the minimum bet unit input device 245 and the gaming machine selection input device 246. When the gaming machine 1 is selected, the minimum bet unit input device 245 outputs a signal corresponding to the selected minimum bet unit. In addition, a manager of the casino can select the gaming machine 1 to change its minimum bet unit out of a plurality of gaming machines 1 installed in the casino. When a gaming machine 1 is selected, the gaming machine selection input device 246 outputs a signal corresponding to the selected gaming machine 1. The minimum bet unit input device 245 and the gaming machine selection input device 246 constitute the input device of the present invention.

[Contents of Program]

There has been described the configuration of the circuit in the external control device 200.

Next, with reference to FIGS. 9 to 18, the program to be executed by the gaming machine 1 is described.

<Main Control Processing>

Figure 9:
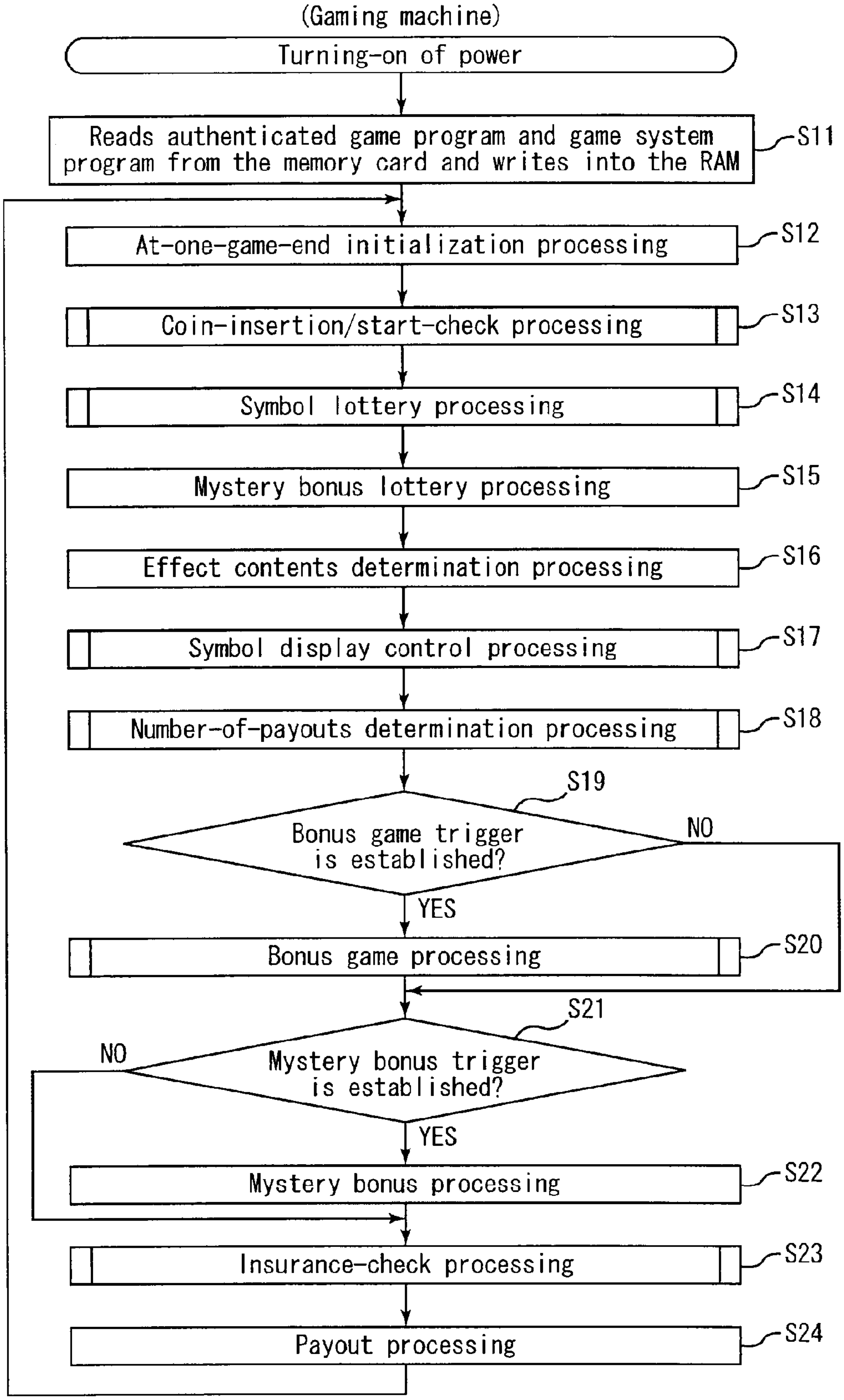
FIG. 9 is a view illustrating a flowchart of main control processing for the gaming machine according to the embodiment of the present invention.

First, with reference to FIG. 9, main control processing is described.

FIG. 9 is a view illustrating a flowchart of the main control processing for the gaming machine according to the embodiment of the present invention.

First, when the power is supplied to the gaming machine 1, the main CPU 71 reads the authenticated game program and game system program from the memory card 54 through the gaming board 50, and writes the programs into the RAM 73 (step S11).

Then, the main CPU 71 stores the minimum bet unit information stored in the memory card 54 into the minimum bet unit information storage area in the RAM 73 (step S25).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 9 (step S13). In the processing, input from the BET switch and the spin switch is checked.

The main CPU 71 then conducts symbol lottery processing which is described later with reference to FIG. 12 (step S14). In the processing, to-be stopped symbols are determined based on the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 71 extracts a random value for effect, and determines any of the effect contents from the preset plurality of effect contents by lottery.

The main CPU 71 then conducts symbol display control processing which is described later with reference to FIG. 13 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective upper central region, lower central region and lower region in the symbol display region 4.

Next, the main CPU 71 conducts number-of-payouts determination processing which is described later with reference to FIG. 14 (step S18). In the processing, the number of payouts is determined based on the combination of symbols displayed along a winning line, and is stored into a number-of-payouts storage area provided in the RAM 73.

The main CPU 71 then determines whether or not the bonus game trigger has been established (step S19). When the main CPU 71 determines that the bonus game trigger has been established, the main CPU 71 conducts bonus game processing which is described later with reference to FIG. 16 (step S20).

After the processing of step S20 or when determining in step S19 that the bonus game trigger has not been established, the main CPU 71 determines whether or not the mystery bonus trigger is established (step S21). When determining that the mystery bonus trigger has been established, the main CPU 71 conducts the mystery bonus processing (step S22). In the processing, the number of payouts (e.g. 300) being set for the mystery bonus is stored into the number-of-payouts storage area provided in the RAM 73.

After the processing of step S22 or when determining in step S21 that the mystery bonus trigger has not been established, the main CPU 71 conducts insurance-check processing which is described later with reference to FIG. 15 (step S23). In the processing, whether or not to conduct payout by the insurance is checked.

The main CPU 71 conducts payout processing (step S24). The main CPU 71 adds the value stored in the number-of-payouts storage area to the value in a number-of-credits storage area provided in the RAM 73. It is to be noted that operations of the hopper 113 may be controlled based on input from the CASHOUT switch 33S, and coins of the number corresponding to the value stored in the number-of-payouts storage area may be discharged from the coin payout exit 15A. Further, operations of the ticket printer 171 may be controlled and a ticket with a barcode may be issued on which a value stored in the number-of-payouts storage area is recorded. After the processing has been conducted, the processing is shifted to step S12.

<Coin-Insertion/Start-Check Processing>

Next, coin-insertion/start-check processing is described with reference to FIG. 10.

Figure 10:
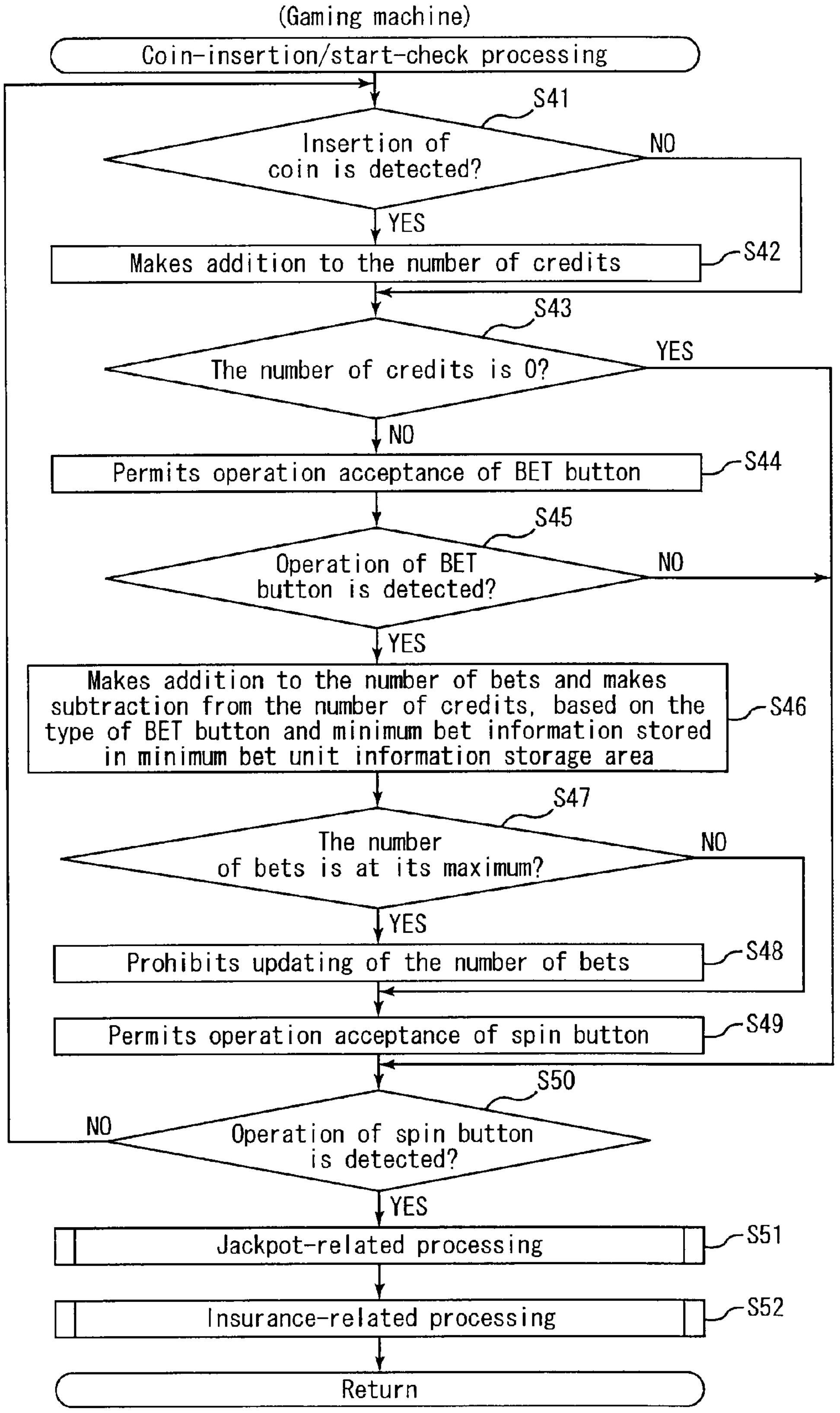
FIG. 10 is a flowchart illustrating coin-insertion/start-check processing for the gaming machine according to the embodiment of the present invention.

FIG. 10 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When determining that the insertion of a coin has been detected by the coin counter 92C, the main CPU 71 makes an addition to the value stored in the number-of-credits storage area (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the value stored in the number-of-credits storage area.

After step S42 or when determining in step S41 that the insertion of a coin has not been detected, the main CPU 71 determines whether or not the value stored in the number-of-credits storage area is zero (step S43). When the main CPU 71 determines that the value stored in the number-of-credits storage area is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to the value stored in a number-of-BETs storage area provided in the RAM 73 and makes a subtraction from the value stored in the number-of-credits storage area, based on the type of the BET button and the minimum bet unit information stored in the minimum bet unit information storage area (step S46).

The main CPU 71 then determines whether or not the value stored in the number-of-BETs storage area is at its maximum (step S47). When the main CPU 71 determines that the value stored in the number-of-BETs storage area is at its maximum, the main CPU 71 prohibits updating of the value stored in the number-of-BETs storage area (step S48). After step S48 or when determining in step S47 that the value stored in the number-of-BETs storage area is not at its maximum, the main CPU 71 permits operation acceptance of the spin button (step S49).

After step S49 or when determining in step S45 that the operation of any of the BET buttons has not been detected, or when determining in step S43 that the value stored in the number-of-credits storage area is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 conducts jackpot-related processing which is described later with reference to FIG. 11 (step S51). In the processing, the amount to be accumulated to the amount of jackpot is calculated, and the amount is transmitted to the external control device 200.

Next, the main CPU 71 conducts insurance-related processing which is described later with reference to FIG. 12 (step S52). In the processing, counting of the number of games is conducted which triggers a payout by the insurance. After the processing has been conducted, the coin-insertion/start-check processing is completed.

<Jackpot-Related Processing>

Figure 11:
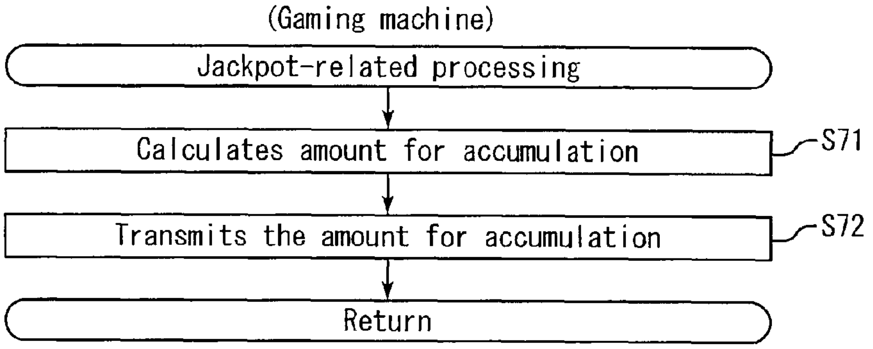
FIG. 11 is a view illustrating a flowchart of jackpot-related processing for the gaming machine according to the embodiment of the present invention.

Now, with reference to FIG. 11, the jackpot-related processing is described.

FIG. 11 is a view illustrating a flowchart of the jackpot-related processing for the gaming machine according to the embodiment of the present invention.

First, the main CPU 71 calculates the amount for accumulation (step S71). The main CPU 71 obtains the product of the value stored in the number-of-BETs storage area and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 12:
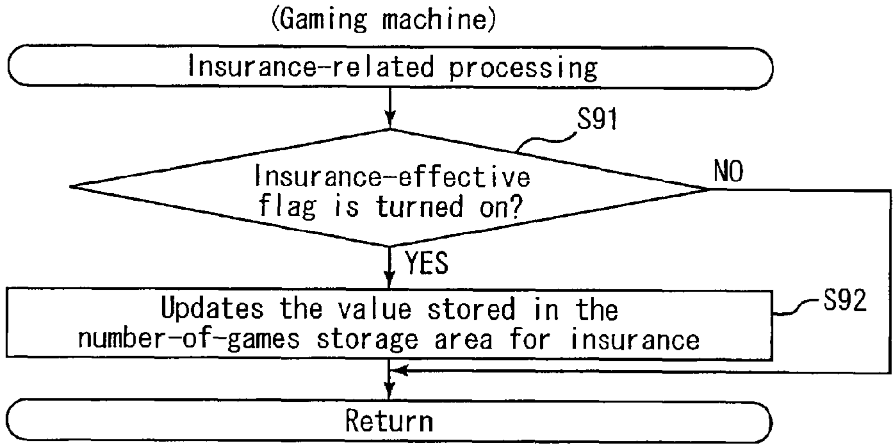
FIG. 12 is a view illustrating a flowchart of insurance-related processing for the gaming machine according to the embodiment of the present invention.

Next, with reference to FIG. 12, the insurance-related processing is described.

FIG. 12 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 18.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates the value stored in a number-of-games storage area for insurance provided in the RAM 73 (step S92). The number-of-games storage area for insurance is an area for storing the number of games up to the time of the payout by the insurance. In the processing of step S92, the main CPU 71 adds one to the value stored in the number-of-games storage area for insurance. After the processing has been conducted, the insurance-related processing is completed.

<Symbol Lottery Processing>

Figure 13:
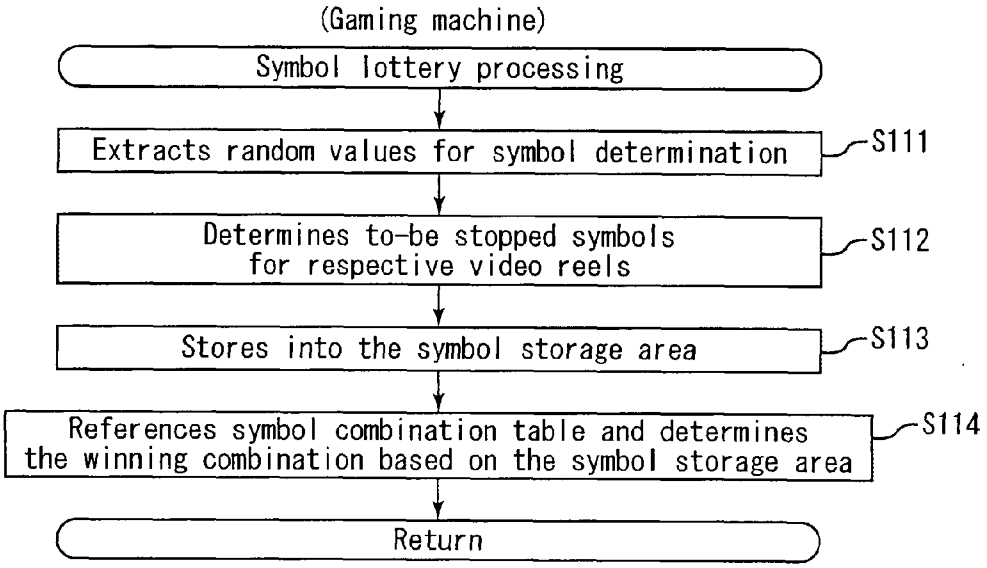
FIG. 13 is a view illustrating a flowchart of symbol lottery processing for the gaming machine according to the embodiment of the present invention.

Next, with reference to FIG. 13, the symbol lottery processing is described.

FIG. 13 is a view illustrating a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, each of the 22 symbols (code numbers from "00" to "21") is determined at an equal probability (i.e. 1/22).

The main CPU 71 then stores the determined to-be stopped symbols for the respective video reels 3 into a symbol storage area provided in the RAM 73 (step S113). Next, the main CPU 71 references the symbol combination table (FIG. 7) and determines a winning combination based on the symbol storage area (step S114). The main CPU 71 determines whether or not the combination of symbols to be displayed along the winning line by the respective video reels 3 matches any of the combinations of symbols specified by the symbol combination table, and determines the winning combination. After the processing has been conducted, the symbol lottery processing is completed.

<Symbol Display Control Processing>

Figure 14:
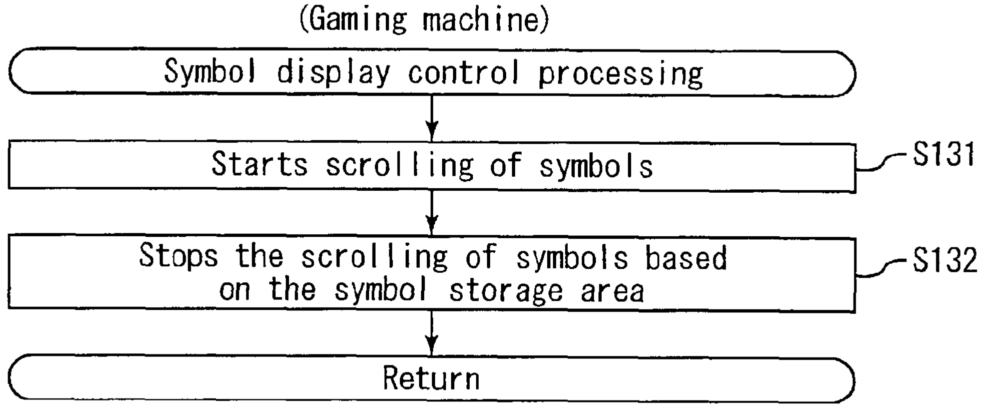
FIG. 14 is a view illustrating a flowchart of symbol display control processing for the gaming machine according to the embodiment of the present invention.

Next, with reference to FIG. 14, the symbol display control processing is described.

FIG. 14 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131). The main CPU 71 then stops the scrolling of the symbol arrays of the respective video reels 3, based on the aforementioned symbol storage area (step S132). After the processing has been conducted, the symbol display control processing is completed.

<Number-of-Payouts Determination Processing>

Figure 15:
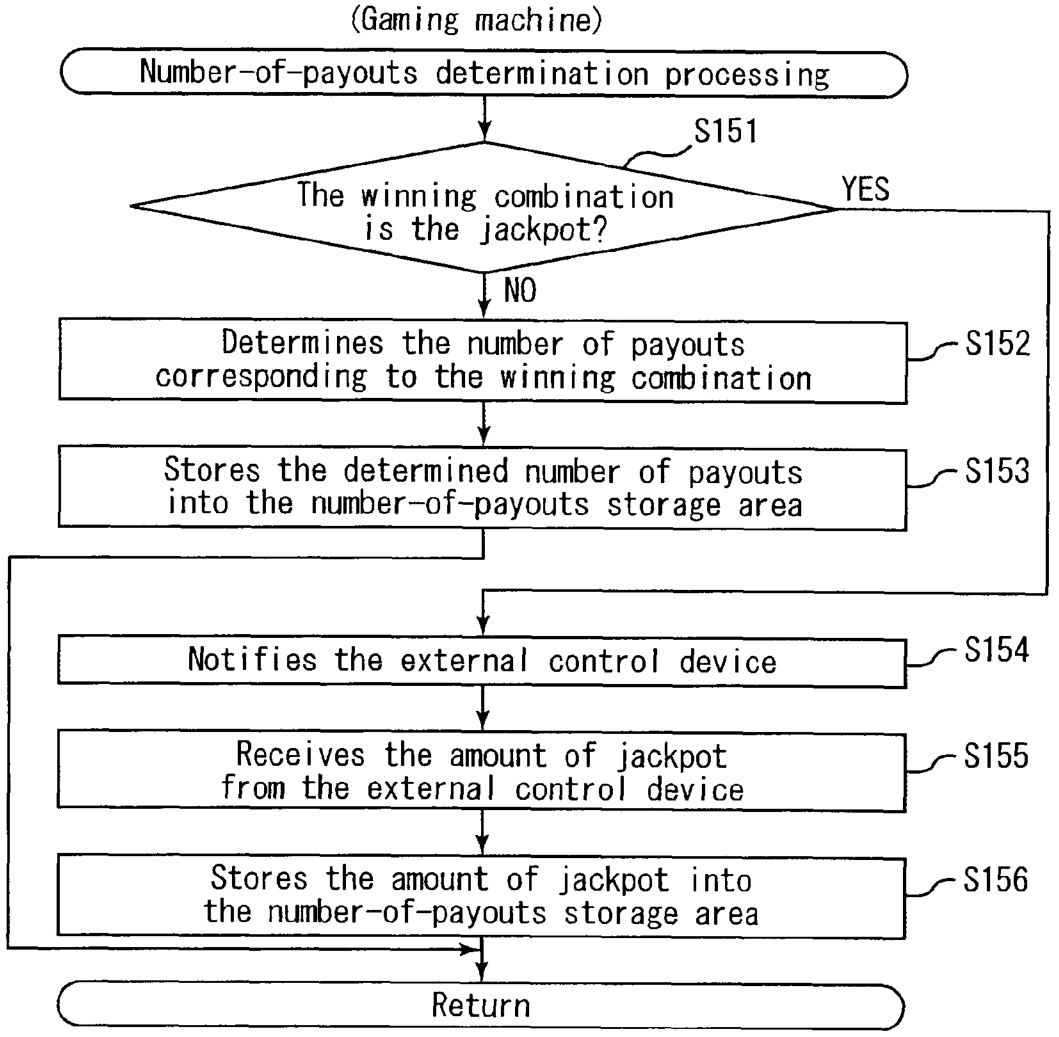
FIG. 15 is a view illustrating a flowchart of number-of-payouts determination processing for the gaming machine according to the embodiment of the present invention.

Next, with reference to FIG. 15, the number-of-payouts determination processing is described.

FIG. 15 is a view illustrating a flowchart of the number-of-payouts determination processing for the gaming machine according to the embodiment of the present invention.

The main CPU 71 first determines whether or not the winning combination is the jackpot (step S151). When the main CPU 71 determines that the winning combination is not the jackpot, the main CPU 71 determines the number of payouts corresponding to the winning combination (step S152). For example, when the winning combination is "BELL", the main CPU 71 determines "8" as the number of payouts (see FIG. 7). It is to be noted that the main CPU 71 determines "0" as the number of payouts in the case where the game is lost. Next, the main CPU 71 stores the determined number of payouts into the number-of-payouts storage area (step S153). After the processing has been conducted, the number-of-payouts determination processing is completed.

When the main CPU 71 determines that the winning combination is the jackpot, the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot maybe the payout subject and the rest (e.g. 20%) maybe carried over for the upcoming establishment of the jackpot trigger.

Next, the main CPU 71 receives the amount of jackpot from the external control device 200 (step S155). The main CPU 71 then stores the received amount of jackpot into the number-of-payouts storage area (step S156). After the processing has been conducted, the number-of-payouts determination processing is completed.

<Insurance-Check Processing>

Figure 16:
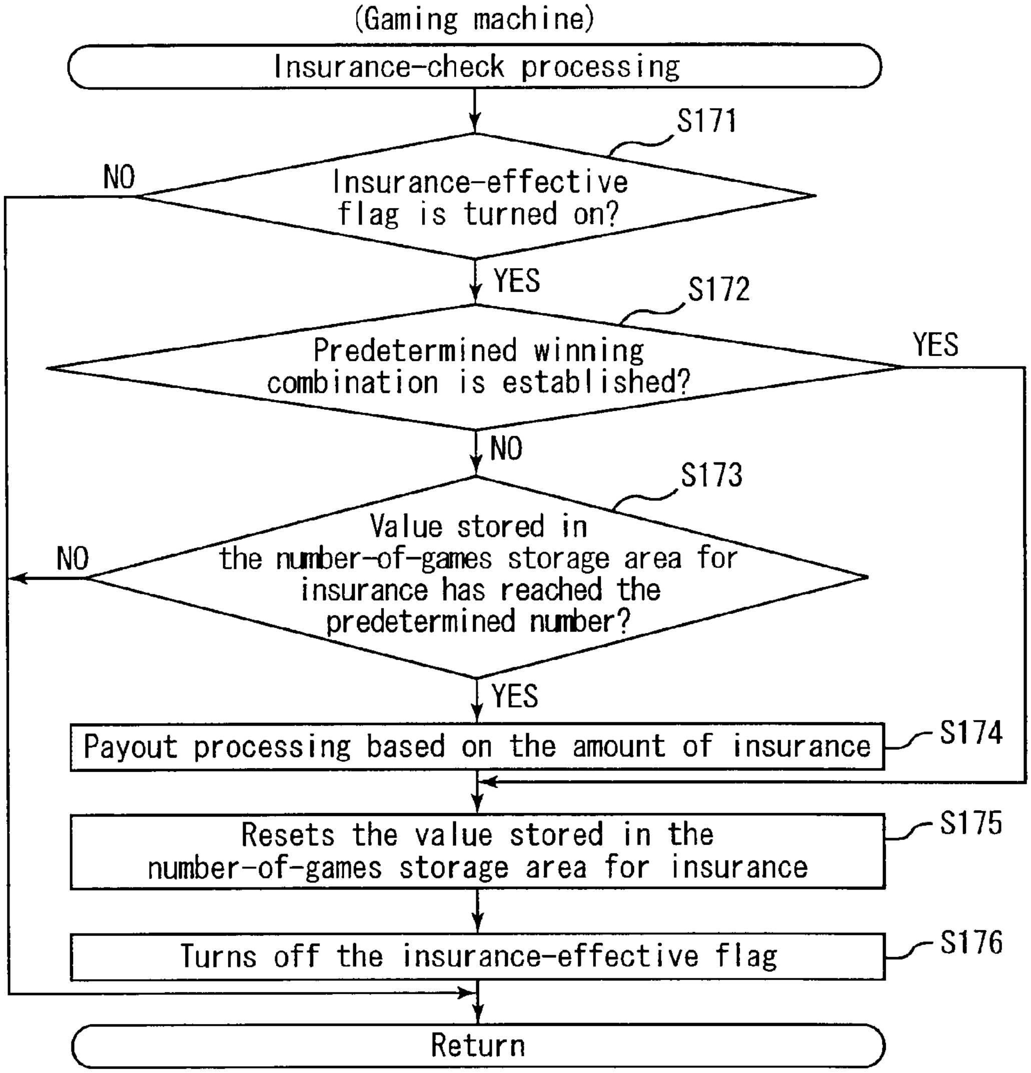
FIG. 16 is a view illustrating a flowchart of insurance-check processing for the gaming machine according to the embodiment of the present invention.

Next, with reference to FIG. 16, the insurance-check processing is described.

FIG. 16 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, "bonus game trigger", "jackpot" and "mystery bonus" are subjects of the predetermined winning combination.

When the main CPU 71 determines that the predetermined winning combination has not been established, the main CPU 71 determines whether or not the value stored in the number-of-games storage area for insurance has reached a predetermined number of times (e.g. 300) (step S173). When the main CPU 71 determines that the value stored in the number-of-games storage area for insurance has not reached the predetermined number of times, the main CPU 71 completes the insurance-check processing.

When the main CPU 71 determines that the value stored in the number-of-games storage area for insurance has reached the predetermined number of times, the main CPU 71 conducts payout processing based on the amount of insurance (step S174). The main CPU 71 adds an amount (e.g. 200) previously set as the amount of insurance to the value stored in the number-of-credits storage area.

After step S174 or when determining in step S172 that the predetermined winning combination has been established, the main CPU 71 resets the value stored in the number-of-games storage area for insurance (step S175). Next, the main CPU 71 turns the insurance-effective flag off (step S176). After the processing has been conducted, the insurance-check processing is completed.

<Bonus Game Processing>

Figure 17:
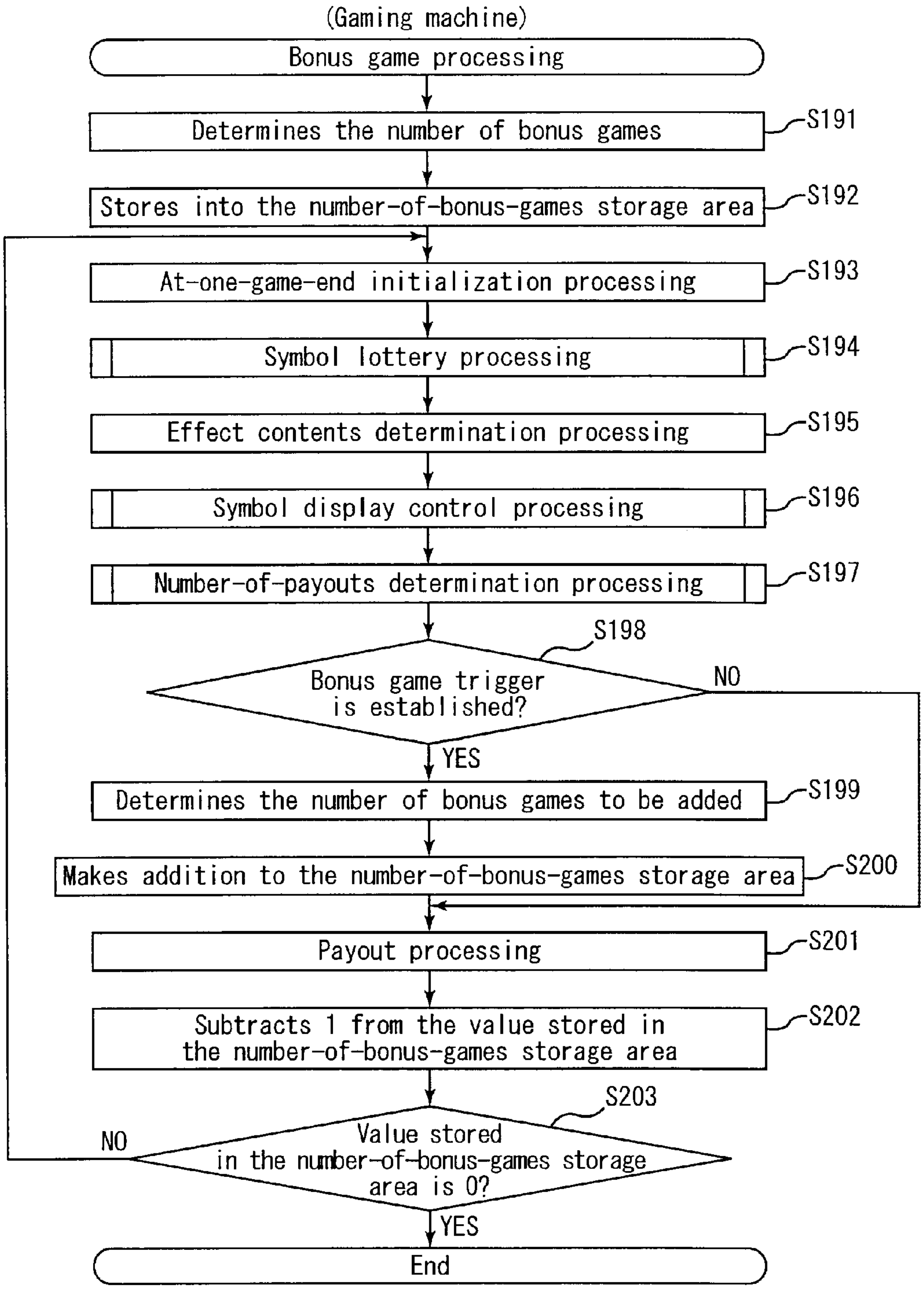
FIG. 17 is a view illustrating a flowchart of bonus game processing for the gaming machine according to the embodiment of the present invention.

Next, with reference to FIG. 17, the bonus game processing is described.

FIG. 17 is a view illustrating a flowchart of the bonus game processing for the gaming machine according to the embodiment of the present invention.

The main CPU 71 first determines the number of bonus games (step S191). The main CPU 71 extracts a random value for number-of-bonus-games determination, and determines any one of the various numbers of bonus games such as "50", "70" and "100" by lottery.

Next, the main CPU 71 stores the determined number of bonus games into a number-of-bonus-games storage area provided in the RAM 73 (step S192).

The main CPU 71 then conducts at-one-game-end initialization processing in the same way as the processing of step S12 described with reference to FIG. 9 (step S193). The main CPU 71 then conducts the symbol lottery processing described with reference to FIG. 13 (step S194). Then, the main CPU 71 conducts the effect contents determination processing in the same way as the processing of step S16 described with reference to FIG. 9 (step S195). Next, the main CPU 71 conducts the symbol display control processing described with reference to FIG. 14 (step S196). The main CPU 71 then conducts the number-of-payouts determination processing described with reference to FIG. 15 (step S197).

Next, the main CPU 71 determines whether or not the bonus game trigger has been established (step S198). When the main CPU 71 determines that the bonus game trigger has been established, the main CPU 71 determines the number of bonus games to be added (step S199). In the same way as the aforementioned processing of step S191, the main CPU 71 determines the number of bonus games. The main CPU 71 then adds the determined number of bonus games to the value stored in the number-of-bonus-games storage area (step S200).

After the processing of step S200 or when determining in step S198 that the bonus game trigger has not been established, the main CPU 71 conducts the payout processing (step S201). In the payout processing, the main CPU 71 adds the value stored in the number-of-payouts storage area in the number-of-payouts determination processing of step S197 to the value stored in a number-of-payouts storage area for bonus. The number-of-payouts storage area for bonus is for storing a total of the numbers of payouts determined during the bonus games.

When the bonus game processing has been completed, the main CPU 71 adds the value stored in the number-of-payouts storage area for bonus to the value stored in the number-of-credits storage area provided in the RAM 73, in the payout processing of step S24 described with reference to FIG. 8. That is, the total of the numbers of payouts determined during the bonus games is collectively paid out. Here, it is to be noted that coins may be discharged from the coin payout exit 15A, or a ticket with a barcode may be issued.

Next, the main CPU 71 subtracts one from the value stored in the number-of-bonus-games storage area (step S202). Next, the main CPU 71 determines whether or not the value stored in the number-of-bonus-games storage area is zero (step S203). When the main CPU 71 determines that the value stored in the number-of-bonus-games storage area is not zero, the main CPU 71 shifts the processing to step S193. On the other hand, when the main CPU 71 determines that the value stored in the number-of-bonus-games storage area is zero, the main CPU 71 completes the bonus game processing. When the bonus game processing has been completed, the processing is shifted to the processing of step S21 described with reference to FIG. 9.

<Insurance Selection Processing>

Figure 18:
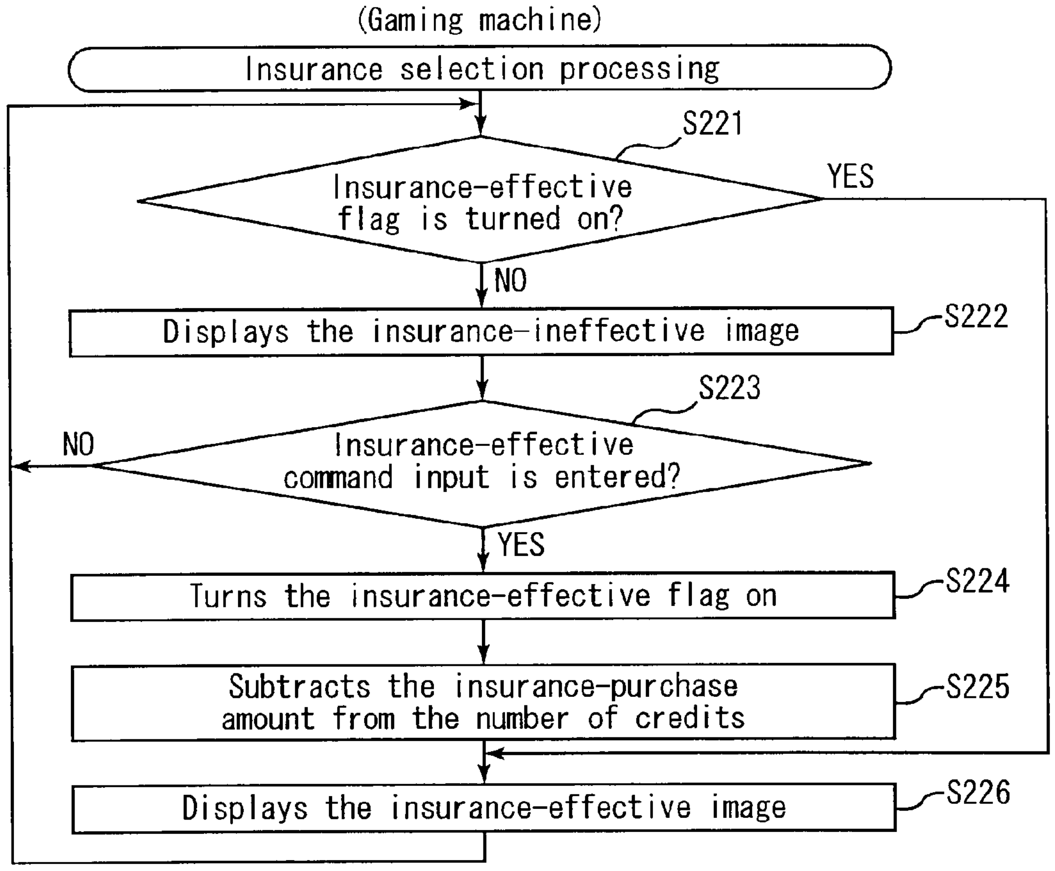
FIG. 18 is a view illustrating a flowchart of insurance selection processing for the gaming machine according to the embodiment of the present invention.

Next, with reference to FIG. 18, the insurance selection processing is described.

FIG. 18 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141.

As the insurance-ineffective image, for example, an image showing "INSURANCE BET $1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the value stored in the number-of-credits storage area (step S225). In the present embodiment, an amount corresponding to, for example, one dollar is subtracted from the value stored in the number-of-credits storage area. After step S225 or when determining in step S221 that the insurance-effective flag is turned on, the main CPU 71 displays the insurance-effective image (step S226).

As the insurance-effective image, for example, an image showing "INSURANCE CONTINUED WIN 200 CREDIT" is displayed. This image is an image informing the player that the insurance is effective, and that the value of "200" is to be added to the value stored in the number-of-credits storage area when the insurance condition is satisfied. After the processing has been conducted, the processing is shifted to step S221.

Next, processing for accepting the change of a minimum bet unit is described with reference to FIG. 19.

Figure 19:
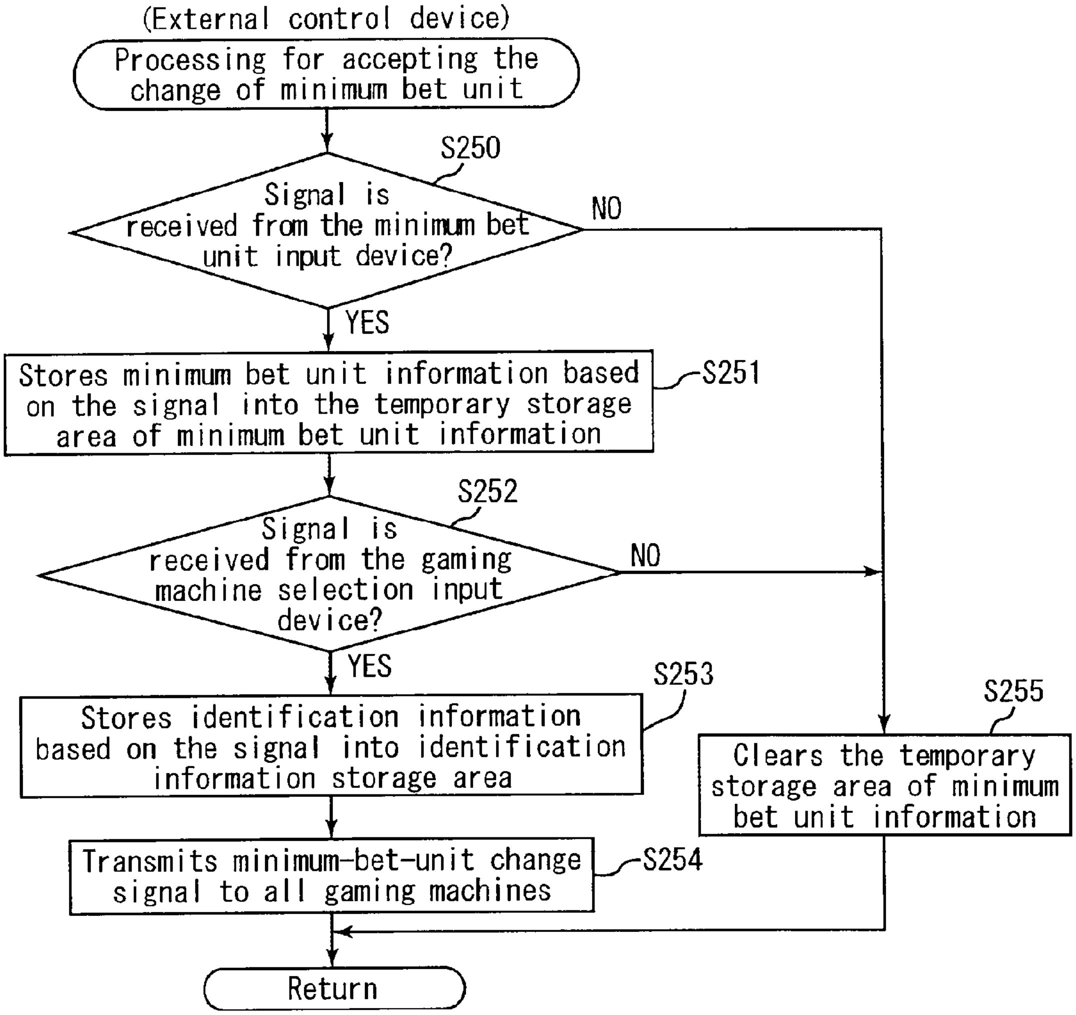
FIG. 19 is a view illustrating a flowchart of processing for accepting the change of a minimum bet unit executed by the external control device according to the first embodiment of the present invention.

FIG. 19 is a view illustrating a flowchart of processing for accepting the change of a minimum bet unit executed by the external control device according to the first embodiment of the present invention.

First, the CPU 241 determines at a predetermined timing whether or not it has received a signal to be transmitted when a minimum bet unit is selected by using the minimum bet unit input device 245 (minimum bet unit selection signal) (step S250). When determining that it has not received the minimum bet unit selection signal, the CPU 241 clears a temporary storage area of minimum bet unit information (step S255), and ends the present subroutine. The temporary storage area of minimum bet unit information is provided in the RAM 243 and stores the minimum bet unit information indicative of the minimum bet unit selected by using the minimum bet unit input device 245.

On the other hand, when determining that it has received the minimum bet unit selection signal, the CPU 241 stores the minimum bet unit information corresponding to the minimum bet unit selection signal, into the temporary storage area of minimum bet unit information (step S251).

Then, the CPU 241 determines whether or not it has received a signal to be transmitted when one of the gaming machines 1 is selected by using the gaming machine selection input device 246 (gaming machine selection signal) (step S252). When determining that it has not received the gaming machine selection signal, the CPU 241 clears the temporary storage area of minimum bet unit information (step S255) and ends the present subroutine.

On the other hand, when determining that it has received the gaming machine selection signal, the CPU 241 stores the identification information corresponding to the gaming machine selection signal into an identification information storage area(step S253).

Subsequently, the CPU 241 transmits a minimum-bet-unit change signal to all the gaming machines 1 connected to the external control device 200 (step S254).

The minimum-bet-unit change signal includes the minimum bet unit information stored in the RAM 243 in step S251 and the identification information stored in the RAM 243 in step S253.

After step S254, the CPU 241 ends the present subroutine.

As above described, the external control device 200 transmits the minimum-bet-unit change signal to all the gaming machines 1 when a minimum bet unit and a gaming machine 1 is selected in the external control device 200.

As above, the processing for accepting the change of a minimum bet unit has been described with reference to FIG. 19.

Next, processing for changing the minimum bet unit is described with reference to FIGS. 20 to 22.

Figure 20:
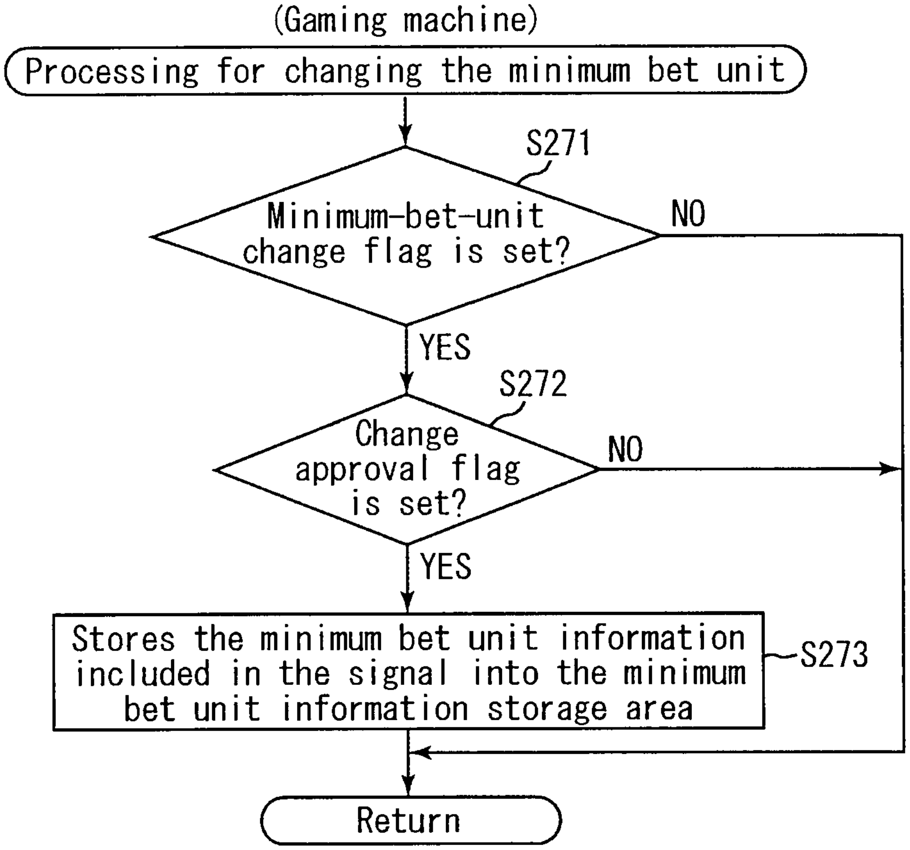
FIG. 20 is a view illustrating a flowchart of processing for changing the minimum bet unit executed by the gaming machine according to the first embodiment of the present invention.

FIG. 20 is a view illustrating a flowchart of processing for changing the minimum bet unit executed by the gaming machine according to the first embodiment of the present invention.

Figure 21:
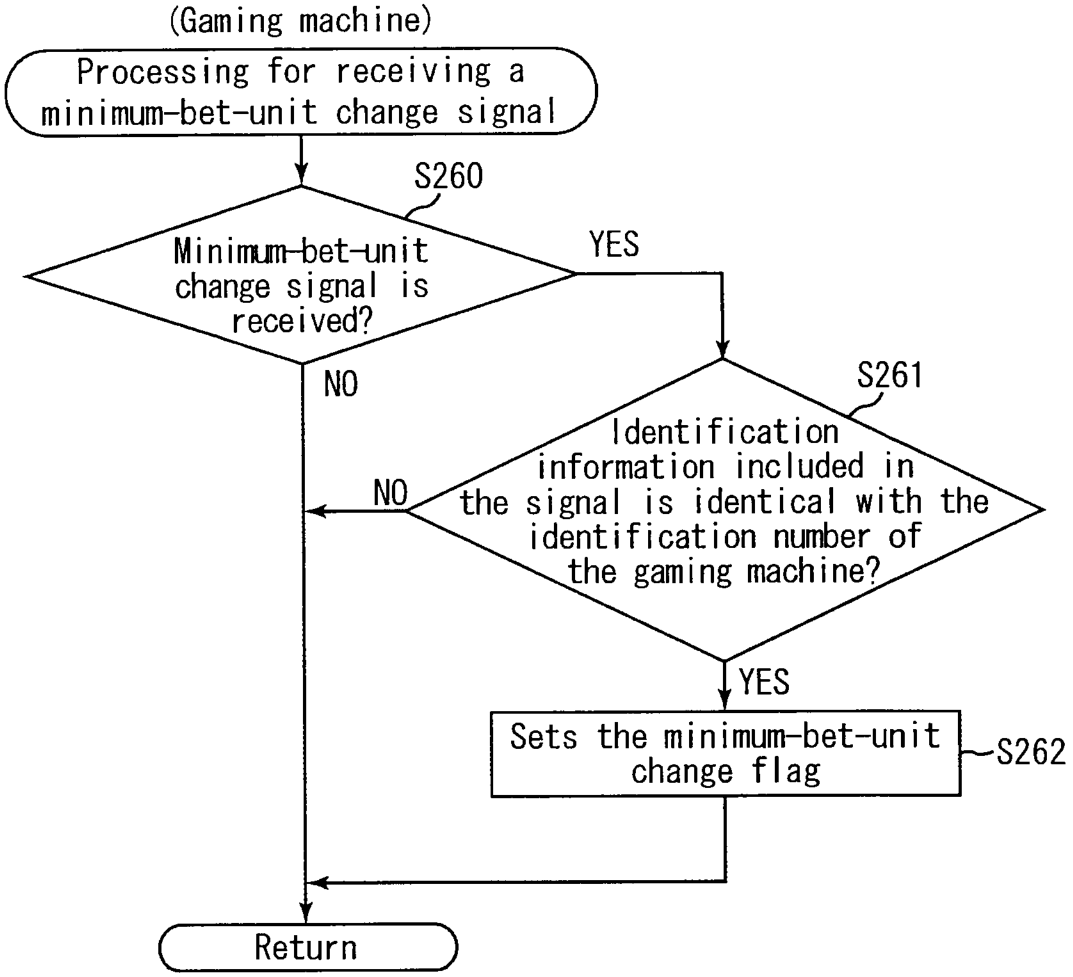
FIG. 21 is a view illustrating a flowchart of processing for receiving a minimum-bet-unit change signal executed by the gaming machine according to the first embodiment of the present invention.

FIG. 21 is a view illustrating a flowchart of processing for receiving a minimum-bet-unit change signal executed by the gaming machine according to the first embodiment of the present invention.

Figure 22:
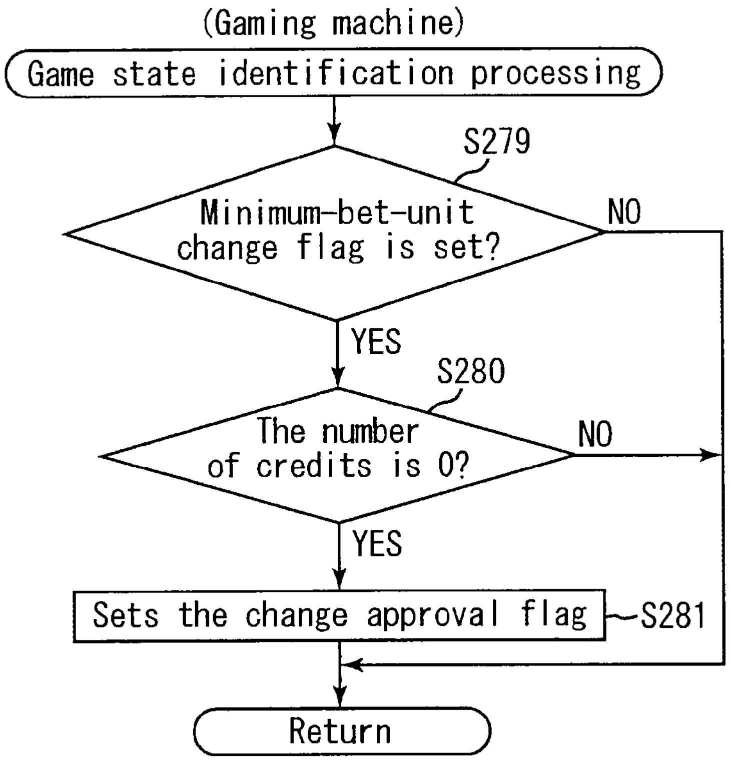
FIG. 22 is a view illustrating a flowchart of game state identification processing executed by the gaming machine according to the first embodiment of the present invention.

FIG. 22 is a view illustrating a flowchart of game state identification processing executed by the gaming machine according to the first embodiment of the present invention.

First, the main CPU 71 determines at a predetermined timing whether or not the minimum-bet-unit change flag is stored in the RAM 73 (step S271).

The minimum-bet-unit change flag is set when the main CPU 71 has received the minimum-bet-unit change signal (see step S254 of FIG. 19) from the external control device 200.

Here, the minimum-bet-unit change acceptance processing is described in detail with reference to FIG. 21.

First, the main CPU 71 determines at a predetermined timing whether or not it has received the minimum-bet-unit change signal from the external control device 200 (step S260). When determining that it has not received the minimum-bet-unit change signal, the main CPU 71 ends the present subroutine.

On the other hand, when determining it has received the minimum-bet-unit change signal, the main CPU 71 determines whether or not the identification number indicated by the identification information included in the minimum-bet-unit change signal is identical with the identification number allocated to the gaming machine 1 that including this main CPU 71 (step S261). When determining that the identification numbers are not the same, the main CPU 71 ends the present subroutine.

On the other hand, when determining that the identification numbers are the same, the main CPU 71 stores the minimum-bet-unit change flag in the RAM 73 (step S262).

Then, the main CPU 71 stores the minimum bet unit information included in the minimum-bet-unit change signal received in step S260 into the RAM 73.

After executing step S262, the main CPU 71 ends the present subroutine.

As above, the processing for accepting minimum-bet-unit change signal has been described with reference to FIG. 21.

Now, refer back to FIG. 20.

When determining in step S271 that the minimum-bet-unit change flag is stored in the RAM 73, the main CPU 71 determines whether or not a change approval flag is stored in the RAM 73 (step S272).

The change approval flag is a flag to be stored when the number of credits is zero.

The change approval flag is stored in the RAM 73 in game state identification processing.

Here, the game state identification processing is described in detail with reference to FIG. 22.

First, the main CPU 71 determines at a predetermined timing whether or not the minimum-bet-unit change flag is stored in the RAM 73 (step S279). When determining that the minimum-bet-unit change flag is not stored in the RAM 73, the main CPU 71 ends the present subroutine.

On the other hand, when determining that the minimum-bet-unit change flag is stored in the RAM 73, the main CPU 71 determines whether or not the value (number of credits) stored in the number-of-credits storage area provided in the RAM 73 is zero (step S280).

The number of credits being zero indicates that no player plays a game on that gaming machine 1. On the other hand, the number of credits not being zero indicates that a player plays a game on that gaming machine 1.

When determining that the number of credits is not zero, the main CPU 71 ends the present subroutine.

On the other hand, when determining that the number of credits is zero, the main CPU 71 stores the change approval flag in the RAM 73 (step S281).

After executing step S281, the main CPU 71 ends the present subroutine.

As above, the game state identification processing has been described with reference to FIG. 22.

Now, refer back to FIG. 20.

When determining in step S272 that the change approval flag is stored in the RAM 73, the main CPU 71 stores the minimum bet unit information having been stored in the RAM 73 in step S263 of FIG. 21, into the minimum bet unit information storage area in the RAM 73 (step S273). Then, the main CPU 71 clears the minimum-bet-unit change flag and the change approval flag.

Here, based on the minimum bet unit information stored in the minimum bet unit information storage area, coins are betted in an amount corresponding to a natural number multiple of the minimum bet unit indicated by that minimum bet unit information (see step S46 of FIG. 10). Namely, execution of step S273 corresponds to the change of the minimum bet unit.

After executing step S273, when determining in step S271 that the minimum-bet-unit change flag is not stored, or when determining in step S272 that the change approval flag is not stored, the main CPU 71 ends the present subroutine.

As above described, according to the processing for changing the minimum bet unit, the minimum bet unit is changed based on the minimum-bet-unit change signal, when the gaming machine 1 is in the state where the minimum bet unit can be changed (change state) (state where the number of credits is zero in the first embodiment).

As above, the first embodiment has been described with reference to FIGS. 1 to 22.

According to the first embodiment of the present invention, the external control device 200 is provided with the minimum bet unit input device 245. It is possible to input a selection of a minimum bet unit out of a plurality of minimum bet units by using the minimum bet unit input device 245 provided in the external control device 200. The minimum bet unit information indicative of the selected minimum bet unit is transmitted to the gaming machine 1. On receiving the minimum bet unit information, the gaming machine 1 executes a game as follows. After the bet of game media in an amount corresponding to a natural number multiple of the minimum bet unit indicated by the minimum bet unit information, the result of the game is determined. Then, the game media in an amount determined based on the above result of the game is paid out. Namely, the minimum bet unit in the gaming machine which has received the minimum bet unit information is changed to the minimum bet unit selected in the external control device 200.

Accordingly, the manager of the game facility needs not to have inefficient work of changing the minimum bet unit in gaming machines 1 individually in the case where the minimum bet unit is required to be changed according to the management strategy of the game facility. Just an operation of the input device provided in the server allows quick and easy change of the minimum bet unit in the gaming machines 1.

Consequently, it is possible to promptly deal with the players' needs about the minimum bet unit, which may be different in accordance with the day of week, time of day, and the like, resulting in the profit increase of the game facility.

Further, according to the first embodiment of the present invention, the external control device 200 is provided with the gaming machine selection input device 246 used for inputting a selection of a gaming machine 1 out of a plurality of gaming machines 1, in addition to the minimum bet unit input device 245 used for inputting a selection of the minimum bet unit. The identification information of the selected gaming machine 1 is transmitted to the gaming machines 1. In the case where the gaming machine 1 has received the identification information that is identical with the identification information thereof, a game is executed in that gaming machine 1 based on the changed minimum bet unit.

Accordingly, the manager of the game facility can specify the gaming machine 1 to change its minimum bet unit by selecting the gaming machine 1 by using the input device. Consequently, it is possible to change the minimum bet unit in the gaming machine 1 flexibly in accordance with the management strategy of the game facility.

For example, it is possible to change the minimum bet unit only in the popular gaming machine 1 to a larger unit so as to increase the profit. As a result, it is possible to manage the game facility more strategically.

Moreover, according to the first embodiment of the present invention, a game based on the changed minimum bet unit is executed on condition that the gaming machine 1 is in a state where a player does not play a game thereon (state where the number of credits is zero).

If the minimum bet unit is changed while a player plays a game on that gaming machine, the change may surprise the player.

According to the first embodiment of the present invention, since the minimum bet unit is not changed unless the gaming machine is in the state where a player does not play a game thereon, it is possible to prevent the change of the minimum bet unit at inappropriate times. Since the minimum bet unit is changed when the gaming machine 1 is in the state where a player does not play a game thereon, the minimum bet unit is changed at appropriate times.

Accordingly, the manager can implement more appropriate management of the game facility.

[Second Embodiment]

As already described in the first embodiment, in the present invention (inventions of (3), (6), and (10), the minimum bet unit is changed when the state of the gaming machine becomes the change state (state where the number of credits is zero in the first embodiment).

The first embodiment has been described as the case described below. When receiving the minimum-bet-unit change signal, the gaming machine 1 stores the minimum bet unit information in the RAM 73 (see step S262 of FIG. 21) even when the gaming machine is not in the change state (state where the number of credits is not zero). Then, the minimum bet unit is changed based on the minimum bet unit information stored in the RAM 73 when the state of the gaming machine 1 becomes the change state. In the first embodiment, in accordance with the above processing, the minimum bet unit is changed when the state of the gaming machine becomes the change state.

However, in the present invention, processing to change the minimum bet unit when the state of the gaming machine becomes the change state is not limited to this case.

The second embodiment is described as the case described below. When the state of the gaming machine becomes the change state, the gaming machine 1 transmits a request signal for requesting a retransmission of the minimum-bet-unit change signal to the external control device 200. Then, the gaming machine 1 changes the minimum bet unit based on the re-received minimum-bet-unit change signal. In the second embodiment, in accordance with the above processing, the minimum bet unit is changed when the state of the gaming machine becomes the change state.

Further, in the first embodiment, the case has been described where the change state refers to a state where the number of credits is zero. However, the change state of the present invention is not limited to this case. In the second embodiment, the change state refers to the following state. Namely, the change state in the second embodiment is a state where the presence of a player is not detected for a predetermined time period (300 seconds) oe longer after the receipt of the minimum-bet-unit change signal from the external control device 200. In the second embodiment, such sate of the gaming machine 1 is determined as the state where no player plays a game on that gaming machine 1.

In the following, the same reference numerals are given to the components identical to the components of the gaming machine 1 according to the first embodiment.

Descriptions are omitted for parts in the second embodiment to which descriptions in the first embodiment are applicable.

First, the configuration of the circuit in the gaming machine 1 is described with reference to FIG. 23.

Figure 23:
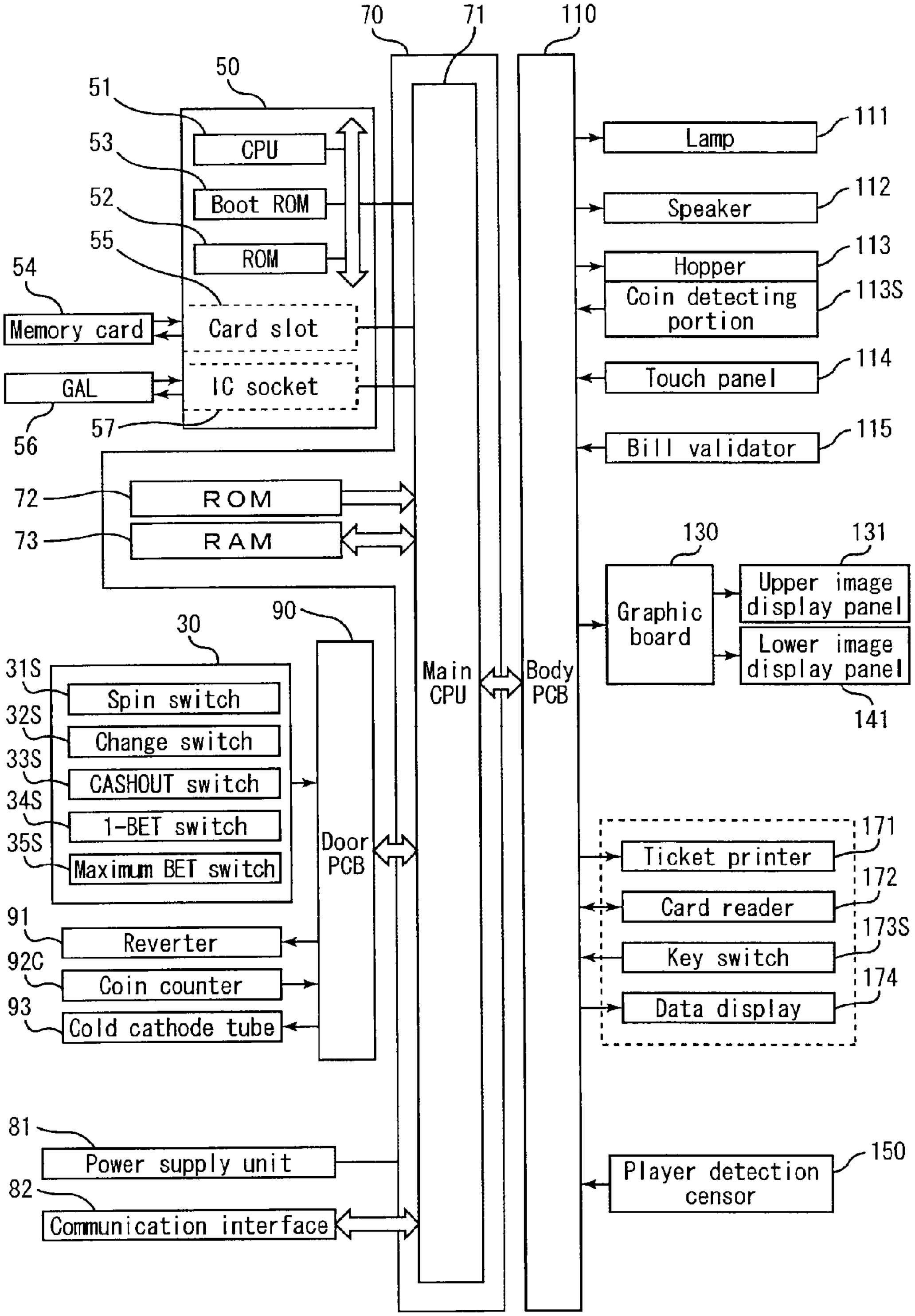
FIG. 23 is a block diagram illustrating an internal configuration of a gaming machine 1 according to a second embodiment of the present invention.

FIG. 23 is a block diagram illustrating an internal configuration of a gaming machine 1 according to a second embodiment of the present invention.

A body PCB 110 is provided with a player detection censor 150.

The player detection censor 150 is provided on the front face of the gaming machine 1 (not illustrated). The player detection censor 150 emits infrared rays and senses the reflection thereof to detect the presence of a player. Then, when detecting the presence of a player, the player detection censor 150 transmits a detection signal to the main CPU 71.

The other internal configuration of the gaming machine 1 is the same as the gaming machine 1 according to the first embodiment, and therefore, the descriptions thereof are omitted here.

Next, processing for re-transmitting a minimum-bet-unit change signal is described with reference to FIG. 24.

Figure 24:
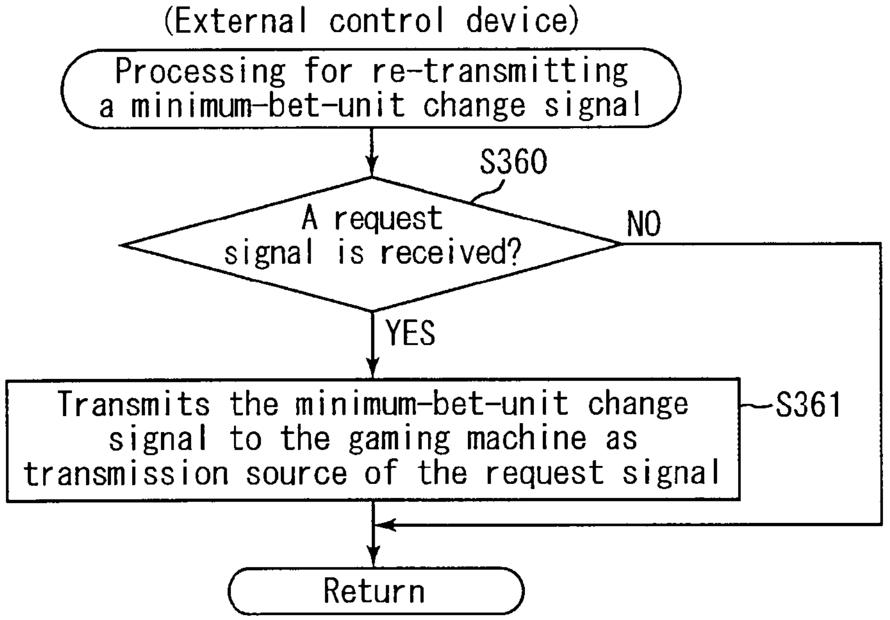
FIG. 24 is a view illustrating a flowchart of processing for re-transmitting a minimum-bet-unit change signal executed by an external control device according to the second embodiment of the present invention.

FIG. 24 is a view illustrating a flowchart of processing for re-transmitting a minimum-bet-unit change signal executed by an external control device according to the second embodiment of the present invention.

First, the main CPU 71 determines whether or not it has received a request signal from any of the gaming machines 1 (step S360). The request signal is described later in detail with reference to FIG. 27.

When determining that it has not received the request signal, the main CPU 71 ends the present subroutine.

On the other hand, when determining it has received the request signal, the main CPU 71 transmits the minimum-bet-unit change signal to the gaming machine 1 as a transmission source of the request signal (step S361). The minimum-bet-unit change signal includes the minimum bet unit information (see step S251 of FIG. 19) stored in the temporary storage area of the minimum bet unit information provided in the RAM 243.

After executing step S361, the main CPU 71 ends the present subroutine.

Figure 25:
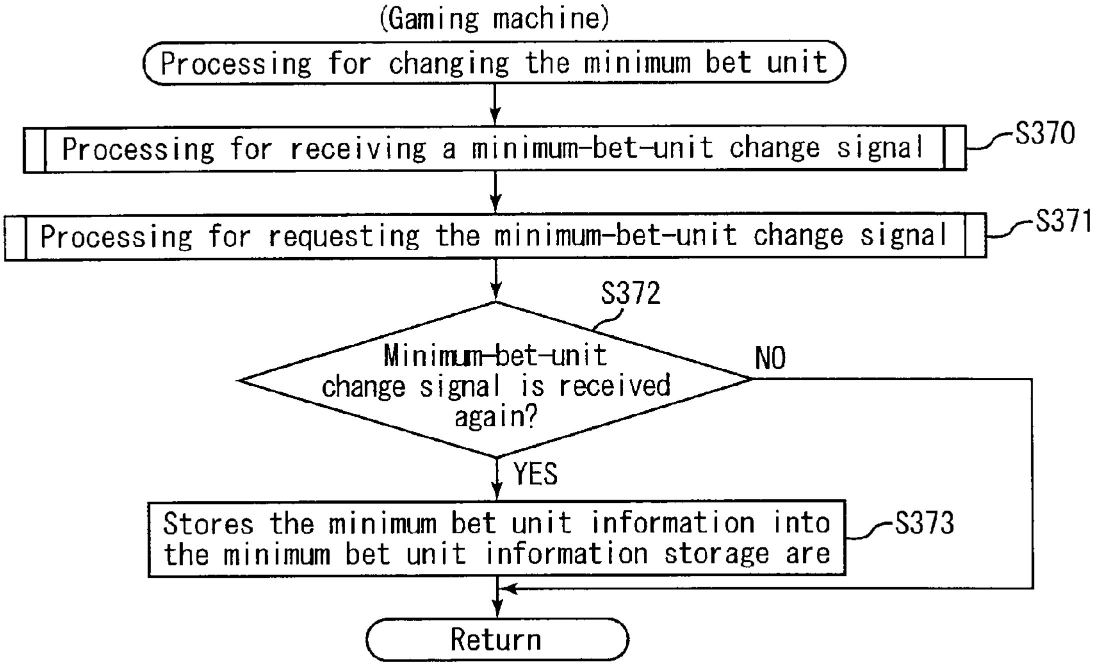
FIG. 25 is a view illustrating a flowchart of processing for changing a minimum bet unit executed by the gaming machine according to the second embodiment of the present invention.
Figure 26:
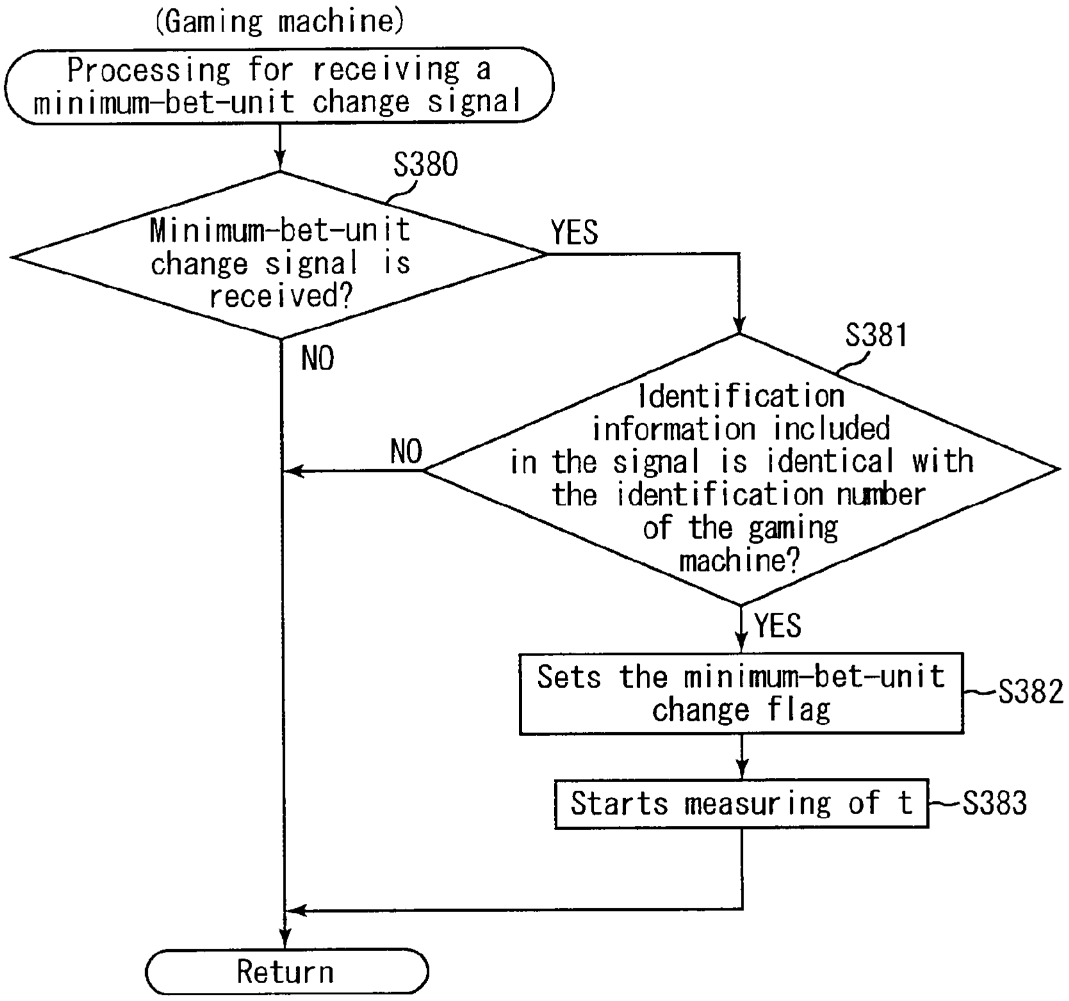
FIG. 26 is a view illustrating a flowchart of processing for receiving a minimum-bet-unit change signal executed by the gaming machine according to the second embodiment of the present invention.
Figure 27:
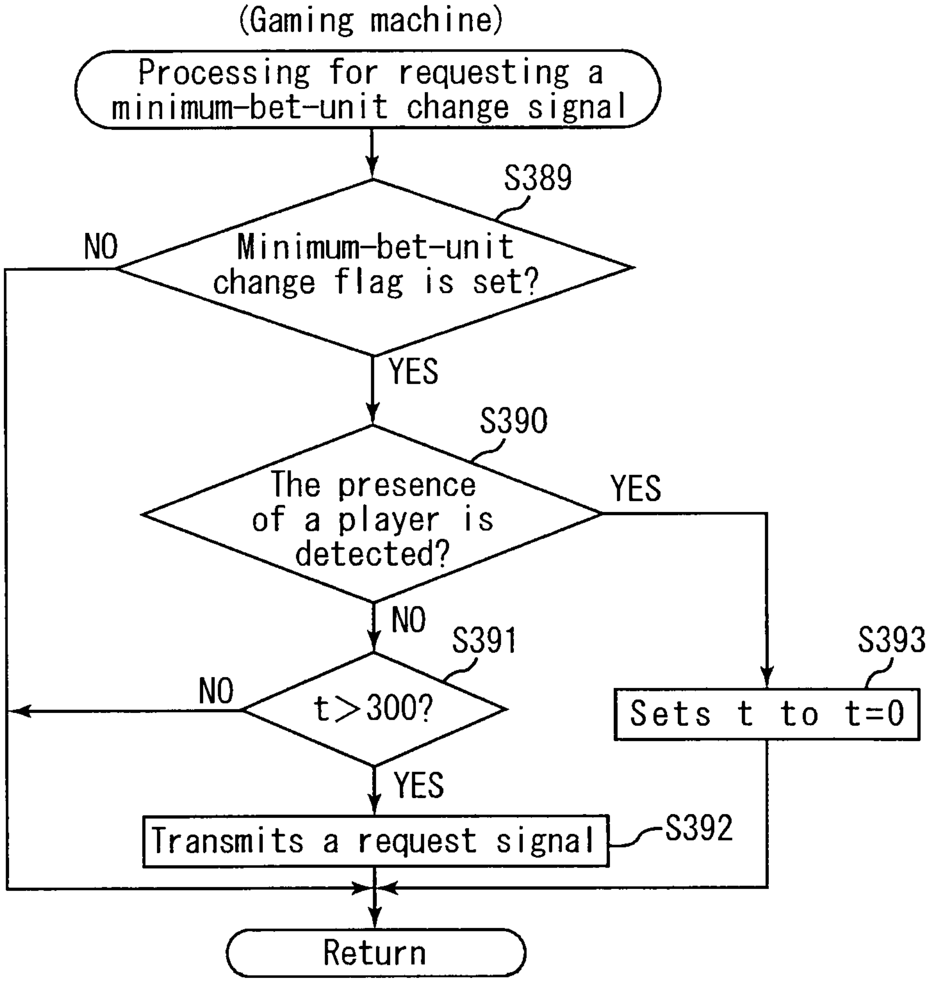
FIG. 27 is a view illustrating a flowchart of processing for requesting a minimum-bet-unit change signal, which is executed by the gaming machine according to the second embodiment of the present invention.

Next, description is given on the minimum-bet-unit change processing executed in the gaming machine 1 according to the second embodiment of the present invention, with reference to FIGS. 25 to 27.

FIG. 25 is a view illustrating a flowchart of processing for changing the minimum bet unit executed by the gaming machine according to the second embodiment of the present invention.

FIG. 26 is a view illustrating a flowchart of processing for receiving a minimum-bet-unit change signal executed by the gaming machine according to the second embodiment of the present invention.

FIG. 27 is a view illustrating a flowchart of processing for requesting a minimum-bet-unit change signal executed by the gaming machine according to the second embodiment of the present invention.

First, the main CPU 71 executes processing for receiving a minimum-bet-unit change signal (step S370).

Here, the processing for receiving a minimum-bet-unit change signal is described in detail with reference to FIG. 26.

First, the main CPU 71 executes the processing of steps S380 to S382. Since this processing is the same as the processing of steps S260 to S262 of FIG. 21, the description thereof are omitted here.

After executing step S382, the main CPU 71 starts measuring a no-game time t (step S383). The value of the no-game time t indicates the time period that the player does not play a game on the gaming machine 1 and is increased by one per second.

After executing step S383, the main CPU 71 ends the present subroutine.

As above, the processing for receiving the minimum-bet-unit change signal has been described with reference to FIG. 26.

Now refer back to FIG. 25.

After executing step S370, the main CPU 71 executes the processing for requesting the minimum-bet-unit change signal (step S371). The processing for requesting the minimum-bet-unit change signal is for requesting the external control device 200 for the retransmission of the minimum-bet-unit change signal when the state of the gaming machine 1 becomes the change state (when the presence of a player is not detected for over 300 seconds after the receipt of the minimum-bet-unit change signal (see step S380 of FIG. 26)).

Here, the processing for requesting the minimum-bet-unit change signal is described with reference to FIG. 27.

First, the main CPU 71 determines at a predetermined timing whether or not the minimum-bet-unit change flag is stored in the RAM 73 (step S389). When determining that the minimum-bet-unit change flag is not stored in the RAM 73, the main CPU 71 ends the present subroutine.

On the other hand, when determining that the minimum-bet-unit change flag is stored in the RAM 73, the main CPU 71 determines whether or not the player detection censor 150 has detected the presence of a player (step S390). In this processing, the main CPU 71 determines whether or not it has received a detection signal indicative of the detection of the presence of a player from the player detection censor 150.

When determining that the player detection censor 150 has detected the presence of a player, the main CPU 71 sets the no-game time t to zero and restarts the measuring of the no-game time t (step S393). Then, the main CPU 71 ends the present subroutine.

On the other hand, when determining that the player detection censor 150 has not detected the presence of the player, the main CPU 71 determines whether or not the value of the no-game time t is over 300(step S391).

When determining the value of the no-game time t is under 300, the main CPU 71 ends the present subroutine.

On the other hand, when determining that the value of the no-game time t is over 300, the main CPU 71 transmits a request signal to the external control device 200 (step S392). On receiving the request signal, the external control device 200 retransmits the minimum-bet-unit change signal to the gaming machine 1 (see step S361 of FIG. 24).

After executing step S392, the main CPU 71 ends the present subroutine.

As above, the processing for requesting the minimum-bet-unit change signal has been described with reference to FIG. 27.

Now, refer back to FIG. 25.

After executing step S371, the main CPU 71 determines whether or not it has received the minimum-bet-unit change signal from the external control device 200 again (step S372). When determining that it has not received the minimum-bet-unit change signal, the main CPU 71 ends the present subroutine.

On the other hand, when determining that it has received the minimum-bet-unit change signal, the main CPU 71 stores the minimum bet unit information included in the minimum-bet-unit change signal, into the minimum bet unit information storage are in the RAM 73 (step S373). Then, the main CPU 71 clears the minimum-bet-unit change flag.

After the execution of the step S373, the main CPU 71 ends the present subroutine.

As above, the second embodiment has been described with reference to FIGS. 23 to 27.

According to the second embodiment of the present invention, a game based on the changed minimum bet unit is executed on condition that the gaming machine 1 is in the state where no player plays a game thereon (state where the player detection censor 150 does not detect a player for 300 seconds or longer).

If the minimum bet unit is changed while a player plays a game on that gaming machine, the change may surprise the player.

According to the second embodiment of the present invention, since the minimum bet unit is not changed unless the gaming machine is in the state where no player plays a game thereon, it is possible to prevent the change of the minimum bet unit at inappropriate times.

Further, according to the second embodiment of the present invention, the gaming machine 1 receives the minimum bet unit information from the external control device 200 again when the state thereof becomes the state where no player plays a game thereon. Therefore, the gaming machine can change the minimum bet unit based on the latest minimum bet unit information at appropriate times.

Accordingly, the manager can implement more appropriate management of the game facility.

[Third Embodiment]

In the first and second embodiments, the case has been described where the external control device 200 transmits the minimum-bet-unit change signal to all the gaming machines 1 (see step S254 of FIG. 19).

In a third embodiment, a case is described where the minimum-bet-unit change signal is transmitted only to the gaming machine 1 selected by using the gaming machine selection input device 246.

Figure 32:
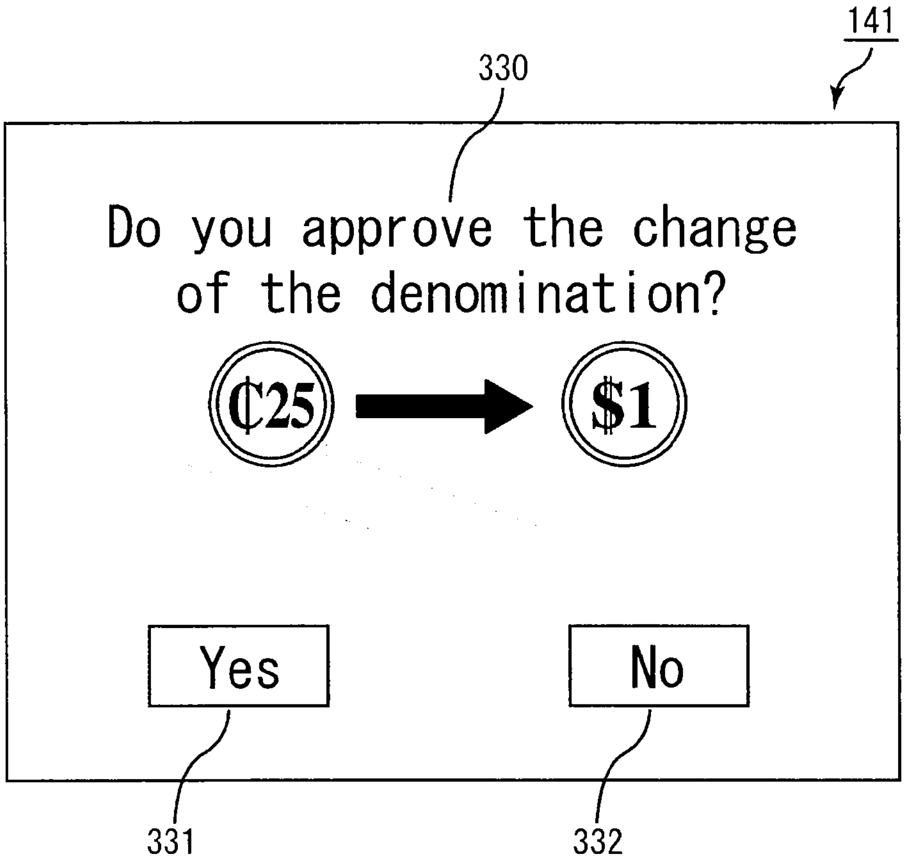
FIG. 32 is an image illustrating an exemplary image displayed on a lower image display panel provided in the gaming machine according to the third embodiment of the present invention.

Further, in the third embodiment, the change state refers to a state where a gaming card 58 (see FIG. 28) is not inserted into a gaming card slot 59 (state where a game is not played on the gaming machine 1), or a state where a player has inputted a command to approve the change of the minimum bet unit (see FIG. 32).

Moreover, in the third embodiment, the day of week or the time to change the minimum bet unit is inputted by using the minimum bet unit input device 245. Then, at the inputted time or on the inputted day of week, the minimum-bet-unit change signal is transmitted to the gaming machines 1.

In the following, the same reference numerals are given to the components identical to the components of the gaming machine 1 according to the foregoing embodiments.

Descriptions are omitted for parts in the third embodiment to which descriptions in the foregoing embodiments are applicable.

First, the internal configuration of a circuit provided in the gaming machine 1 is described with reference to FIG. 28.

Figure 28:
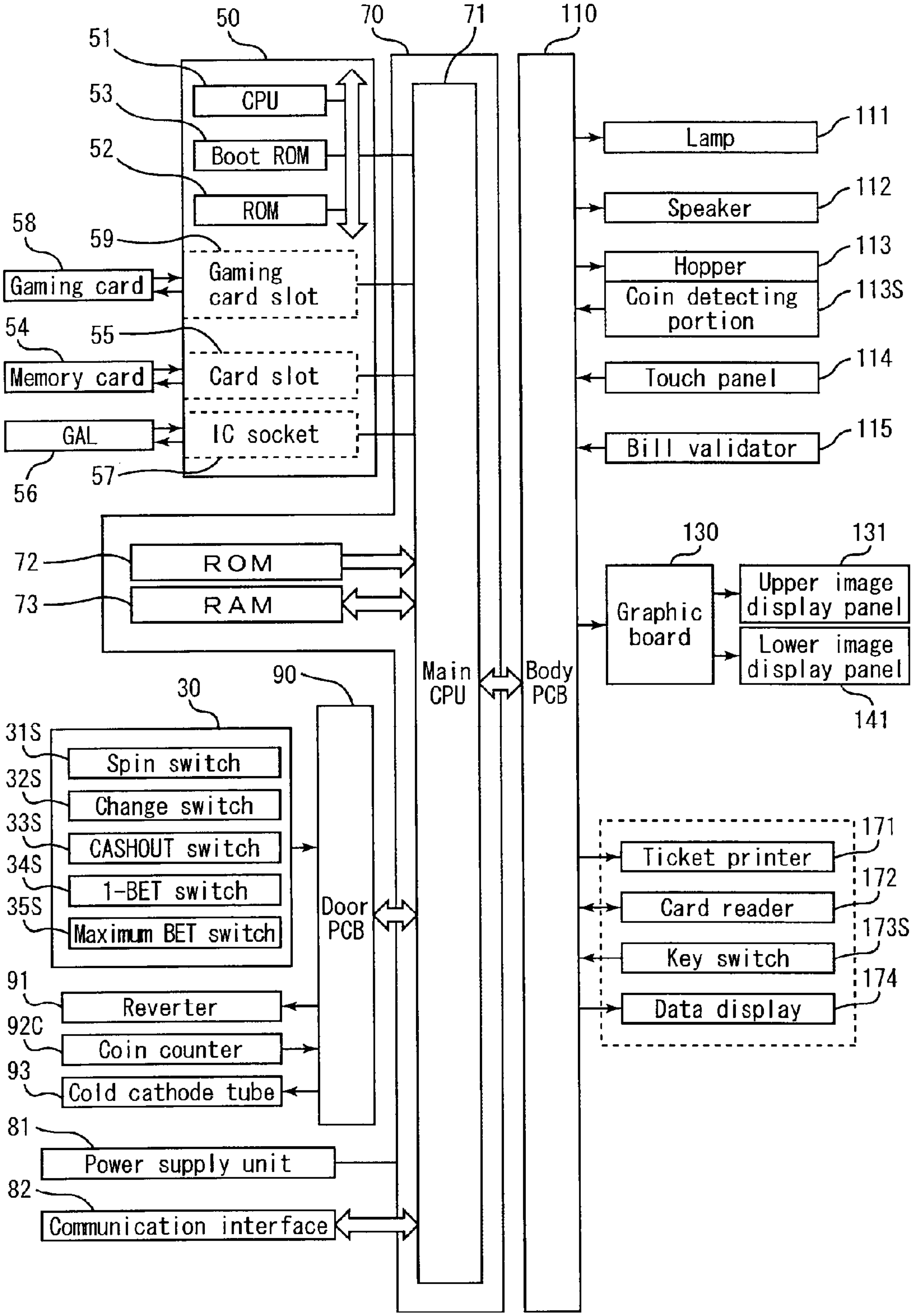
FIG. 28 is a block diagram illustrating an internal configuration of a gaming machine 1 according to a third embodiment of the present invention.

FIG. 28 is a block diagram illustrating an internal configuration of a gaming machine 1 according to a third embodiment of the present invention.

A gaming board 50 is provided with the gaming card slot 59 corresponding to the gaming card 58.

The gaming card slot 59 is provided on the front face of the gaming machine 1 (not illustrated). The gaming card 58 is a card owned by the player who plays a game on the gaming machine 1 and stores data for identifying the player, data about the history of games played by the player, data on the number of accumulated credits, and the like.

The player inserts the gaming card 59 into the gaming card slot 59 in the gaming machine 1 on which he or she wants to play a game.

When detecting the insertion of the gaming card, the gaming card slot 59 outputs a gaming card detection signal to the main CPU 71.

The other internal configuration of the gaming machine 1 is the same as the gaming machine 1 according to the first embodiment, and therefore, the descriptions thereof are omitted here.

Next, coin-insertion/start-check processing is described with reference to FIG. 29.

Figure 29:
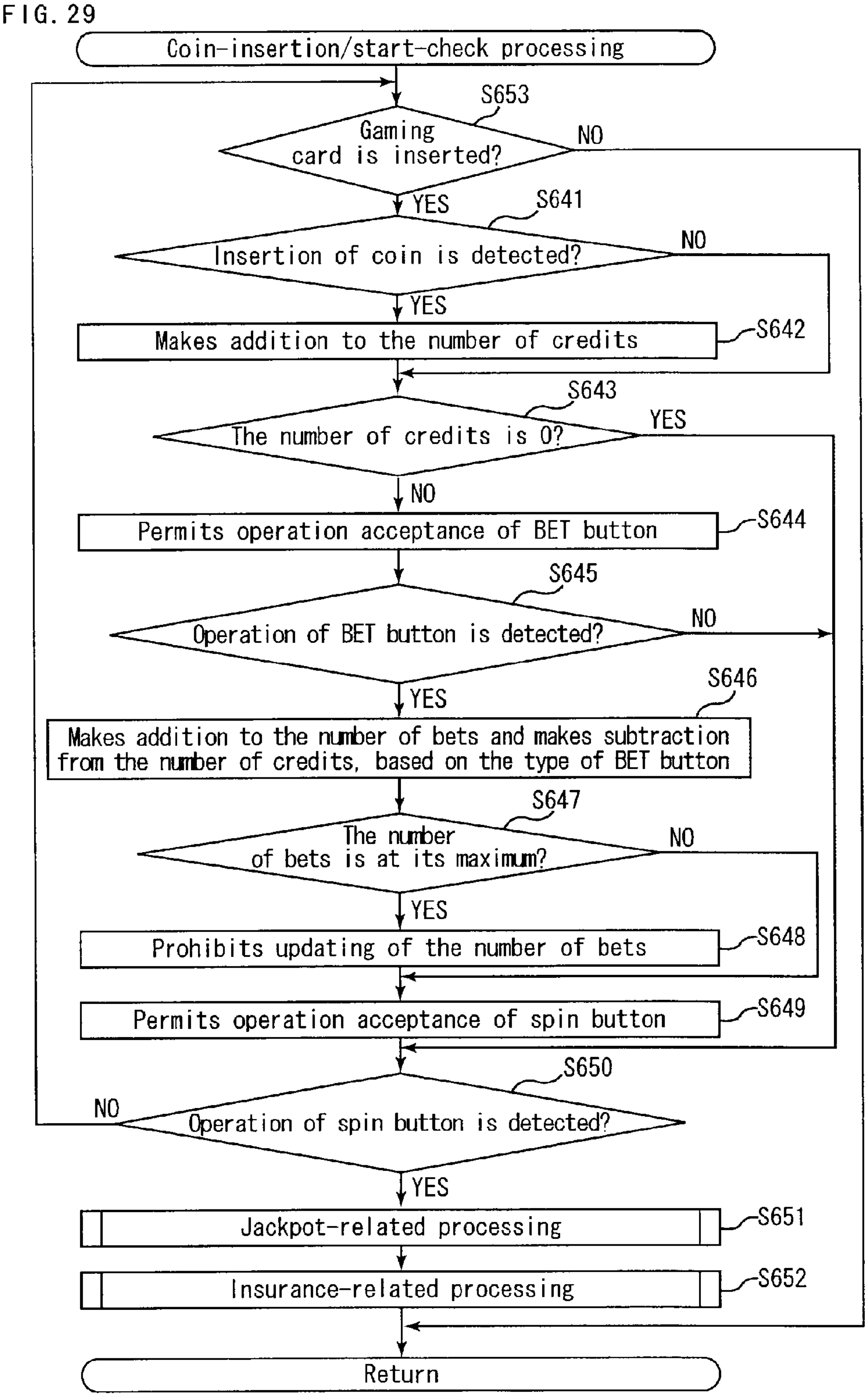
FIG. 29 is a flowchart illustrating coin-insertion/start-check processing for the gaming machine according to the third embodiment of the present invention.

FIG. 29 is a flowchart illustrating coin-insertion/start-check processing for the gaming machine according to the third embodiment of the present invention.

First, the main CPU 71 determines whether or not it has detected the presence of the gaming card 58 (step S653). In this processing, the main CPU 71 determines whether or not it has received a gaming card detection signal indicative of the detection of the insertion of the gaming card 58 from the gaming card slot 59.

When determining that it has not detected the presence of the gaming card 58, the main CPU 71 ends the present subroutine.

On the other hand, when determining it has detected the presence of the gaming card 58, the main CPU 71 executes the processing of steps S641 to S652. This processing is the same as the processing of steps S41 to S52 of FIG. 10, and therefore, the descriptions thereof are omitted here.

Next, processing for accepting the change of a minimum bet unit is described with reference to FIG. 30.

Figure 30:
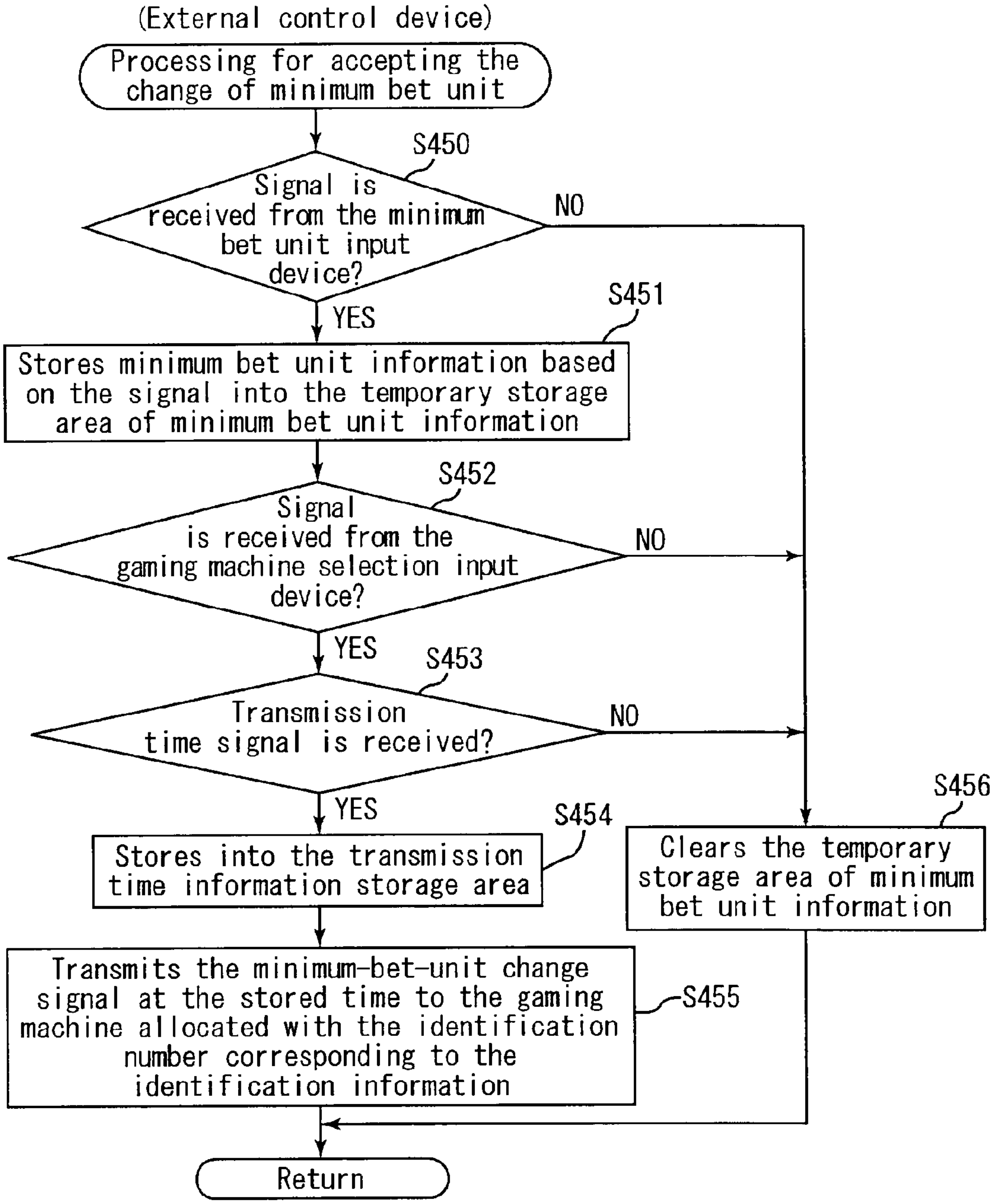
FIG. 30 is a view illustrating a flowchart of processing for accepting the change of a minimum bet unit executed by the external control device according to the third embodiment of the present invention.

FIG. 30 is a view illustrating a flowchart of a processing for accepting the change of a minimum bet unit executed by the external control device according to the third embodiment of the present invention.

First, the CPU 241 executes the processing of steps S450 to S452. This processing is the same as the processing of step S250 to S252 of FIG. 19, and therefore, the descriptions thereof are omitted here.

After executing step S452, the CPU 241 determines whether or not it has received the transmission time signal (step S453). The transmission time signal is a signal to be transmitted when the time to transmit the minimum-bet-unit change signal to the gaming machine 1 is inputted by using the minimum bet unit input device 245.

When determining it has not received the transmission time signal, the CPU 241 clears the temporary storage area of minimum bet unit information (step S456) and ends the present subroutine.

On the other hand, when determining that it has received the transmission time signal, the CPU 241 stores transmission time information based on the signal, into a transmission time information storage area in the RAM 243 (step S454).

Next, the CPU 241 transmits the minimum-bet-unit change signal to the gaming machine allocated with the identification number indicated by the identification information stored in the RAM 243 when it is time indicated by the transmission time information stored in the RAM 243 (step S455).

After executing step S455, the CPU 241 ends the present subroutine.

As above, the processing for accepting the change of a minimum bet unit has been described with reference to FIG. 30.

Next, processing for changing the minimum bet unit is described with reference to FIGS. 31 to 33.

Figure 31:
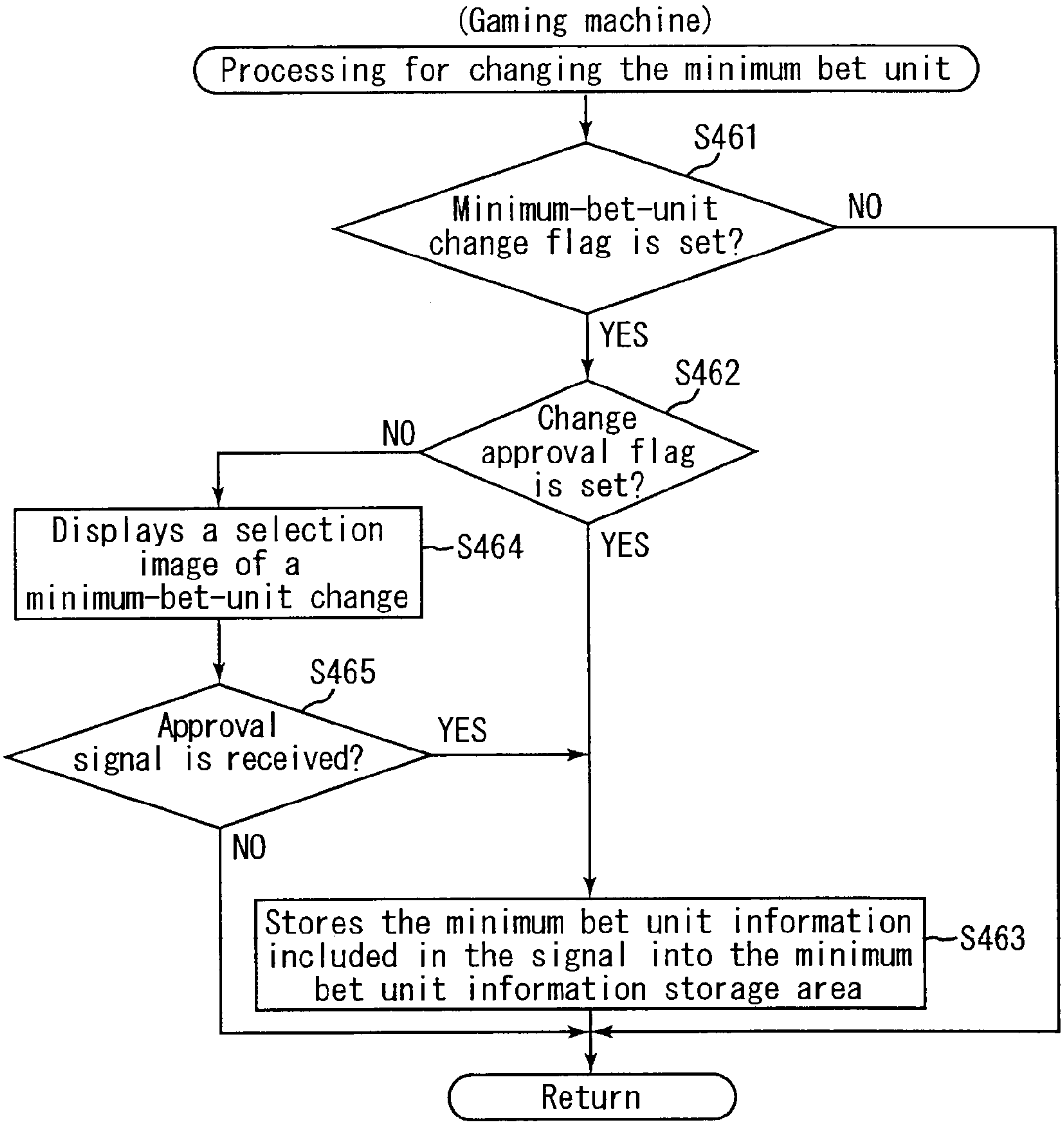
FIG. 31 is a view illustrating a flowchart of processing for changing the minimum bet unit executed by the gaming machine according to the third embodiment of the present invention.

FIG. 31 is a view illustrating a flowchart of processing for changing the minimum bet unit executed by the gaming machine according to the third embodiment of the present invention.

FIG. 32 is an image illustrating an exemplary image displayed on a lower image display panel provided in the gaming machine according to the third embodiment of the present invention.

Figure 33:
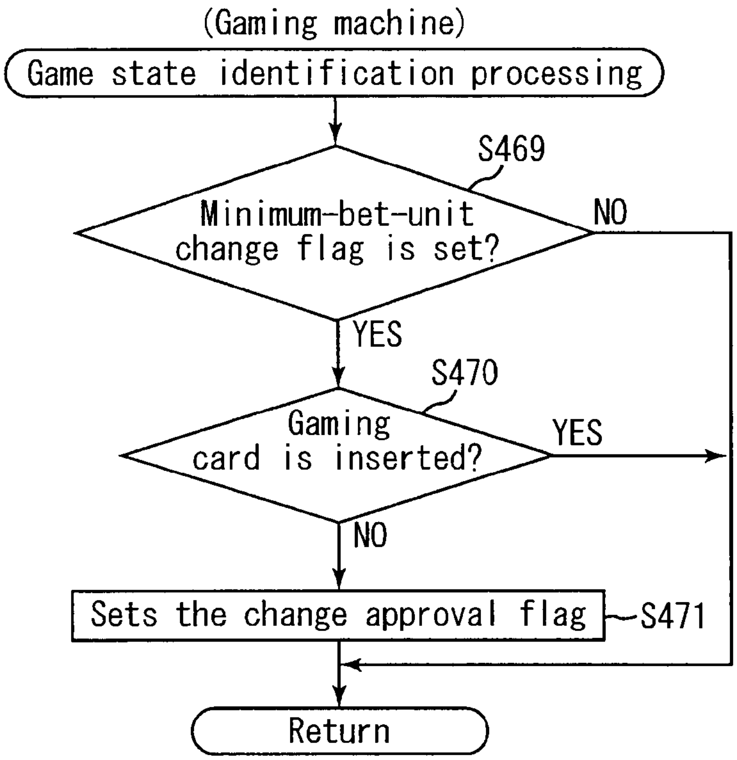
FIG. 33 is an image illustrating a flowchart of game state identification processing executed by the gaming machine according to the third embodiment of the present invention.

FIG. 33 is an image illustrating a flowchart of game state identification processing conducted in the gaming machine according to the third embodiment of the present invention.

First, the main CPU 71 determines at a predetermined timing whether or not the minimum-bet-unit change flag is stored in the RAM 73 (step S461). This processing is the same as the processing of step S271 of FIG. 20.

When determining that the minimum-bet-unit change flag is not stored in the RAM 73, the main CPU 71 ends the present subroutine.

On the other hand, when determining instep S461 that the minimum-bet-unit change flag is stored in the RAM 73, the main CPU 71 determines whether or not the change approval flag is stored in the RAM 73 (step S462).

The change approval flag is stored when the gaming card 58 is not inserted into the gaming card slot 59.

The change approval flag is stored in the RAM 73 in the game state identification processing.

Here, the game state identification processing is described in detail with reference to FIG. 33.

First, the main CPU 71 determines at a predetermined timing whether or not the minimum-bet-unit change flag is stored in the RQAM 73 (step S469). When determining that the minimum-bet-unit change flag is not stored in the RAM 73, the main CPU 71 ends the present subroutine.

On the other hand, when determining that the minimum-bet-unit change flag is stored in the RAM 73, the main CPU 71 determines whether or not the presence of the gaming card 58 has been detected (step S470). In this processing, the main CPU 71 determines whether or not it has received the gaming card detection signal indicating that the gaming card 58 inserted into the gaming card slot 59 has been detected.

In the case where the presence of the gaming card 58 has been detected, the main CPU 71 ends the present subroutine.

On the other hand, when determining that the presence of the gaming card 58 has not been detected, the main CPU 71 stores the change approval flag into the RAM 73 (step S471).

After executing step S471, the main CPU 71 ends the present subroutine.

As above, the game state identification processing has been described with reference to FIG. 33.

Now, refer back to FIG. 31.

When determining that the change approval flag is stored in the RAM 73, the main CPU 71 stores the minimum bet unit information stored in the RAM 73 in step S263 of FIG. 21, into the minimum bet unit information storage area in the RAM 73 (step S463). Then, the main CPU 71 clears the minimum-bet-unit change flag and the change approval flag.

Based on the minimum bet unit information stored in the minimum bet unit information storage area, coins are betted in an amount corresponding to a natural number multiple of the minimum bet unit indicated by the minimum bet unit information (see step S46 of FIG. 10). Namely, the processing of step S463 is executed to change the minimum bet unit.

After executing step S463, the main CPU 71 ends the present subroutine.

On the other hand, when determining in step S462 that the change approval flag is not stored, the main CPU 71 displays a selection image 330 of a minimum-bet-unit change on the lower image display panel 141 (step S464). The selection image 330 of a minimum-bet-unit change is an image for allowing the player to select whether or not to approve a change of the minimum bet unit.

Here, the selection image 330 of a minimum-bet-unit change is described with reference to FIG. 32.

As illustrated in FIG. 32, the lower image display panel 141 displays the selection image 330 of a minimum-bet-unit change. The selection image 330 of a minimum-bet-unit change includes a character image asking the player whether or not to approve the change of the minimum bet unit.

Further, a change approval image 331 and a change non-approval image 332 are displayed together.

When the player touches a portion on the lower image display panel 141 corresponding to the change approval image 331, an approval signal is transmitted to the main CPU 71 from the touch panel 114.

On the other hand, when the player touches a portion on the lower image display panel 141 corresponding to the change non-approval image 332, a non-approval signal is transmitted to the main CPU 71 from the touch panel 114.

Now, refer back to FIG. 31.

Next, the main CPU 71 determines whether or not it has received the approval signal (step S465).

When determining it has received the approval signal, the main CPU 71 shifts the processing to step S463.

On the other hand, when determining that it has not received the approval signal, the main CPU 71 ends the present subroutine.

As above, the processing for changing the minimum bet unit has been described with reference to FIGS. 31 to 33.

According to the third embodiment of the present invention, it is possible to input the time to change the minimum bet unit, in addition to the selection of the minimum bet unit, by using the minimum bet unit input device 245 provided in the external control device 200. Further, it is possible to input the selection of a gaming machine 1 out of a plurality of gaming machines 1 by using the gaming machine selection input device 246. Then, the minimum bet unit information is transmitted at the specified time to the selected gaming machine.

Accordingly, the manager of the game facility can select the time and a gaming machine 1 by using the minimum bet unit input device 245 and the gaming machine selection input device 246 to specify the time to change the minimum bet unit and the gaming machine 1 to change its minimum bet unit. Consequently, it is possible to change the minimum bet unit in the gaming machine flexibly in accordance with the management strategy of the game facility.

For example, it is possible to change the minimum bet unit every evening only in the gaming machine that is popular among the players coming in the evening to a larger unit so as to increase the profit. As a result, it is possible to manage the game facility more strategically.

Further, according to the third embodiment of the present invention, the minimum bet unit is changed not only in the state where no player plays a game on that gaming machine, but also in the state where a player plays a game on that gaming machine, provided that the player inputs an approval for the change of the minimum bet unit.

Accordingly, in the case where the player wants to change the minimum bet unit, it is possible to change the minimum bet unit promptly.

[Fourth Embodiment]

In a fourth embodiment, after the input for changing the minimum bet unit is made by using the minimum bet unit input device 245, the external control device 200 repeatedly transmits the minimum-bet-unit change signal to the gaming machine 1 at predetermined intervals (e.g. every 10 minutes) until the minimum bet unit is changed in that gaming machine 1.

Further, in the fourth embodiment, a BET button is invalid until the state for changing the minimum bet unit (standby state) is terminated. Here, a state where "a BET button is invalid" refers to the state where a player cannot place a bet even he or she presses the BET button. The BET button corresponds to the bet input device of the present invention.

In the fourth embodiment, the standby state refers to a state until the processing for changing the minimum bet unit is completed in the change state. The change state in the fourth embodiment is a state where the gaming card 58 (see FIG. 28) is not inserted into the gaming card slot 59 (state where a game is not played on the gaming machine 1).

In the case where the gaming card 58 is inserted into the gaming card slot 59 when the gaming machine 1 has received the minimum-bet-unit change signal, the BET button becomes invalid when the gaming card 58 is ejected from the gaming card slot 59 (change state) afterward, and the BET button is invalid until the change of the minimum bet unit is completed. Namely, during that period, the player cannot play a game thereon.

In the following, the same reference numerals are given to the components identical to the components of the gaming machine 1 according to the foregoing embodiments.

Descriptions are omitted for parts in the fourth embodiment to which descriptions in the foregoing embodiments are applicable.

First, coin-insertion/start-check processing is described with reference to FIG. 34.

Figure 34:
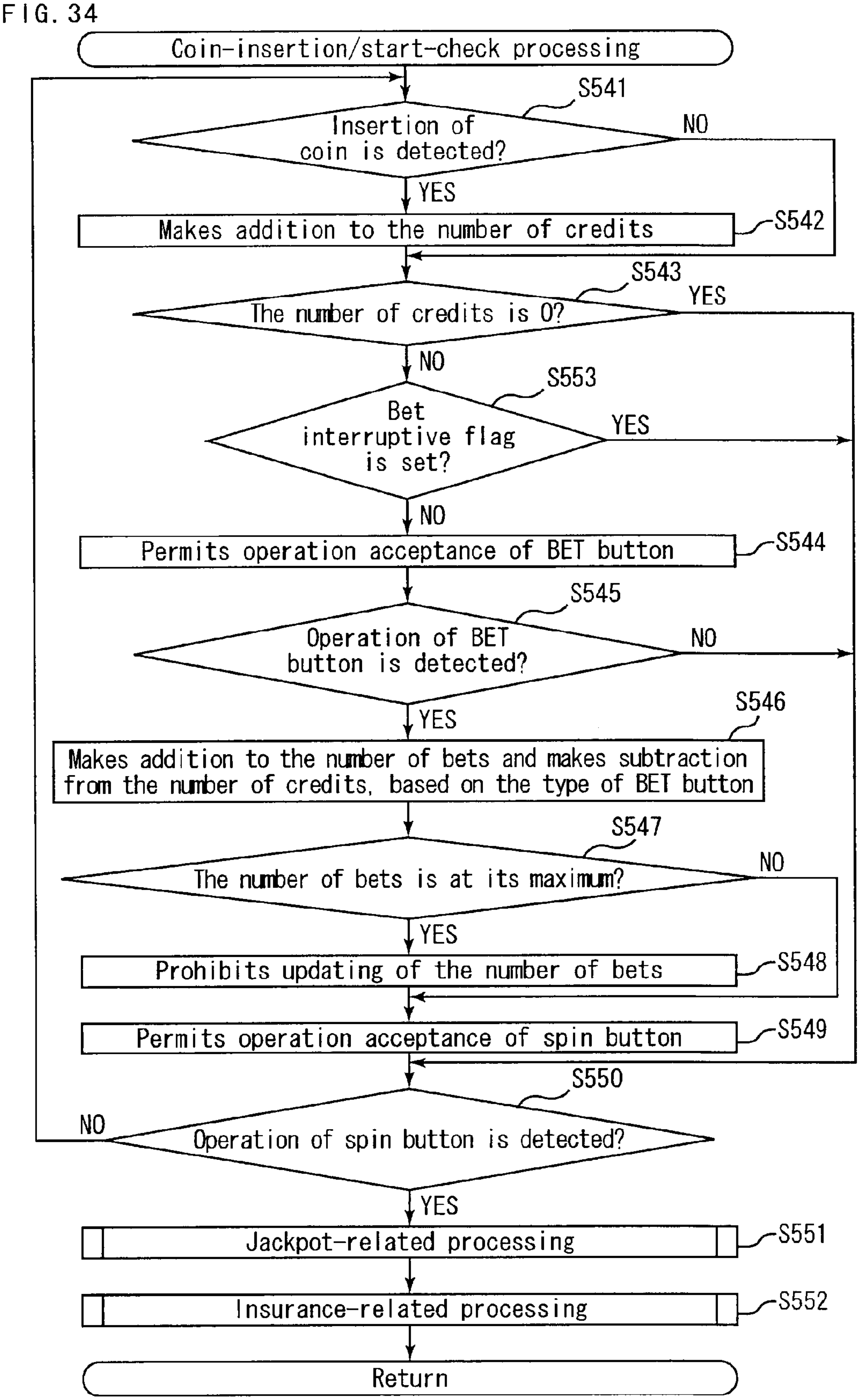
FIG. 34 is a flowchart illustrating coin-insertion/start-check processing for the gaming machine according to the fourth embodiment of the present invention.

FIG. 34 is a flowchart illustrating coin-insertion/start-check processing for the gaming machine according to the fourth embodiment of the present invention.

First, the main CPU 71 executes the processing of steps S541 to S543. This processing is the same as the processing of steps S41 to S43 of FIG. 10, and therefore, the descriptions thereof are omitted here.

When determining in step S543 that the number of credits is not zero, the main CPU 71 determines whether or not a bet interruptive flag is stored in the RAM 73 (step S553).

When determining that the bet interruptive flag is stored in the RAM 73, the main CPU 71 shifts the processing to step S550.

On the other hand, when determining that the bet interruptive flag is not stored in the RAM 73, the main CPU 71 executes the processing of steps S544 to S552. This processing is the same as the processing of steps S44 to S52 of FIG. 10, and therefore, the descriptions thereof are omitted here.

Next, processing for accepting the change of a minimum bet unit is described with reference to FIGS. 35 to 37.

Figure 35:
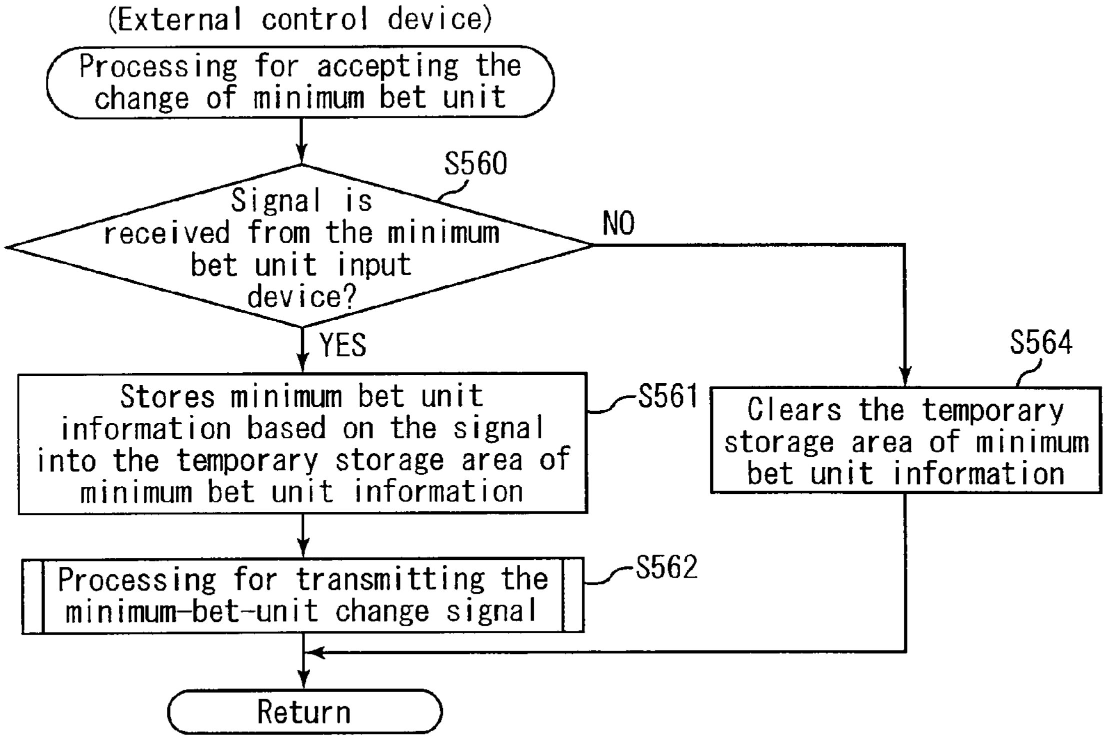
FIG. 35 is a view illustrating a flowchart of processing for accepting the change of a minimum bet unit executed by the external control device according to the fourth embodiment of the present invention.

FIG. 35 is a view illustrating a flowchart of processing for accepting the change of a minimum bet unit executed by the external control device according to the first embodiment of the present invention.

Figure 36:
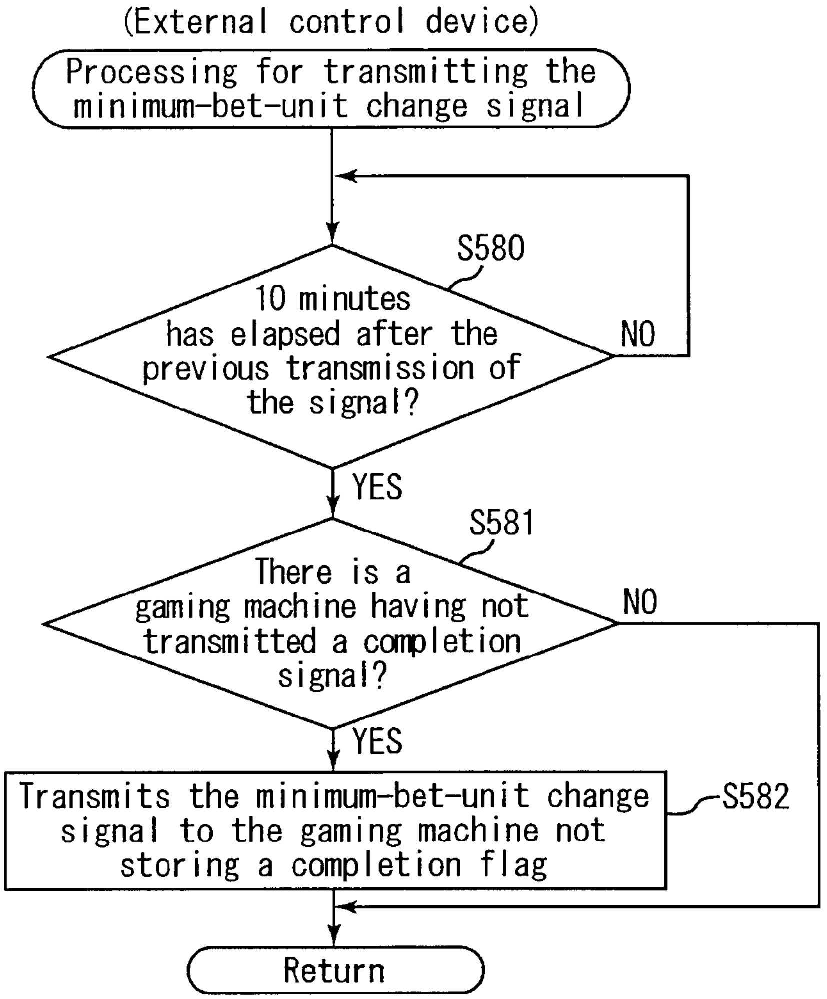
FIG. 36 is a view illustrating a flowchart of processing for transmitting a minimum-bet-unit change signal executed by the external control device according to the fourth embodiment of the present invention.

FIG. 36 is a view illustrating a flowchart of processing for transmitting a minimum-bet-unit change signal, which is executed by the external control device according to the fourth embodiment of the present invention.

Figure 37:
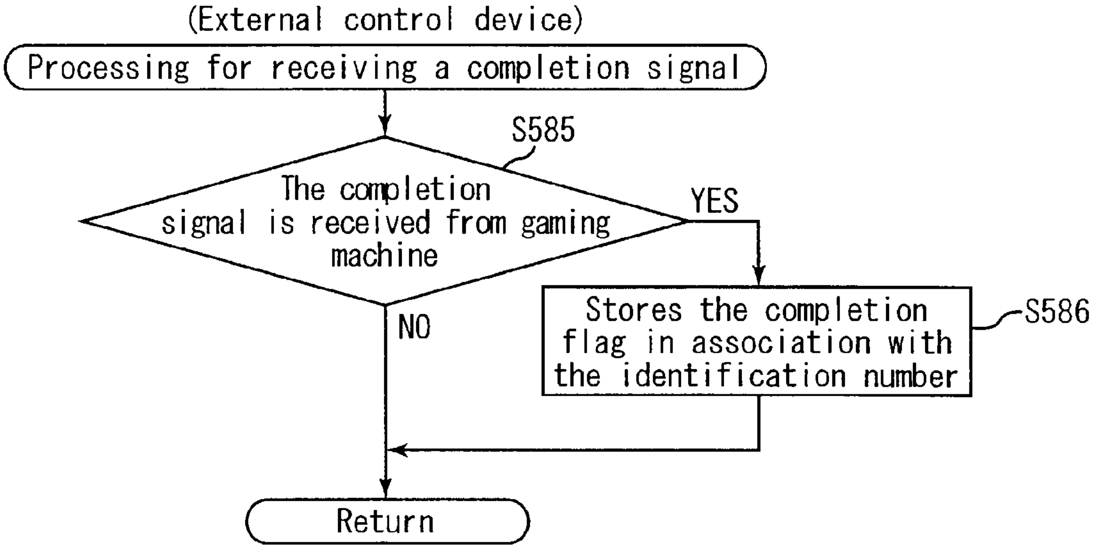
FIG. 37 is a view illustrating a flowchart of processing for receiving a completion signal executed by the external control device according to the fourth embodiment of the present invention.

FIG. 37 is a view illustrating a flowchart of processing for receiving a completion signal executed by the external control device according to the fourth embodiment of the present invention.

First, the CPU 241 executes the processing of steps S560 to S561 and S564. This processing is the same as the processing of steps S250 to S251 and S255 of FIG. 19, and therefore, the descriptions thereof are omitted here.

After executing step S561, the CPU 241 executes processing for transmitting the minimum-bet-unit change signal (step S562). In the processing for transmitting the minimum-bet-unit change signal, the minimum-bet-unit change signal is repeatedly transmitted every ten minutes to the gaming machine 1 in which the minimum bet unit has not been changed.

After executing step S562, the CPU 241 ends the present subroutine.

Further, the processing for transmitting the minimum-bet-unit change signal is specifically described with reference to FIG. 36.

First, the CPU 241 determines whether or not 10 minutes has elapsed after the previous transmission of the minimum-bet-unit change signal to the gaming machine 1 (step S580).

When determining that 10 minutes has not elapsed, the CPU 241 returns the processing to step S580.

On the other hand, when determining that 10 minutes has elapsed, the CPU 241 refers to a completion flag stored in the RAM 243 to determine whether or not there is a gaming machine 1 that has not transmitted a completion signal (step S581).

When determining that there is no gaming machine 1 that has not transmitted a completion signal, the CPU 241 ends the present subroutine.

On the other hand, when determining that there is a gaming machine that has not transmitted a completion signal, the CPU 241 transmits the minimum-bet-unit change signal to that gaming machine 1 (step S582).

After executing step S582, the CPU 241 returns the processing to step S580.

The completion flag and the completion signal are described in detail with reference to FIG. 37.

First, the CPU 241 determines whether or not it has received the completion signal from the gaming machine 1 (step S585). The completion signal is a signal to be transmitted when the minimum bet unit is changed in the gaming machine 1. The completion signal is described later in detail with reference to FIG. 38.

When determining that it has not received the completion signal, the CPU 241 ends the present subroutine.

On the other hand, when determining it has received the completion signal, the CPU 241 stores a completion flag in association with the identification number of the gaming machine 1 that has transmitted the completion signal, into the RAM 243 (step S586).

After executing step S586, the CPU 241 ends the present subroutine.

As above, the processing for accepting the change of a minimum bet unit has been described with reference to FIGS. 36 to 37.

Next, the minimum bet unit change processing is described with reference to FIGS. 38 to 39.

Figure 38:
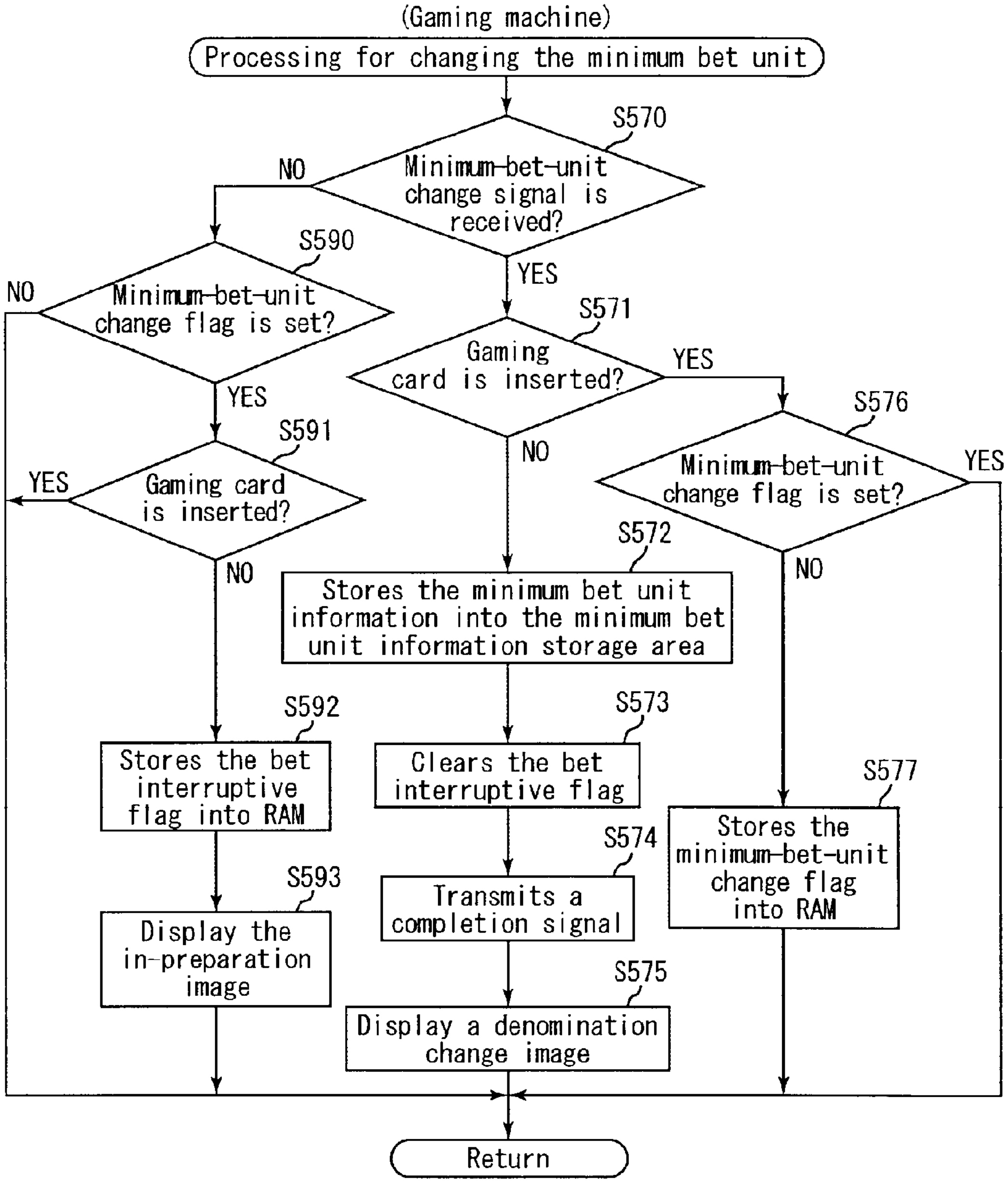
FIG. 38 is a view illustrating a flowchart of processing for changing the minimum bet unit executed by the gaming machine according to the fourth embodiment of the present invention.

FIG. 38 is a view illustrating a flowchart of processing for changing the minimum bet unit executed by the gaming machine according to the fourth embodiment of the present invention.

Figure 39:
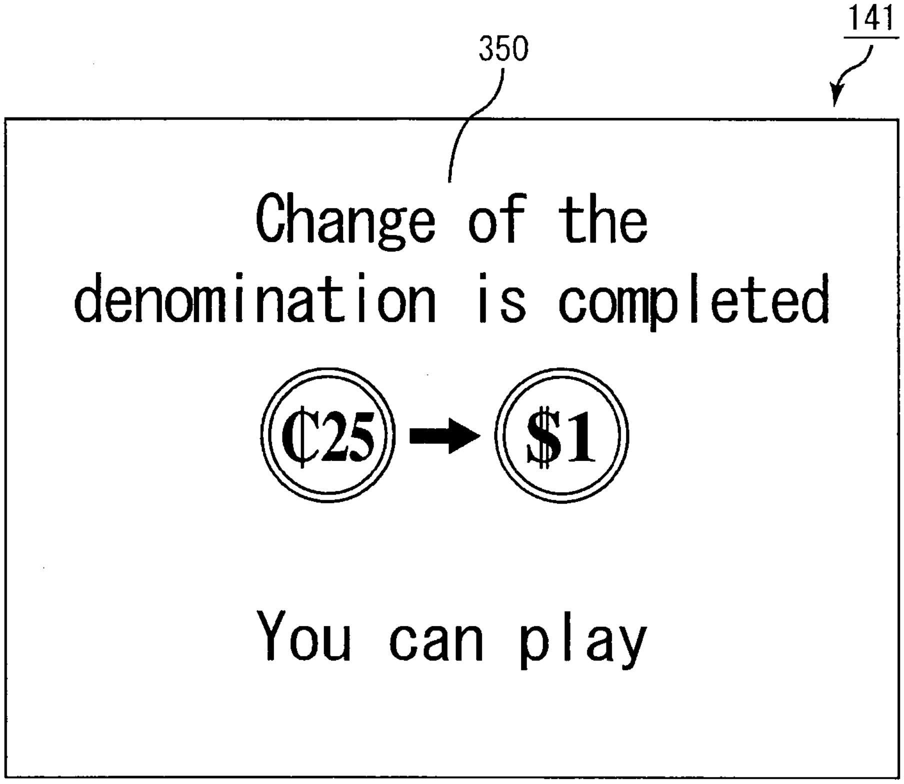
FIG. 39 is an image illustrating an exemplary image displayed on a lower image display panel provided in the gaming machine according to the fourth embodiment of the present invention.

FIG. 39 is an image illustrating an exemplary image displayed on a lower image display panel provided in the gaming machine according to the fourth embodiment of the present invention.

Figure 40:
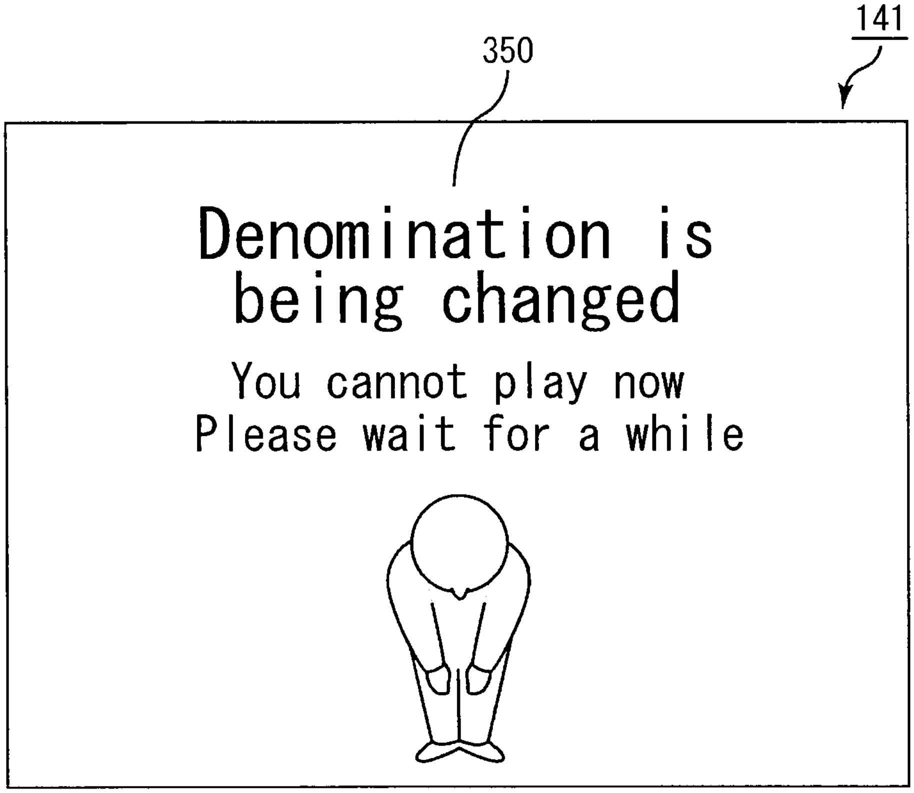
FIG. 40 is an image illustrating an exemplary image displayed on a lower image display panel provided in the gaming machine according to the fourth embodiment of the present invention.

FIG. 40 is an image illustrating an exemplary image displayed on a lower image display panel provided in the gaming machine according to the fourth embodiment of the present invention.

First, the main CPU 71 determines whether or not it has received the minimum-bet-unit change signal from the external control device 200 (step S570).

When determining it has received the minimum-bet-unit change signal, the main CPU 71 determines whether or not it has detected the presence of the gaming card 58 (step S571). In this processing, the main CPU 71 determines whether or not it has received a gaming card detection signal indicating that the gaming card 58 inserted into the gaming card slot 59 has been detected, from the gaming card slot 59.

When determining that the presence of the gaming card 58 has not been detected, the main CPU 71 stores the minimum bet unit information included in the minimum-bet-unit change signal, into the minimum bet unit information storage area (step S572).

Next, the main CPU 71 clears the bet interruptive flag in the case where the bet interruptive flag (see step S592) is set (step S573).

Next, the main CPU 71 transmits a completion signal to the external control device 200 (step S574). On receiving the completion signal, the external control device 200 stops transmission of the minimum-bet-unit change signal which has been conducted at predetermined intervals (every 10 minutes) (see FIGS. 36 and 37).

Next, the main CPU 71 displays a denomination change image 349 on the lower image display panel 141 (step S575). The denomination change image 349 is for notifying the player that the change of the minimum bet unit in the gaming machine 1 has been completed and a game can be played.

Here, the denomination change image 349 is described with reference to FIG. 39.

As illustrated in FIG. 39, the lower image display panel 141 displays the denomination change image 349 including a character image showing the changed minimum bet unit and a character image for encouraging the player to start a game.

After executing step S575, the main CPU 71 ends the present subroutine.

When determining in step S571 that the presence of the gaming card 58 has been detected, the main CPU 71 determines whether or not the minimum-bet-unit change flag is stored in the RAM 73 (step S576).

When determining that the minimum-bet-unit change flag is stored in the RAM 73, the main CPU 71 ends the present subroutine.

On the other hand, when determining that the minimum-bet-unit change flag is not stored in the RAM 73, the main CPU 71 stores the minimum-bet-unit change flag in the RAM 73 (step S577), and then, ends the present subroutine.

When determining in step S570 that it has not received the minimum-bet-unit change signal, the main CPU 71 determines whether or not the minimum-bet-unit change flag is stored in the RAM 73 (step S590).

When determining that the minimum-bet-unit change flag is not stored in the RAM 73, the main CPU 71 ends the present subroutine.

On the other hand, when determining that the minimum-bet-unit change flag is stored in the RAM 73, the main CPU 71 determines whether or not it has detected the presence of the gaming card 58 (step S591). In this processing, the main CPU 71 determines whether or not it has received a gaming card detection signal indicating that the inserted gaming card 58 has been detected, from the gaming card slot 59.

When determining that it has detected the presence of the gaming card 58, the main CPU 71 ends the present subroutine.

On the other hand, when determining that it the presence of the gaming card 58 has not been detected, the main CPU 71 stores the bet interruptive flag in the RAM 73 (step S592).

The bet interruptive flag is a flag for invalidating the operation of the BET button (see step S553 of FIG. 34).

Next, the main CPU 71 displays an in-preparation image on the lower image display panel 141 (step S593). The in-preparation image 350 is an image for notifying the player that a game cannot be played on the gaming machine 1.

Here, the in-preparation image 350 is described with reference to FIG. 40.

As illustrated in FIG. 40, the lower image display panel 141 displays the in-preparation image 350 including a character image indicating that a game cannot be played.

Now, refer back to FIG. 38.

After executing step S593, the main CPU 71 ends the present subroutine.

As above, the fourth embodiment has been described with reference to FIGS. 34 to 40.

In the fourth embodiment, there has been described a case where the BET button is used as a bet input device. However, the bet input device of the present invention is not particularly limited and, except for the buttons, conventionally known bet input device such as a touch panel and a currency insertion slot capable of accepting the currency including coins and bills may be used.

In the case where the currency insertion slot is used as a bet input device, the standby state of the present invention may be a state as described below. Namely, the standby state refers to a state until the processing for physically sealing the currency insertion slot as the processing for invalidating the bet input device is completed.

According to the fourth embodiment of the present invention, the external control device 200 is provided with the minimum bet unit input device 245. It is possible to input a selection of a minimum bet unit out of a plurality of minimum bet units by using the minimum bet unit input device 245 provided in the external control device 200. The minimum bet unit information indicative of the selected minimum bet unit is transmitted to all the gaming machines 1 connected to the external control device 200. On receiving the minimum bet unit information, the gaming machine 1 executes a game as follows. After the bet of game media in an amount corresponding to a natural number multiple of the minimum bet unit indicated by the minimum bet unit information, the result of the game is determined. Then, the game media in an amount determined based on the above result of the game is paid out. Namely, the minimum bet units in all the gaming machines 1 which have received the minimum bet unit information are changed to the minimum bet unit selected in the external control device 200.

Accordingly, the manager of the game facility needs not to have inefficient work of changing the minimum bet unit in gaming machines 1 individually in the case where the minimum bet unit is required to be changed according to the management strategy of the game facility. Just an operation of the input device provided in the server allows quick and easy change of the minimum bet unit in the gaming machines 1.

It is possible to significantly reduce the manager's work especially in the case where the number of the gaming machines 1 is large and in the case where a plurality of gaming machines 1 are installed in a plurality of places.

Accordingly, it is possible to quickly respond to the players' needs about the minimum bet unit even in the game facility in which thousands of gaming machines are installed or in the game facilities operating in different places as a chain, resulting in the profit increase of the game facility.

According to the fourth embodiment of the present invention, after receiving the input for selecting the minimum bet unit by using the minimum bet unit input device 245, the external control device 200 keeps transmitting the minimum bet unit information to the gaming machine 1 connected thereto until it receives a completion signal indicating that the minimum bet unit has been changed from that gaming machine 1.

Accordingly, the minimum bet unit is changed in the gaming machine 1 based on the appropriate minimum bet unit information.

As a result, the manager can implement more appropriate management of the game facility.

According to the fourth embodiment, an input of a bet based on the changed minimum bet unit by using the bet unit input device 245 is accepted on condition that the state until the processing for changing the minimum bet unit in the state where no player plays a game (standby state) is completed is terminated.

Accordingly, a player cannot place a bet until the standby state is terminated, and therefore, it is possible to avoid the situation that the minimum bet unit cannot be changed so long because a player starts playing the game on a gaming machine right after the completion of the game played by another player on that gaming machine.

As above, descriptions have been given on the embodiments (First to Fourth Embodiments) of the present invention.

In the above embodiments, a plurality of minimum bet units refer to different amounts (25 cents, 1 dollar, and 10 dollars) in a single currency (US currency). However, the plurality of minimum bet units are not limited to this case in the present invention. The plurality of minimum bet units of the present invention may refer to plurality types of currencies (e.g. US currency and Japanese currency). For example, a plurality of minimum bet units may include 1 dollar, 100 yen, and 1 Euro.

Further, in the above embodiments, a slot machine game is played on the gaming machine 1. However, the game of the present invention is not limited to this and it may be any game such as a roulette game, a dice game, and a card game.

Furthermore, in the above embodiments, the input device of the present invention includes two input devices of the minimum bet unit input device 245 and the gaming machine selection input device 246. The input device of the present invention may include a plurality of input devices as above, or alternatively, it may include one input device. In addition, the input device of the present invention may be a conventionally known input device such as buttons and touch panels.

A method for selecting the minimum bet unit by using the input device is also not particularly limited. For example, a number may be inputted by using the input device and the inputted number may be selected as the minimum bet unit (e.g. when the number “30” is inputted, the minimum bet unit is set to 30 cents).

Moreover, the change state of the present invention is not limited to the above case. For example, the change state may refer to a state where a maximum number of game media allowed to be betted in a game (maximum bet number of game media) have been betted in a predetermined number of consecutive games. For another example, the change state may refer to a state where the value obtained by dividing the number of game media having been betted in a plurality of games by the number of games (average bet number). Such configuration allows selective change of the minimum bet unit to the larger unit in the gaming machine on which a player who wishes to bet a larger number of game media in a game. Consequently, it is possible to develop broader strategies for managing the game facility, resulting in the additional profit increase of the game facility.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, other configurations requested for performing each step should become apparent from the above descriptions.

What is claimed as new and desired to be secured by Letters Patent of the United States is:

1. A server comprising an input device and a processor, the server being capable of communicating with a gaming machine that executes a game in which a result of the game is determined after game media in an amount corresponding to a natural number multiple of any of a plurality of minimum bet units is bet and game media in an amount determined based on the result of the game is paid out, and the processor programmed to execute the processing of:

(A) accepting an input made by using the input device for selecting a minimum bet unit out of a plurality of minimum bet units;

(B) transmitting a minimum bet unit information indicative of the minimum bet unit selected in the processing (A) to a controller provided in the gaming machine;

wherein the controller determines whether the gaming machine is in a change state in which the minimum bet unit can be modified, the change state being a state in which a player does not play a game on the gaming machine; and, wherein the controller executes a process of changing the minimum bet unit indicated by the minimum bet unit information received from the processor when it is determined that the gaming machine is in the change state.

2. The server according to claim 1, wherein the processing (A) includes accepting the input for selecting a minimum bet unit out of a plurality of minimum bet units and an input for selecting a gaming machine out of a plurality of the gaming machines, and the processing (B) includes transmitting the minimum bet unit information indicative of the minimum bet unit selected in the processing (A) to the controller provided in the gaming machine selected in the processing (A).

3. The server according to claim 1, wherein the processing (B) includes transmitting a minimum-bet-unit change signal to the controller, the minimum-bet-unit change signal including the minimum bet unit information indicative of the minimum bet unit selected in the processing (A) and being a signal for changing the minimum bet unit in the gaming machine when a state of the gaming machine becomes a change state in which the minimum bet unit can be changed.

4. The server of claim 1, wherein the change state is at least one of: a state wherein the number of credits in the gaming machine is zero, the game player has not been detected by a gaming machine sensor for a predetermined time period, a gaming card is not inserted into a gaming card slot of the gaming machine, and wherein, upon receiving a request to change the minimum bet unit at the gaming machine, the game player approves the change of the minimum bet unit.

5. The server according to claim 1, wherein the processor is programmed to execute the processing of:

(C) receiving a request for retransmission of the minimum bet unit information from the controller of the gaming machine when the gaming machine enters a change state in which the minimum bet unit can be changed; and, (D) retransmitting the minimum bet unit information to the controller of the gaming machine requesting retransmission of the minimum bet unit information.

6. A gaming machine comprising a controller, the gaming machine capable of communicating with a server accepting an input made by using an input device for selecting a minimum bet unit out of a plurality of minimum bet units, the controller programmed to execute the processing of:

(a) receiving a minimum bet unit information indicative of the selected minimum bet unit from the server;

(b) executing a game in which a result of the game is determined after game media in an amount corresponding to a natural number multiple of the minimum bet unit indicated by the minimum bet unit information received in the processing (a) is bet and game media in an amount determined based on the result is paid out;

(c) determining whether the gaming machine is in a change state in which the minimum bet unit can be changed wherein the controller determines whether the gaming machine is in the change state in which the minimum bet unit can be modified, the change state being a state in which a player does not play a game on the gaming machine; and, wherein the controller executes a process of changing the minimum bet unit indicated by the minimum bet unit information received from the processor when it is determined that the gaming machine is in the change state.

7. The gaming machine according to claim 6, wherein the processing (a) includes further receiving an identification information of the gaming machine selected in the server, and the processing (b) includes executing a game in which a result of the game is determined after game media in an amount corresponding to a natural number multiple of the minimum bet unit indicated by the minimum bet unit information received in the processing (a) is bet and game media in an amount determined based on the result is paid out, when the identification information of the gaming machine received in the processing (a) is identical with an identification information of the gaming machine provided with the controller concerned.

8. The gaming machine according to claim 6 wherein the processing (a) includes receiving a minimum-bet-unit change signal including the minimum bet unit information indicative of the minimum bet unit selected in the server, and the processing (b) includes executing a game in which a result of the game is determined after game media in an amount corresponding to a natural number multiple of the minimum bet unit indicated by the minimum bet unit information included in the minimum-bet-unit change signal received in the processing (a) is bet and game media in an amount determined based on the result is paid out, on condition that it is determined in the processing (c) that the gaming machine provided with the controller concerned is in the change state.

9. The gaming machine according to claim 6, wherein the gaming machine further comprises a bet input device with which a player can place a bet, the controller is further programmed to execute the processing of (d) accepting an input made by using the bet input device for betting game media in an amount corresponding to a natural number multiple of the minimum bet unit indicated by the minimum bet unit information received in the processing (a), on condition that a standby state for changing the minimum bet unit is terminated.

10. The gaming machine of claim 6, wherein the controller is programmed to execute the processing of:

(d) transmitting a request for retransmission of the minimum bet unit information from the server when the gaming machine enters the change state; and, (e) receiving the retransmitted minimum bet unit information from the server.

11. A gaming system comprising:

a gaming machine provided with a controller;

a server provided with an input device and a processor; and a network enabling communication between the gaming machine and the server, the processor programmed to execute the processing of:

(A) accepting an input made by using the input device for selecting a minimum bet unit out of a plurality of minimum bet units;

(B) transmitting a minimum bet unit information indicative of the minimum bet unit selected in the processing (A) to the controller; and, the controller programmed to execute the processing of (a) receiving the minimum bet unit information transmitted in the processing (B);

(b) executing a game in which a result of the game is determined after game media in an amount corresponding to a natural number multiple of the minimum bet unit indicated by the minimum bet unit information received in the processing (a) is bet and game media in an amount determined based on the result of the game is paid out; and, (c) determining whether the gaming machine provided with the controller concerned is in the change state in which the minimum bet unit can be changed, wherein the controller determines whether the gaming machine is in the change state in which the minimum bet unit can be modified, the change state being a state in which a game player does not play a game on the gaming machine; and, wherein the controller executes a process of changing the minimum bet unit indicated by the minimum bet unit information received from the processor when it is determined that the gaming machine is in the change state.

12. The gaming system according to claim 11, wherein the processing (A) includes accepting the input made by using the input device for selecting a minimum bet unit out of a plurality of minimum bet units and an input made by using the input device for selecting a gaming machine out of a plurality of the gaming machines, the processing (B) includes transmitting the minimum bet unit information indicative of the minimum bet unit selected in the processing (A) and an identification information of the gaming machine selected in the processing (A) to the controller, the processing (a) includes receiving the minimum bet unit information and the identification information of the gaming machine transmitted in the processing (B), and the processing (b) includes executing a game in which a result of the game is determined after game media in an amount corresponding to a natural number multiple of the minimum bet unit indicated by the minimum bet unit information received in the processing (a) is bet and game media in an amount determined based on the result of the game is paid out, when the identification information of the gaming machine received in the processing (a) is identical with an identification information of the gaming machine provided with the controller concerned.

13. The gaming system according to claim 11, wherein the processing (B) includes transmitting a minimum-bet-unit change signal to the controller, the minimum-bet-unit change signal including the minimum bet unit information indicative of the minimum bet unit selected in the processing (A) and being a signal for changing the minimum bet unit in the gaming machine when a state of the gaming machine becomes the change state, the processing (a) includes receiving the minimum-bet-unit change signal transmitted in the processing (B), and the processing (b) includes executing a game in which a result of the game is determined after game media in an amount corresponding to a natural number multiple of the minimum bet unit indicated by the minimum bet unit information included in the minimum-bet-unit change signal received in the processing (a) is bet and game media in an amount determined based on the result of the game is paid out, on condition that it is determined in the processing (c) that the gaming machine provided with the controller concerned is in the change state.

14. The gaming system according to claim 11, wherein the gaming machine is provided with a bet input device with which a player can place a bet, and the controller is further programmed to execute the processing of (d) accepting an input made by using the bet input device for betting game media in an amount corresponding to a natural number multiple of the minimum bet unit indicated by the minimum bet unit information received in the processing (a), on condition that a standby state for changing the minimum bet unit is terminated.

15. The gaming system of claim 11, wherein the change state is at least one of: a state wherein the number of credits in the gaming machine is zero, the game player has not been detected by a gaming machine sensor for a predetermined time period, a gaming card is not inserted into a gaming card slot of the gaming machine, and wherein, upon receiving a request to change the minimum bet unit at the gaming machine, the game player approves the change of the minimum bet unit.

16. The gaming system of claim 11, wherein the processor is programmed to execute the processing of:

(C) receiving a request for retransmission of the minimum bet unit information from the controller of the gaming machine when the gaming machine enters a change state in which the minimum bet unit can be changed; and, (D) retransmitting the minimum bet unit information to the controller of the gaming machine requesting retransmission of the minimum bet unit information.

17. A control method of a server, the method comprising the steps of:

(A) accepting an input made by using an input device included in the server for selecting a minimum bet unit out of a plurality of minimum bet units;

(B) transmitting a minimum bet unit information indicative of the minimum bet unit selected in the step (A), the server comprising the input device and a processor and being capable of communicating with a gaming machine that executes a game in which a result of the game is determined after game media in an amount corresponding to a natural number multiple of any of a plurality of minimum bet units is bet and game media in an amount determined based on the result is paid out wherein the controller determines whether the gaming machine is in a change state in which the minimum bet unit can be modified, the change state being a state in which a player does not play a game on the gaming machine; and, wherein the controller executes a process of changing the minimum bet unit indicated by the minimum bet unit information received from the processor when it is determined that the gaming machine is in the change state.

18. The control method of claim 17, wherein when the gaming machine enters a change state in which the minimum bet unit can be changed, a request signal is transmitted from the gaming machine to the server, and when the server receives the request signal, the server retransmits the minimum bet unit selected in (A) to the gaming machine.

* * * * *